(12) United States Patent
Bridewell et al.

(10) Patent No.: US 12,552,129 B2
(45) Date of Patent: Feb. 17, 2026

(54) NONWOVEN WATER-SOLUBLE COMPOSITE STRUCTURE

(71) Applicant: MONOSOL, LLC, Portage, IN (US)

(72) Inventors: Victoria Bridewell, Portage, IN (US); Carlo Soave, Portage, IN (US); Jonathon Knight, Laporte, IN (US)

(73) Assignee: MONOSOL, LLC, Portage, IN (US)

( * ) Notice: Subject to any disclaimer, the term of this patent is extended or adjusted under 35 U.S.C. 154(b) by 800 days.

(21) Appl. No.: 17/763,631

(22) PCT Filed: Sep. 30, 2020

(86) PCT No.: PCT/US2020/053599
§ 371 (c)(1),
(2) Date: Mar. 24, 2022

(87) PCT Pub. No.: WO2021/067474
PCT Pub. Date: Apr. 8, 2021

(65) Prior Publication Data
US 2022/0388269 A1    Dec. 8, 2022

Related U.S. Application Data

(60) Provisional application No. 62/908,310, filed on Sep. 30, 2019.

(51) Int. Cl.
| | | |
|---|---|---|
| *B32B 3/04* | (2006.01) | |
| *B32B 5/02* | (2006.01) | |
| *B32B 5/26* | (2006.01) | |

(52) U.S. Cl.
CPC ................ *B32B 3/04* (2013.01); *B32B 5/022* (2013.01); *B32B 5/266* (2021.05);
(Continued)

(58) Field of Classification Search
CPC ........... B32B 5/266; B32B 5/26; B32B 5/265; B32B 5/267; B32B 5/268; B32B 5/269
(Continued)

(56) References Cited

U.S. PATENT DOCUMENTS 5,286,538 A * 2/1994 Pearlstein .............. B65D 81/22
                                                            428/513
2003/0050210 A1 * 3/2003 Pounds ................ C11D 17/044
                                                            510/297
(Continued)

FOREIGN PATENT DOCUMENTS

| CN | 102482818 B | 7/2015 |
|---|---|---|
| CN | 114829143 A | 7/2022 |

(Continued)

OTHER PUBLICATIONS

Apr. 5, 2023 Examination Report No. 1 issued by the Australian Patent Office for Australian Patent Application No. 2020359638.

(Continued)

*Primary Examiner* — Zachary M Davis
(74) *Attorney, Agent, or Firm* — BENESCH, FRIEDLANDER, COPLAN & ARONOFF

(57) ABSTRACT

Provided herein are nonwoven composite articles including a first layer including a first nonwoven web including a first plurality of fibers having a first diameter, a second layer including a second nonwoven web including a second plurality of fibers having a second diameter, and a first interface including at least a portion of the first nonwoven web and at least a portion of the second nonwoven web, wherein the portion of the first nonwoven web and the portion of the second nonwoven web are fused, and wherein the second diameter is smaller than the first diameter and the first plurality of fibers, the second plurality of fibers, or both include a water-soluble polyvinyl alcohol fiber forming material. Also provided are flushable wipes and absorbent
(Continued)

articles including nonwoven webs including fibers including a water-soluble polyvinyl alcohol fiber forming material.

27 Claims, 8 Drawing Sheets

(52) U.S. Cl.
CPC ..... *B32B 2250/20* (2013.01); *B32B 2260/021* (2013.01); *B32B 2262/0223* (2013.01); *B32B 2262/0276* (2013.01); *B32B 2262/062* (2013.01); *B32B 2262/144* (2021.05); *B32B 2307/718* (2013.01); *B32B 2410/00* (2013.01); *B32B 2432/00* (2013.01); *B32B 2555/00* (2013.01)

(58) Field of Classification Search
USPC ........................................................ 510/143
See application file for complete search history.

(56) References Cited

U.S. PATENT DOCUMENTS

| | | | |
|---|---|---|---|
| 2004/0092635 A1 | 5/2004 | Kitamura et al. | |
| 2005/0050608 A1* | 3/2005 | Jones | G21F 9/0012/102 |
| 2005/0136780 A1* | 6/2005 | Clark | D04H 1/58 442/415 |
| 2015/0291786 A1* | 10/2015 | Sumnicht | D21H 17/36 524/45 |
| 2022/0228305 A1* | 7/2022 | Bridewell | D04H 1/4309 |
| 2022/0403303 A1* | 12/2022 | Zeese | C11D 3/505 |
| 2023/0002132 A1* | 1/2023 | Bridewell | C11D 17/042 |

FOREIGN PATENT DOCUMENTS

| | | |
|---|---|---|
| JP | H11140765 A | 5/1999 |
| JP | 2002-53170 | 2/2002 |
| JP | 2009263818 A | 11/2009 |
| JP | 2011202121 A | 10/2011 |
| JP | 2011-244894 | 11/2011 |
| JP | 2016204555 A | 12/2016 |
| JP | 2017-29495 | 8/2018 |
| JP | 2018157943 A | 10/2018 |
| TW | 420637 B | 2/2001 |
| WO | 2011019895 A1 | 2/2011 |
| WO | 201301103630 A1 | 7/2013 |
| WO | 2014024805 A1 | 2/2014 |
| WO | 2016028832 A1 | 2/2016 |
| WO | 2016/115181 A1 | 7/2016 |
| WO | 2016109086 A1 | 7/2016 |
| WO | 20170095399 A1 | 6/2017 |
| WO | 20200219930 A1 | 10/2020 |

OTHER PUBLICATIONS

Written Opinion of the International Searching Authority for International Applicaiton No. PCT/US2020/053599 issued Apr. 12, 2020.
International Search Report for International Application No. PCT/US2020/053599, issued Apr. 12, 2020.
Feb. 27, 2023 Communication pursuant to Article 94(3) EPC ("Office Action") issued by the European Patent Office for European Patent Application No. 20792879.7.
Jan. 4, 2023 Examination Report ("Office Action") issued by the Canadian Intellectual Property Office for Canadian Patent Application No. 3,151,352.
Nov. 24, 2022 Laid Open Publication No. 2022-549309 A issued by the Japanese Patent Office for Japanese Patent Application No. JP 2022-518730. [English Abstract included.].
May 11, 2023 Official Action issued by the Japanese Patent Office for Japanese Patent Applicatin No. 2022-518730. [Includes English translation.].
Apr. 12, 2022 Communication pursuant to Rules 161(1) and 162 EPC issued by the European Patent Office for European Patent Application No. 20792879.7.
Aug. 23, 2022 First Examination Report issued by the Indian Patent Office for Indian Patent Application No. 202217024976.
Examination Report dated Apr. 5, 2023, for Australian Patent Application No. 2020359638, 4 pages.
Office Action dated Jan. 9, 2024 for Japanese Patent Application No. 2022-518730, 4 pages.
Official Action issued in Russian Patent Application No. 2024115607, dated Oct. 25, 2024.
Official Action issued in Japanese Patent Application No. 2023-192311, dated Nov. 8, 2024,.
Communication pursuant to Article 94(3) EPC issued in European Patent Application No. 24168686.4, dated Dec. 13, 2024.
Official Action issued in Chinese Patent Application No. 202080069010.4 , dated Oct. 17, 2024.
Office Action issued in Chinese Patent Application No. 202080069010.4, dated Mar. 17, 2025.
Office Action issued in Japanese Patent Application No. No. 2023-192311, dated Apr. 10, 2025.
Office Action issued in Japanese Patent application No. 2024-111032, dated Apr. 22, 2025.
Office Action issued in Korean Patent Application No. 10-2022-7014636, dated Jul. 7, 2025.

\* cited by examiner

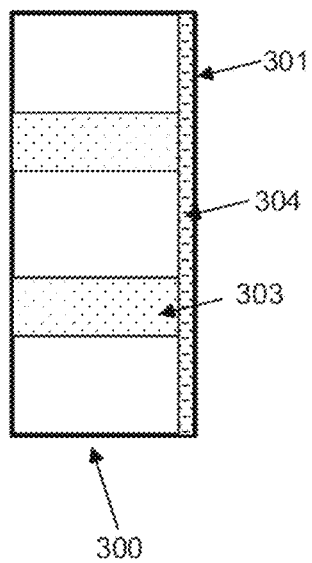
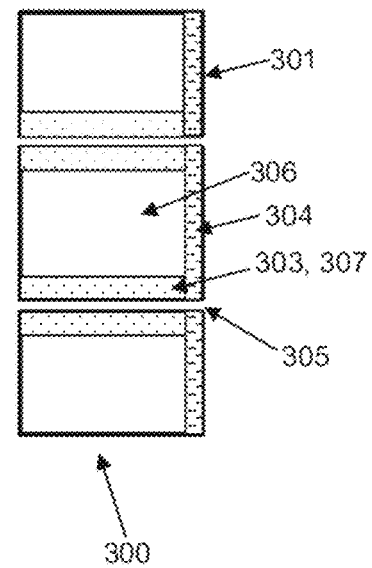
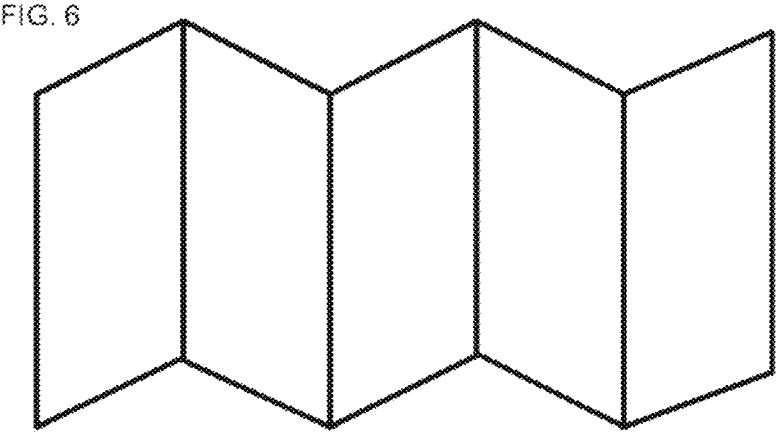
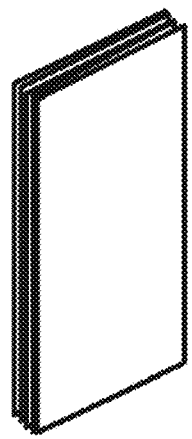

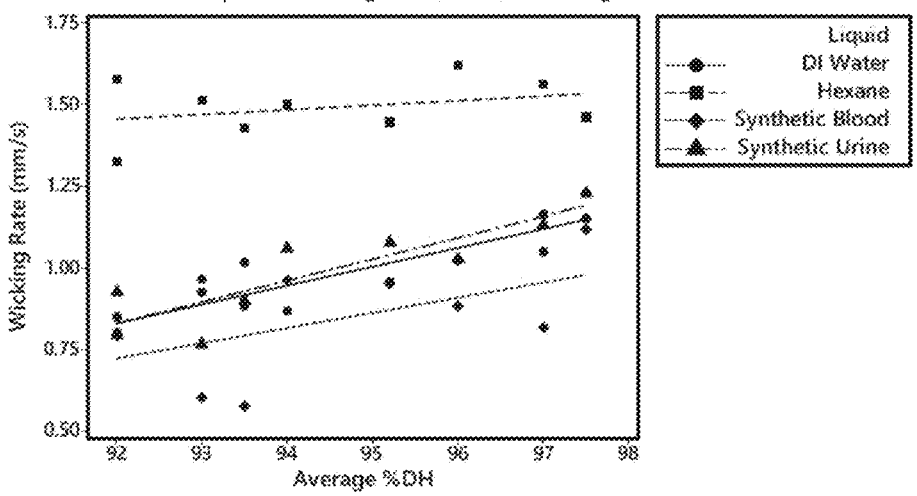
FIG. 11B
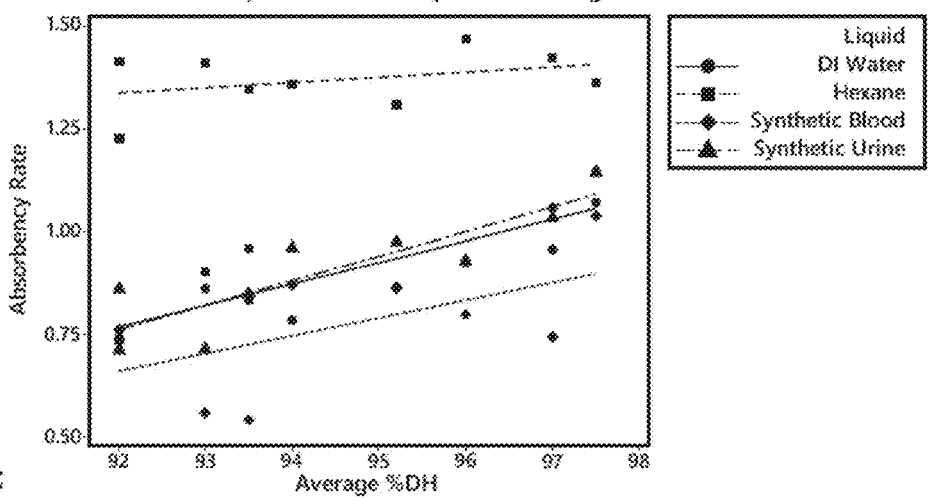
FIG. 11C
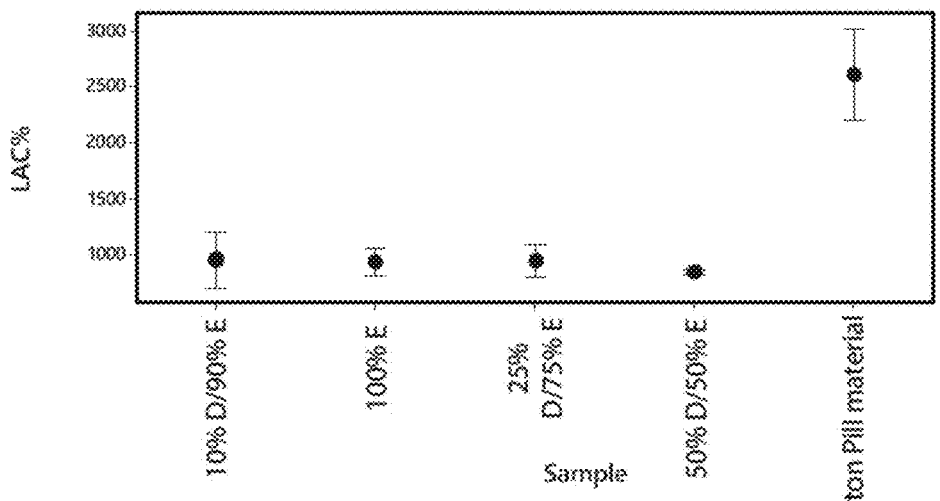
FIG. 12    *Individual standard deviations are used to calculate the intervals.*

111

NONWOVEN WATER-SOLUBLE COMPOSITE STRUCTURE

CROSS-REFERENCE TO RELATED APPLICATIONS

This application is a U.S. national stage application under 35 U.S.C. § 371 of International Application No. PCT/US2020/053599, filed Sep. 30, 2020, which claims the benefit under 35 U.S.C. § 119 (e) of U.S. Provisional Patent Application No. 62/908,310, filed Sep. 30, 2019, the entire disclosures of which are hereby incorporated by reference.

FIELD OF THE INVENTION

The present disclosure relates generally directed to nonwoven composite structures, flushable wipes, and absorbent articles. More specifically, the disclosure relates to composites of nonwoven webs including water-soluble fibers including polyvinyl alcohol fiber forming materials.

BACKGROUND

Nonwoven webs are traditionally used in many single-use consumer products including personal care products, such as diaper components, feminine care, and adult incontinence, and single-use wipes, such as in industrial applications, medical applications, cleaning applications, and personal/baby care. Traditional chemistries used in such products, e.g., viscose, polypropylene, or cotton fibers, are generally non-sustainable, non-biodegradable, are potential contributors to microplastics, and are often disposed of incorrectly, such as by flushing down a toilet and entering wastewater treatment and sewage facilities. Known wipes must be disposed of in a bin, which may not be hygienic or convenient for a user. Improper disposal of these articles can result in pipe clogs in the home, formation of "fatburgs" or aggregation of congealed mass of biodegradable and non-biodegradable materials composed of congealed grease and cooking fat and disposable wipes in residential and municipal wastewater systems, contributing to oceanic microplastics, and require a change in consumer behavior.

Thus, it would be advantageous to provide a nonwoven structure using chemistries that are more biodegradable, are not contributors to microplastics, and even water soluble, that have suitable mechanical properties to withstand the stresses applied to single-use consumer products (e.g., rubbing with a wipe or movement of a child while wearing a diaper) and having a fluid reservoir for, e.g., loading of lotions into wipes and/or retaining liquids in a liquid acquisition layer.

SUMMARY

One aspect of the disclosure provides a nonwoven composite article having a first layer of a first nonwoven web including a first plurality of fibers having a first diameter, a second layer of a second nonwoven web including a second plurality of fibers having a second diameter, and a first interface including at least a portion of the first nonwoven web and at least a portion of the second nonwoven web, wherein the portion of the first nonwoven web and the portion of the second nonwoven web are fused, and wherein the second diameter is smaller than the first diameter, and the first plurality of fibers, the second plurality of fibers, or both comprise a water-soluble polyvinyl alcohol fiber forming material.

Another aspect of the disclosure provides a wearable absorbent article including an absorbent core having a wearer facing side and an outer facing side, and a liquid acquisition layer, wherein the liquid acquisition layer includes a nonwoven web including a plurality of fibers including a water-soluble polyvinyl alcohol fiber forming material.

Another aspect of the disclosure provides an absorbent article including a liquid pervious topsheet, a liquid impervious backsheet, an absorbent core, and a liquid acquisition layer including a nonwoven web including a plurality of fibers including a water-soluble polyvinyl alcohol fiber forming material.

Another aspect of the disclosure provides a flushable wet wipe including the nonwoven composite article of the disclosure.

Another aspect of the disclosure provides the use of the composite article of the disclosure in a flushable wet wipe.

Another aspect of the disclosure provides the use of the composite article of the disclosure in a wearable absorbent article.

Another aspect of the disclosure provides a method of forming the composite article of the disclosure, the method including depositing on the first layer including the first nonwoven web, the second layer including the second nonwoven web under conditions sufficient to fuse at least the portion of the first nonwoven web to the portion of the second nonwoven web, thereby forming a first interface.

Another aspect of the disclosure provides a liquid containing nonwoven article, the liquid containing nonwoven article including a core nonwoven web comprising a first plurality of fibers comprising a first polyvinyl alcohol fiber forming material, wherein the core nonwoven web comprises a liquid, the liquid comprising an active agent, and an outer nonwoven web comprising a second plurality of fibers comprising a second polyvinyl alcohol fiber forming material, wherein the core nonwoven web is enclosed by the outer nonwoven web.

Another aspect of the disclosure provides a method of forming the liquid containing nonwoven article of the disclosure, the method including contacting the core nonwoven web with the liquid comprising the active agent, enveloping the core nonwoven web with the outer nonwoven web, and sealing the outer nonwoven web to enclose the core nonwoven web.

For the compositions described herein, optional features, including but not limited to components and compositional ranges thereof, fiber forming materials, fiber diameter ranges, multiple layer constructions, fiber geometries, and/or mechanical properties are contemplated to be selected from the various aspects and embodiments provided herein.

Further aspects and advantages will be apparent to those of ordinary skill in the art from a review of the following detailed description. While the composite structures, flushable wipes, and absorbent articles of the disclosure are susceptible of embodiments in various forms, the description hereafter includes specific embodiments with the understanding that the disclosure is illustrative and is not intended to limit the disclosure to the specific embodiments described herein.

BRIEF DESCRIPTION OF THE DRAWINGS

For further facilitating the understanding of the present disclosure, 3 drawing figures are appended hereto.

FIG. 5A is an illustration of a nonwoven web wrapped around and enclosing a second nonwoven web (not shown) having seals 303 at multiple points along the machine direction and along a transverse edge 304.

FIG. 5B is an illustration of a nonwoven web wrapped around and enclosing a second nonwoven web (not shown) having seals 303 at multiple points along the machine direction, that have been cut 305 to form unit doses 306 having flanges 307.

FIG. 6 is an illustration of one method of folding a nonwoven web.

FIG. 11B is a plot of the wicking rate of a nonwoven web of the disclosure as a function of the average degree of hydrolysis of the polyvinyl alcohol fiber forming material in the multilayer article.

FIG. 11C is a plot of the absorbency rate of a nonwoven web of the disclosure as a function of the average degree of hydrolysis of the polyvinyl alcohol fiber forming material in the multilayer article.

FIG. 12 is an interval plot of the liquid absorption capacity nonwoven web of the disclosure as a function of the average degree of hydrolysis of the polyvinyl alcohol fiber forming material in the multilayer article.

DETAILED DESCRIPTION

Figure 1:
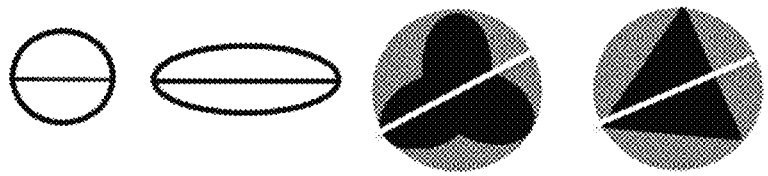
FIG. 1 shows the cross-section of various fiber shapes, wherein the line indicates the diameter of the fiber.

The disclosure provides nonwoven composite articles, flushable wipes, absorbent articles, liquid containing nonwoven articles, and methods of making and using same. The nonwoven composite articles of the disclosure include a first layer including a first nonwoven web including a first plurality of fibers having a first diameter, a second layer including a second nonwoven web including a second plurality of fibers having a second diameter, and a first interface comprising at least a portion of the first nonwoven web and at least a portion of the second nonwoven web, wherein the portion of the first nonwoven web and the portion of the second nonwoven web are fused, and wherein the second diameter is smaller than the first diameter, and the first plurality of fibers, the second plurality of fibers, or both include a water-soluble polyvinyl alcohol fiber forming material.

The nonwoven composite articles of the disclosure can provide one or more advantages, including, but not limited to, improved liquid acquisition relative to single layer nonwoven articles, improved lotion loading and retention relative to single layer nonwoven articles, improved biodegradability relative to traditional nonwoven articles, improved flushability relative to traditional nonwoven articles, improved softness relative to traditional nonwoven articles, improved mechanical properties (e.g., modulus, tensile strength, elongation, tenacity, and/or rupture strength) relative to a single layer carded nonwovens including an identical water-soluble fiber, and/or improved dispersion and dissolution relative to traditional nonwoven articles. The flushable wipes of the disclosure can provide one or more advantages, including, but not limited to, improved lotion loading and retention relative to traditional wipes, improved liquid acquisition relative to traditional wipes, improved softness relative to traditional wipes, improved flushability relative to traditional wipes, and/or improved biodegradability, dispersion and/or dissolution relative to traditional wipes. The absorbent articles of the disclosure can provide one or more advantages, including but not limited to, improved liquid acquisition relative to traditional liquid acquisition layers of absorbent articles, improved liquid retention relative to traditional liquid acquisition layers of absorbent articles, improved softness relative to traditional liquid acquisition layers, and/or improved biodegradability, dispersion and/or dissolution relative to traditional wipes.

As used herein and unless specified otherwise, the term "nonwoven web" refers to a web or sheet comprising, consisting of, or consisting essentially of fibers arranged (e.g., by a carding process) and bonded to each other. Further, as used herein, "nonwoven web" includes any structure including a nonwoven web or sheet, including, for example, a nonwoven web or sheet having a film laminated to a surface thereof. Methods of preparing nonwoven webs from fibers are well known in the art, for example, as described in *Nonwoven Fabrics Handbook*, prepared by Ian Butler, edited by Subhash Batra et al., Printing by Design, 1999, herein incorporated by reference in its entirety. As used herein and unless specified otherwise, the term "film" refers to a continuous film or sheet, e.g., prepared by a casting or extrusion process.

As used herein and unless specified otherwise, the term "water-soluble" refers to any fiber, nonwoven web, nonwoven composite article, or film having a dissolution time of 300 seconds or less at a specified temperature as determined according to MSTM-205 as set forth herein. For example, the dissolution time optionally can be 200 seconds or less, 100 seconds or less, 60 seconds or less, or 30 seconds or less at a temperature of about 80° C., about 70° C., about 60° C., about 50° C., about 40° C., about 20° C., or about 10° C. In embodiments wherein the dissolution temperature is not specified, the water-soluble fiber, nonwoven web, or nonwoven composite article has a dissolution time of 300 seconds or less at a temperature no greater than about 80° C. As used herein and unless specified otherwise, the term "cold water-soluble" refers to any fiber, nonwoven web, or nonwoven composite article having a dissolution time of 300 seconds or less at 10° C. as determined according to MSTM-205. For example, the dissolution time optionally can be 200 seconds or less, 100 seconds or less, 60 seconds or less, or 30 seconds at 10° C. In embodiments, "water-soluble film" means that at a thickness of 1.5 mil, the film dissolves in 300 seconds or less at a temperature no greater than 80° C. For example, a 1.5 mil (about 38 μm) thick water-soluble film can have a dissolution time of 300 seconds or less, 200 seconds or less, 100 seconds or less, 60 seconds or less, 30 seconds or less, or 20 seconds or less at a temperature of about 70° C., about 60° C., about 50° C., about 40° C., about 30° C., about 20° C., or about 10° C.

"Comprising" as used herein means that various components, ingredients or steps that can be conjointly employed in practicing the present disclosure. Accordingly, the term "comprising" encompasses the more restrictive terms "consisting essentially of" and "consisting of." The present compositions can comprise, consist essentially of, or consist of any of the required and optional elements disclosed herein. The invention illustratively disclosed herein suitably may be practiced in the absence of any element or step which is not specifically disclosed herein.

All percentages, parts and ratios referred to herein are based upon the total dry weight of the fiber, nonwoven web, nonwoven composite article, flushable wipe, or absorbent article of the present disclosure, as the case may be, and all measurements made are at about 25° C., unless otherwise specified. All such weights as they pertain to listed ingredients are based on the active level and therefore do not include carriers or by-products that may be included in commercially available materials, unless otherwise specified.

All ranges set forth herein include all possible subsets of ranges and any combinations of such subset ranges. By default, ranges are inclusive of the stated endpoints unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

It is expressly contemplated that for any number value described herein, e.g. as a parameter of the subject matter described or part of a range associated with the subject matter described, an alternative which forms part of the description is a functionally equivalent range surrounding the specific numerical value (e.g. for a dimension disclosed as "40 mm" an alternative embodiment contemplated is "about 40 mm"). Likewise, a value described by "about" expressly includes as an alternative embodiment the specific value itself (e.g. for an endpoint described as "about 40" an alternative embodiment contemplated is "40").

As used herein and unless specified otherwise, the terms "wt. %" and "wt %" are intended to refer to the composition of the identified element in "dry" (non water) parts by weight of the entire fiber, nonwoven web, nonwoven composite article, flushable wipe, or absorbent article.

As used herein and unless specified otherwise, the term "PHR" ("phr") is intended to refer to the composition of the identified element in parts per one hundred parts polymer resin or parts per one hundred parts fiber forming material (whether PVOH or other polymer resin) in the water-soluble fiber, nonwoven web, nonwoven composite article, flushable wipe, or absorbent article.

Fiber Forming Material

In general, the fibers of the disclosure can include a single fiber forming material or a combination (i.e., blend) of fiber forming materials. A single fiber can include one of more water-soluble fiber forming materials, one or more non-water-soluble fiber forming materials, or a combination of water-soluble and non-water-soluble fiber forming materials. The fibers of the disclosure can generally include a synthetic fiber forming material, a natural fiber forming material, a plant based fiber forming material, a bio-based fiber forming material, a biodegradable fiber forming material, a compostable fiber forming material, or a combination thereof. Plant-based fiber forming materials can be naturally occurring (e.g., cotton) or re-constituted (e.g., bamboo).

Water-Soluble Fiber Forming Materials

In general, water-soluble fiber forming materials can be water-soluble polymers. Water-soluble polymers can include, but are not limited to, a polyvinyl alcohol, polyacrylate, water-soluble acrylate copolymer, polyvinyl pyrrolidone, polyethyleneimine, pullulan, water-soluble natural polymer including, but not limited to, guar gum, gum Acacia, xanthan gum, carrageenan, and water-soluble starch, water-soluble polymer derivatives including, but not limited to, modified starches, ethoxylated starch, and hydroxypropylated starch, copolymers of the foregoing and combinations of any of the foregoing. Yet other water-soluble polymers can include polyalkylene oxides, polyacrylamides, polyacrylic acids and salts thereof, water-soluble celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. Such water-soluble polymers, whether PVOH or otherwise are commercially available from a variety of sources.

In embodiments, the water-soluble fiber forming material comprises a polyvinyl alcohol, a polyacrylate, a polyvinyl pyrrolidone, a polyethyleneimine, guar gum, gum Acacia, xanthan gum, carrageenan, a water-soluble starch, a water-soluble cellulose, a cellulose ether, a cellulose ester, a cellulose amide, or a combination thereof. In embodiments, the water-soluble fiber forming material comprises a polyacrylate, a polyvinyl pyrrolidone, a polyethyleneimine, guar gum, gum Acacia, xanthan gum, carrageenan, a water-soluble starch, a water-soluble cellulose, a cellulose ether, a cellulose ester, a cellulose amide, or a combination thereof.

Polyvinyl alcohol is a synthetic polymer generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is the PVOH polymer is partially hydrolyzed, then the polymer is more weakly hydrogen-bonded, less crystalline, and is generally soluble in cold water—less than about 50° F. (about 10° C.). As such, the partially hydrolyzed polymer is a vinyl alcohol-vinyl acetate copolymer that is a PVOH copolymer, but is commonly referred to as PVOH.

In some embodiments, the polyvinyl alcohol includes a modified polyvinyl alcohol, for example, a copolymer. The modified polyvinyl alcohol can include a co-polymer or higher polymer (e.g., ter-polymer) including one or more monomers in addition to the vinyl acetate/vinyl alcohol groups. Optionally, the modification is neutral, e.g., provided by an ethylene, propylene, N-vinylpyrrolidone or other non-charged monomer species. Optionally, the modification is a cationic modification, e.g., provided by a positively charged monomer species. Optionally, the modification is an anionic modification, e.g., provided by a negatively charged monomer species. Thus, in some embodiments, the polyvinyl alcohol includes an anionic modified polyvinyl alcohol. An anionic modified polyvinyl alcohol can include a partially or fully hydrolyzed PVOH copolymer that includes an anionic monomer unit, a vinyl alcohol monomer unit, and optionally a vinyl acetate monomer unit (i.e., when not completely hydrolyzed). In some embodiments, the PVOH copolymer can include two or more types of anionic monomer units. General classes of anionic monomer units which can be used for the PVOH copolymer include the vinyl polymerization units corresponding to sulfonic acid vinyl monomers and their esters, monocarboxylic acid vinyl monomers, their esters and anhydrides, dicarboxylic monomers having a polymerizable double bond, their esters and anhydrides, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, maleic anhydride, fumaric acid, monoalkyl fumarate, dialkyl fumarate, itaconic acid, monoalkyl itaconate, dialkyl itaconate, citraconic acid, monoalkyl citraconate, dialkyl citraconate, citraconic anhydride, mesaconic acid, monoalkyl mesaconate, dialkyl mesaconate, glutaconic acid, monoalkyl glutaconate, dialkyl glutaconate, glutaconic anhydride, alkyl acrylates, (alkyl)acrylates, vinyl sulfonic acid, allyl sulfonic acid, ethylene sulfonic acid, 2-acrylamido-1-methyl propane sulfonic acid, 2-acrylamide-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations of the foregoing (e.g., multiple types of anionic monomers or equivalent forms of the same anionic monomer). In some embodiments, the PVOH copolymer can include two or more types of monomer units selected from neutral, anionic, and cationic monomer units.

The level of incorporation of the one or more anionic monomer units in the PVOH copolymers is not particularly limited. In embodiments, the one or more anionic monomer units are present in the PVOH copolymer in an amount in a range of about 1 mol. % or 2 mol. % to about 6 mol. % or 10 mol. % (e.g., at least 1.0, 1.5, 2.0, 2.5, 3.0, 3.5, or 4.0 mol. % and/or up to about 3.0, 4.0, 4.5, 5.0, 6.0, 8.0, or 10 mol. % in various embodiments).

Polyvinyl alcohols can be subject to changes in solubility characteristics. The acetate group in the co-poly(vinyl acetate vinyl alcohol) polymer (PVOH homopolymer) is known by those skilled in the art to be hydrolysable by either acid or alkaline hydrolysis. As the degree of hydrolysis increases, a polymer composition made from the PVOH homopolymer will have increased mechanical strength but reduced solubility at lower temperatures (e.g., requiring hot water temperatures for complete dissolution). Accordingly, exposure of a PVOH homopolymer to an alkaline environment (e.g., resulting from a laundry bleaching additive) can transform the polymer from one which dissolves rapidly and entirely in a given aqueous environment (e.g., a cold water medium) to one which dissolves slowly and/or incompletely in the aqueous environment, potentially resulting in undissolved polymeric residue at the end of a wash cycle. In PVOH copolymers with pendant carboxyl groups, such as, for example, vinyl alcohol/hydrolyzed methyl acrylate sodium salt polymers, can form lactone rings between neighboring pendant carboxyl and alcohol groups, thus reducing the water solubility of the PVOH copolymer. In the presence of a strong base, the lactone rings can open over the course of several weeks at relatively warm (ambient) and high humidity conditions (e.g., via lactone ring-opening reactions to form the corresponding pendant carboxyl and alcohol groups with increased water solubility). Thus, contrary to the effect observed with PVOH homopolymers, it is believed that such a PVOH copolymer can become more soluble due to chemical interactions between the polymer and an alkaline composition inside the pouch during storage. Consequently, as they age, the packets may become increasingly prone to premature dissolution during a hot wash cycle (nominally 40° C.), and may in turn decrease the efficacy of certain laundry actives due to the presence of the bleaching agent and the resulting decrease in pH.

Specific sulfonic acids and derivatives thereof having polymerizable vinyl bonds can be copolymerized with vinyl acetate to provide cold-water soluble PVOH polymers which are stable in the presence of strong bases. The base-catalyzed alcoholysis products of these copolymers, which are used in the formulation of water-soluble fibers, are vinyl alcohol-sulfonate salt copolymers which are rapidly soluble. The sulfonate group in the PVOH copolymer can revert to a sulfonic acid group in the presence of hydrogen ions, but the sulfonic acid group still provides excellent cold-water solubility of the polymer. In embodiments, vinyl alcohol-sulfonate salt copolymers contain no residual acetate groups (i.e., are fully hydrolyzed) and therefore are not further hydrolysable by either acid or alkaline hydrolysis.

Generally, as the amount of modification increases, the water solubility increases, thus sufficient modification via sulfonate or sulfonic acid groups inhibit hydrogen bonding and crystallinity, enabling solubility in cold water. In the presence of acidic or basic species, the copolymer is generally unaffected, with the exception of the sulfonate or sulfonic acid groups, which maintain excellent cold water solubility even in the presence of acidic or basic species. Examples of suitable sulfonic acid comonomers (and/or their alkali metal salt derivatives) include vinyl sulfonic acid, allyl sulfonic acid, ethylene sulfonic acid, 2-acrylamido-1-methylpropanesulfonic acid, 2-acrylamido-2-methylpropanesufonic acid, 2-methacrylamido-2-methylpropanesulfonic acid and 2-sulfoethyl acrylate, with the sodium salt of 2-acrylamido-2-methylpropanesulfonic acid (AMPS) being a preferred comonomer.

The water-soluble polymers, whether polyvinyl alcohol polymers or otherwise, can be blended. When the polymer blend includes a blend of polyvinyl alcohol polymers, the PVOH polymer blend can include a first PVOH polymer ("first PVOH polymer") which can include a PVOH homopolymer or a PVOH copolymer including one or more types of anionic monomer units (e.g., a PVOH ter- (or higher co-) polymer) and a second PVOH polymer ("second PVOH polymer") which can include a PVOH homopolymer or a PVOH copolymer including one or more types of anionic monomer units (e.g., a PVOH ter- (or higher co-) polymer). In some aspects, the PVOH polymer blend includes only the first PVOH polymer and the second PVOH polymer (e.g., a binary blend of the two polymers). Alternatively or additionally, the PVOH polymer blend or a fiber or nonwoven made therefrom can be characterized as being free or substantially free from other polymers (e.g., other water-soluble polymers generally, other PVOH-based polymers specifically, or both). As used herein, "substantially free" means that the first and second PVOH polymers make up at least 95 wt. %, at least 97 wt. %, or at least 99 wt. % of the total amount of water-soluble polymers in the water-soluble fiber or film. In other aspects, the water-soluble fiber or nonwoven can include one or more additional water-soluble polymers. For example, the PVOH polymer blend can include a third PVOH polymer, a fourth PVOH polymer, a fifth PVOH polymer, etc. (e.g., one or more additional PVOH homopolymers or PVOH copolymers, with or without anionic monomer units). For example, the water-soluble fiber or nonwoven can include at least a third (or fourth, fifth, etc.) water-soluble polymer which is other than a PVOH polymer (e.g., other than PVOH homopolymers or PVOH copolymers, with or without anionic monomer units).

The degree of hydrolysis (DH) of the PVOH homopolymers and PVOH copolymers included in the water-soluble fibers and nonwoven webs of the present disclosure can be in a range of about 75% to about 99.9% (e.g., about 79% to about 92%, about 80% to about 90%, about 88% to 92%, about 86.5% to about 89%, or about 88%, 90% or 92% such as for cold-water soluble compositions; about 90% to about 99%, about 92% to about 99%, about 95% to about 99%, about 98% to about 99%, about 98% to about 99.9%, about 96%, about 98%, about 99%, or greater than 99%). As the degree of hydrolysis is reduced, a fiber or film made from the polymer will have reduced mechanical strength but faster solubility at temperatures below about 20° C. As the degree of hydrolysis increases, a fiber or film made from the polymer will tend to be mechanically stronger and the thermoformability will tend to decrease. The degree of hydrolysis of the PVOH can be chosen such that the water-solubility of the polymer is temperature dependent, and thus the solubility of a fiber or film made from the polymer and additional ingredients is also influenced. In one option the fiber or film is cold water-soluble. For a co-poly(vinyl acetate vinyl alcohol) polymer that does not include any other monomers (e.g., a homopolymer not copolymerized with an anionic monomer) a cold water-soluble fiber or film, soluble in water at a temperature of less than 10° C., can include PVOH with a degree of hydrolysis in a range of about 75% to about 90%, or in a range of about 80% to about 90%, or in a range of about 85% to about 90%. In another option the fiber or film is hot water-soluble. For a co-poly (vinyl acetate vinyl alcohol) polymer that does not include any other monomers (e.g., a homopolymer not copolymerized with an anionic monomer) a hot water-soluble fiber or film, soluble in water at a temperature of at least about 60° C., can include PVOH with a degree of hydrolysis of at least about 98%.

The degree of hydrolysis of the polymer blend can also be characterized by the arithmetic weighted, average degree of hydrolysis ($\overline{H}^\circ$). For example, $\overline{H}^\circ$ for a PVOH polymer that includes two or more PVOH polymers is calculated by the formula $\overline{H}^\circ = \Sigma(W_i \cdot H_1)$ where $W_i$ is the weight percentage of the respective PVOH polymer and $H_i$ is the respective degrees of hydrolysis. When a polymer is referred to as having a specific degree of hydrolysis, the polymer can be a single polyvinyl alcohol polymer having the specified degree of hydrolysis or a blend of polyvinyl alcohol polymers having an average degree of hydrolysis as specified.

The viscosity of a PVOH polymer ($\mu$) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in Centipoise (cp) should be understood to refer to the viscosity of 4% aqueous polyvinyl alcohol solution at 20° C., unless specified otherwise. Similarly, when a polymer is described as having (or not having) a particular viscosity, unless specified otherwise, it is intended that the specified viscosity is the average viscosity for the polymer, which inherently has a corresponding molecular weight distribution, i.e. the weighted natural log average viscosity as described below. It is well known in the art that the viscosity of PVOH polymers is correlated with the weight average molecular weight ($\overline{M}w$) of the PVOH polymer, and often the viscosity is used as a proxy for the $\overline{M}w$.

For reference, in a polymer blend, the first PVOH polymer is denoted as having a first 4% solution viscosity at 20° C. ($\mu_1$), and the second PVOH polymer is denoted as having a second 4% solution viscosity at 20° C. ($\mu_2$). In various embodiments, the first viscosity pi can be in a range of about 4 cP to about 70 cP (e.g., at least about 4, 8, 10, 12, or 16 cP and/or up to about 12, 16, 20, 24, 28, 30, 32, 35, 37, 40, 45, 48, 50, 56, 60, or 70 cP, such as about 4 cP to about 70 cp, about 4 cp to about 60 cp, about 4 cP to about 46 cP, about 4 cP to about 24 cP, about 10 cP to about 16 cP, or about 10 cP to about 20 cP, or about 20 cP to about 30 cP). Alternatively or additionally, the second viscosity $\mu_2$ can be in a range of about 4 cP to about 70 cP (e.g., at least about 4, 8, 10, 12, or 16 cP and/or up to about 12, 16, 20, 24, 28, 30, 32, 35, 37, 40, 45, 48, 50, 56, 60, or 70 cP, such as about 12 cP to about 30 cP, about 10 cP to about 16 cP, or about 10 cP to about 20 cP, or about 20 cP to about 30 cP). When the PVOH polymer blend includes three or more PVOH polymers selected from PVOH polymer and PVOH copolymers, the foregoing viscosity values can apply to each PVOH polymer or PVOH copolymer individually. Thus, the weight-average molecular weight of the water-soluble polymers, including the first PVOH copolymer and the second PVOH copolymer, can be in a range of about 30,000 to about 175,000, or about 30,000 to about 100,000, or about 55,000 to about 80,000, for example. When referring to average viscosity of the PVOH polymer blend, the weighted natural log average viscosity ($\overline{\mu}$) is used. The $\overline{\mu}$ for a PVOH polymer that includes two or more PVOH polymers is calculated by the formula $\overline{\mu} = e^{\Sigma W_i \cdot \ln \mu_i}$ where $\mu_i$ is the viscosity for the respective PVOH polymers.

Non-Water-Soluble Fiber Forming Materials

Fibers of the disclosure can include non-water-soluble fiber forming materials. In general, non-water-soluble fiber forming materials include any material that does not dissolve in 300 seconds or less at temperatures of 80° C. or less, as determined by MSTM-205. Suitable non-water-soluble fiber forming materials include, but are not limited to, cotton, cellulose, polyester, polyethylene (e.g., high density polyethylene and low density polyethylene), polypropylene, polycarbonate, polybutylene terephthalate, polyethylene terephthalate, polyamide, thermoplastic polyurethane, wood pulp, fluff pulp, abaca, viscose, polylactic acid, nylon 6, cellulose, starch, hemp, jute, flax, ramie, sisal, bagasse, banana fiber, lacebark, silk, sinew, catgut, wool, sea silk, mohair, angora, cashmere, collagen, actin, nylon, Dacron, rayon, bamboo fiber, modal, diacetate fiber, triacetate fiber, and combinations thereof.

In embodiments, the non-water-soluble fiber forming material comprises cotton, cellulose, hemp, jute, flax, rami, sisal, bagasse, banana fiber, lacebark, silk, sinew, catgut, wool, seamilk, mohair, angora, cashmere, collagen, actin, nylon, dacron, rayon, bamboo fiber, modal, diacetate fiber, triacetate fiber, polypropylene, polycarbonate, polybutylene terephthalate, polyethylene terephthalate, polyamide, thermoplastic polyurethane, viscose, or a combination thereof. In embodiments, the non-water-soluble fiber forming material comprises cotton, cellulose, wool, bamboo fiber, polypropylene, polycarbonate, viscose, or a combination thereof. In embodiments, the non-water-soluble fiber forming material comprises cellulose, wool, polypropylene, viscose, or a combination thereof.

Auxiliary Ingredients

The fibers of the disclosure can include other auxiliary agents and processing agents, including, but not limited to, plasticizers, plasticizer compatibilizers, surfactants, lubricants, release agents, fillers, extenders, cross-linking agents, antiblocking agents, antioxidants, detackifying agents, antifoams, liquid absorbing materials (e.g., superabsorbent polymers), exfoliates, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Specific such auxiliary agents and processing agents can be selected from those suitable for use in water-soluble fibers, or those suitable for use in water-soluble nonwoven webs.

In embodiments, the fibers of the disclosure comprise a plasticizer. A plasticizer is a liquid, solid, or semi-solid that is added to a material (usually a resin or elastomer) making that material softer, more flexible (by decreasing the glass-transition temperature of the polymer), and easier to process. A polymer can be internally plasticized by chemically modifying the polymer or monomer (e.g., grafting the plasticizer to the polymer backbone). In addition or in the alternative, a polymer can be externally plasticized by the addition of a suitable plasticizing agent to the fiber forming material. Additionally or in the alternative, a plasticizer can be added as a coating on a formed fiber or nonwoven web. Water is recognized as a very efficient plasticizer for PVOH and other polymers; including but not limited to water soluble polymers, however, the volatility of water makes its utility limited since polymer fibers, nonwoven webs, and films need to have at least some resistance (robustness) to a variety of ambient conditions including low and high relative humidity.

The plasticizer can include, but is not limited to, glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol (MPDiol®), ethanolamines, and a mixture thereof. The total amount of the non-water plasticizer provided in a fiber can be in a range of about 1 wt. % to about 45 wt. %, or about 5 wt. % to about 45 wt. %, or about 10 wt. % to about 40 wt. %, or about 20 wt. % to about 30 wt. %, about 1 wt. % to about 4 wt. %, or about 1.5 wt. % to about 3.5 wt. %, or about 2.0 wt. % to about 3.0 wt. %, for example about 1 wt. %, about 2.5 wt. %, about 5 wt. %, about 10 wt. %, about 15 wt. %, about 20 wt. %, about 25 wt. %, about 30 wt. %, about 35 wt. %, or about 40 wt. %, based on total fiber weight.

In embodiments, the fibers of the disclosure comprise a surfactant. Surfactants for use in fibers are well known in the art. Optionally, surfactants are included to aid in the dispersion of the fibers during processing, e.g., carding. Suitable surfactants for fibers of the present disclosure include, but are not limited to, dialkyl sulfosuccinates, lactylated fatty acid esters of glycerin and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerin and propylene glycol, sodium lauryl sulfate, acetylated esters of fatty acids, myristyl dimethylamine oxide, trimethyl tallow alkyl ammonium chloride, quaternary ammonium compounds, alkali metal salts of higher fatty acids containing about 8 to 24 carbon atoms, alkyl sulfates, alkyl polyethoxylate sulfates, alkylbenzene sulfonates, monoethanolamine, lauryl alcohol ethoxylate, propylene glycol, diethylene glycol, salts thereof and combinations of any of the foregoing.

Suitable surfactants can include the nonionic, cationic, anionic and zwitterionic classes. Suitable surfactants include, but are not limited to, propylene glycols, diethylene glycols, monoethanolamine, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), alkali metal salts of higher fatty acids containing about 8 to 24 carbon atoms, alkyl sulfates, alkyl polyethoxylate sulfates and alkylbenzene sulfonates (anionics), and amine oxides, N-alkylbetaines and sulfobetaines (zwitterionics). Other suitable surfactants include dioctyl sodium sulfosuccinate, lactylated fatty acid esters of glycerin and propylene glycol, lactylic esters of fatty acids, sodium alkyl sulfates, polysorbate 20, polysorbate 60, polysorbate 65, polysorbate 80, lecithin, acetylated fatty acid esters of glycerin and propylene glycol, and acetylated esters of fatty acids, and combinations thereof. Surfactants can be included in or added to the fiber forming material. In various embodiments, the amount of surfactant in the fiber is in a range of about 0.01 wt. %, to about 2.5 wt. %, about 0.1 wt. % to about 2.5 wt. %, about 1.0 wt. % to about 2.0 wt. %, about 0.01 wt % to 0.25 wt %, or about 0.10 wt % to 0.20 wt %.

In embodiments, the fibers of the disclosure are substantially free of auxiliary agents. As used herein and unless specified otherwise, "substantially free of auxiliary agents" means that the fiber includes less than about 0.01 wt %, less than about 0.005 wt. %, or less than about 0.001 wt. % of auxiliary agents, based on the total weight of the fiber.

Active Agents

In embodiments, the fibers can include one or more active agents as part of the fiber or on a surface thereof. The active agent, when present in the fiber in an amount of at least about 1 wt %, or in a range of about 1 wt % to about 99 wt %, provides additional functionality to the fiber. In embodiments, the active agent is selected from the group consisting of an enzyme, oil, flavor, colorant, odor absorber, fragrance, pesticide, fertilizer, oxidant, exfoliate, liquid absorbing material, activator, acid catalyst, metal catalyst, ion scavenger, detergent, disinfectant, surfactant, plasticizer, bleach, bleach component, fabric softener and a combination thereof. In embodiments, the active agent is selected from the group consisting of an enzyme, oil, flavor, colorant, odor absorber, fragrance, pesticide, oxidant, exfoliate, liquid absorbing material, detergent, disinfectant, surfactant, plasticizer, bleach, bleach component, fabric softener, and a combination thereof. In embodiments, the active agent is selected from the group consisting of an enzyme, oil, odor absorber, fragrance, exfoliate, liquid absorbing material, detergent, disinfectant, and a combination thereof.

In certain embodiments, the active agent may comprise an enzyme. Suitable enzymes include enzymes categorized in any one of the six conventional Enzyme Commission (EC) categories, i.e., the oxidoreductases of EC 1 (which catalyze oxidation/reduction reactions), the transferases of EC 2 (which transfer a functional group, e.g., a methyl or phosphate group), the hydrolases of EC 3 (which catalyze the hydrolysis of various bonds), the lyases of EC 4 (which cleave various bonds by means other than hydrolysis and oxidation), the isomerases of EC 5 (which catalyze isomerization changes within a molecule) and the ligases of EC 6 (which join two molecules with covalent bonds). Examples of such enzymes include dehydrogenases and oxidases in EC 1, transaminases and kinases in EC 2, lipases, cellulases, amylases, mannanases, and peptidases (a.k.a. proteases or proteolytic enzymes) in EC 3, decarboxylases in EC 4, isomerases and mutases in EC 5 and synthetases and synthases of EC 6. Suitable enzymes from each category are described in, for example, U.S. Pat. No. 9,394,092, the entire disclosure of which is herein incorporated by reference.

Enzymes for use in cleaning applications can include one or more of protease, amylase, lipase, dehydrogenase, transaminase, kinase, cellulase, mannanase, peptidase, decarboxylase, isomerase, mutase, synthetase, synthase, and oxido-reductase enzymes, including oxido-reductase enzymes that catalyze the formation of bleaching agents.

It is contemplated that an enzyme for use herein can come from any suitable source or combination of sources, for example bacterial, fungal, plant, or animal sources. In one type of embodiment, a mixture of two or more enzymes will come from at least two different types of sources. For example, a mixture of protease and lipase can come from a bacterial (protease) and fungal (lipase) sources.

Optionally, an enzyme for use herein, including but not limited to any enzyme class or member described herein, is one which works in alkaline pH conditions, e.g. for use in cleaning applications, e.g. a pH in a range of about 8 to about 11. Optionally, an enzyme for use herein, including but not limited to any enzyme class or member described herein, is one which works in a temperature in a range of about 5° C. to about 45° C.

Another class of embodiments include one or more odor absorbers as active agents. Suitable odor absorbers for use as active agents according to the disclosure include, but are not limited to, zeolites, and complex zinc salts of ricinoleic acid. The odor absorbing active agent can also comprise fixatives that are well known in the art as largely odor-neutral fragrances, including but not limited to extracts of labdanum, styrax, and derivatives of abietic acid.

Another class of embodiments include one or more fragrances as active agents. As used herein, the term fragrance refers to any applicable material that is sufficiently volatile to produce a scent. Embodiments including fragrances as active agents can include fragrances that are scents pleasurable to humans, or alternatively fragrances that are scents repellant to humans, animals, and/or insects. Suitable fragrances include, but are not limited to, fruits including, but not limited to, lemon, apple, cherry, grape, pear, pineapple, orange, strawberry, raspberry, musk and flower scents including, but not limited to, lavender-like, rose-like, iris-like and carnation-like. Optionally the fragrance is one which is not also a flavoring. Other fragrances include herbal scents including, but not limited to, rosemary, thyme, and sage; and woodland scents derived from pine, spruce and other forest smells. Fragrances may also be derived from various oils, including, but not limited to, essential oils, or from plant materials including, but not limited to, peppermint, spearmint and the like. Suitable fragrant oils can be found in U.S. Pat. No. 6,458,754, hereby incorporated by reference in its entirety. Suitable fragrant oils include, but are not limited to, 4-(2,2,6-trimethylcyclohex-1-enyl)-2-en-4-one, acetaldehyde phenyletheyl propyl acetal, 2,6,10-trimethyl-9-undecenal, hexanoic acid 2-propenyl ester, 1-octen-3-ol, trans-anethole, iso butyl (z)-2-methyl-2-butenoate, anisaldehyde diethyl acetal, 3-methyl-5-propyl-cyclohezen-1-one, 2,4-dimethyl-3-cyclohexene-1-carbaldehyde, trans-4-decenal, decanal, 2-pentylcyclopentanone, ethyl anthranilate, eugenol, 3-(3-isopropylphenyl) butanol, methyl 2-octynoate, isoeugenol, cis-3-hexenyl methyl carbonate, linalool, methyl-2-nonynonate, benzoic acid 2-hydroxymethyl ester, nonal, octanal, 2-nonennitrile, 4-nonanolide, 9-decen-1-ol, and 10-undecen-1-al. Applicable fragrances can also be found in U.S. Pat. Nos. 4,534,981, 5,112,688, 5,145,842, 6,844,302 and Perfumes Cosmetics and Soaps, Second Edition, edited by W. A. Poucher, 1959, all hereby incorporated by reference in their entireties. These fragrances include acacia, cassia, chypre, cyclamen, fern, gardenia, hawthorn, heliotrope, honeysuckle, hyacinth, jasmine, lilac, lily, magnolia, mimosa, narcissus, freshly-cut hay, orange blossom, orchids, reseda, sweet pea, clover (trefle), tuberose, vanilla, violet, wallflower, and the like.

Fragrances can include perfumes. The perfume may comprise neat perfume, encapsulated perfume, or mixtures thereof. Preferably, the perfume includes neat perfume. A portion of the perfume may be encapsulated in a core-shell encapsulate. In another type of embodiment, the perfume will not be encapsulated in a core/shell encapsulate.

As used herein, the term "perfume" encompasses the perfume raw materials (PRMs) and perfume accords. The term "perfume raw material" as used herein refers to compounds having a molecular weight of at least about 100 g/mol and which are useful in imparting an odor, fragrance, essence or scent, either alone or with other perfume raw materials. As used herein, the terms "perfume ingredient" and "perfume raw material" are interchangeable. The term "accord" as used herein refers to a mixture of two or more PRMs.

Typical PRM comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994). The PRMs are characterized by their boiling points (B.P.) measured at the normal pressure (760 mm Hg), and their octanol/water partitioning coefficient (P). Based on these characteristics, the PRMS may be categorized as Quadrant I, Quadrant II, Quadrant III, or Quadrant IV perfumes.

Applicable insect repellant fragrances include one or more of dichlorvos, pyrethrin, allethrin, naled and/or fenthion pesticides disclosed in U.S. Pat. No. 4,664,064, incorporated herein by reference in its entirety. Suitable insect repellants are citronellal (3,7-dimethyl-6-octanal), N,N-diethyl-3-methylbenzamide (DEET), vanillin, and the volatile oils extracted from turmeric (*Curcuma longa*), kaffir lime (*Citrus hystrix*), citronella grass (*Cymbopogon winterianus*) and hairy basil (*Ocimum americanum*). Moreover, applicable insect repellants can be mixtures of insect repellants.

In alternative embodiments, the active agent may optionally be an ion scavenger. Suitable ion scavengers include, but are not limited to, zeolites. Optionally, zeolites can be added to water-soluble packets comprising laundry detergents or dish washing detergents enclosed within, as a water softener.

Inorganic and organic bleaches are suitable cleaning active agents for use herein. Inorganic bleaches include perhydrate salts including, but not limited to, perborate, percarbonate, perphosphate, persulfate and persilicate salts. The inorganic perhydrate salts are normally the alkali metal salts. Alkali metal percarbonates, particularly sodium percarbonate are suitable perhydrates for use herein. Organic bleaches can include organic peroxyacids including diacyl and tetraacylperoxides, especially, but not limited to, diperoxydodecanedioc acid, diperoxytetradecanedioc acid, and diperoxyhexadecanedioc acid. Dibenzoyl peroxide is a suitable organic peroxyacid according to the disclosure. Other organic bleaches include the peroxy acids, particular examples being the alkylperoxy acids and the arylperoxy acids.

In one class of embodiments, active agents can comprise bleach activators, including organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having from 1 to 10 carbon atoms, or from 2 to 4 carbon atoms, and/or optionally substituted perbenzoic acid. Suitable substances bear O-acyl and/or N-acyl groups of the number of carbon atoms specified and/or optionally substituted benzoyl groups. Suitable substances include, but are not limited to, polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

In embodiments that comprise fabric softeners as active agents, various through-the-wash fabric softeners, especially the impalpable smectite clays of U.S. Pat. No. 4,062,647, incorporated herein by reference in its entirety, as well as other softener clays known in the art, can optionally be used to provide fabric softener benefits concurrently with fabric cleaning. Clay softeners can be used in combination with amine and cationic softeners as disclosed, for example, in U.S. Pat. Nos. 4,375,416 and 4,291,071, incorporated herein by reference in their entireties.

In embodiments, the active agent can include disinfectants. Disinfectants suitable for use herein can include, but are not limited to, hydrogen peroxide, inorganic peroxides and precursors thereof, sodium metabisulfite, quaternary ammonium cation based compounds, chlorine, activated carbon, and hypochlorite.

In embodiments, the active agent can include surfactants. Suitable surfactants for use herein can include, but are not limited to, propylene glycols, diethylene glycols, monoethanolamine, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), alkali metal salts of higher fatty acids containing about 8 to 24 carbon atoms, alkyl sulfates, alkyl polyethoxylate sulfates and alkylbenzene sulfonates (anionics), amine oxides, N-alkylbetaines and sulfobetaines (zwitterionics), dioctyl sodium sulfosuccinate, lactylated fatty acid esters of glycerin and propylene glycol, lactylic esters of fatty acids, sodium alkyl sulfates, polysorbate 20, polysorbate 60, polysorbate 65, polysorbate 80, lecithin, acetylated fatty acid esters of glycerin and propylene glycol, and acetylated esters of fatty acids, and combinations thereof.

Active agents may be solids or liquids. Active agents that are solids can have an average particle size (e.g. Dv50) of at least about 0.01 μm, or a size in a range of about 0.01 μm to about 2 mm, for example.

In embodiments, the fibers of the nonwoven webs, composite articles, flushable wipes, liquid containing articles, and absorbent articles of the disclosure include a water-soluble fiber, a non-water soluble fiber, or a combination thereof, wherein the fibers can have the same or different diameter, length, tenacity, shape, rigidity, elasticity, solubility, melting point, glass transition temperature, and/or fiber forming material.

In embodiments wherein the fiber comprises a water-soluble fiber, the water-soluble fiber can include any of the water-soluble polymer fiber forming materials disclosed herein. In general, the water-soluble fiber can comprise a single water-soluble polymer fiber forming material or a blend of water-soluble fiber forming materials. In embodiments, the water-soluble fiber consists of a single water-soluble polymer fiber forming material. In embodiments, the water-soluble fiber includes a blend of water-soluble polymers.

In embodiments, the plurality of water-soluble fibers include polyvinyl alcohol (PVOH) fiber forming materials. In a refinement of the foregoing embodiment, the water-soluble fiber forming materials include a PVOH homopolymer. In another refinement of the foregoing embodiment, the water-soluble fiber forming material includes a PVOH copolymer. In embodiments, the water-soluble fiber includes a blend of polyvinyl alcohol fiber forming materials. In a refinement of the foregoing embodiment, the water-soluble fiber includes one or more PVOH homopolymer fiber forming materials. In another refinement of the foregoing embodiment, the water-soluble fiber includes one or more PVOH copolymer fiber forming materials. In yet another refinement of the foregoing embodiment, the water-soluble polymer includes one or more PVOH homopolymer fiber forming materials and one or more PVOH copolymer fiber forming materials.

In embodiments wherein the water-soluble fiber comprises a blend of a polyvinyl alcohol homopolymer and a polyvinyl copolymer, the polyvinyl alcohol homopolymer can make up about 15 wt. % to about 70 wt. % of total weight of the water-soluble polymer blend, for example, at least about 15 wt. %, at least about 20 wt. %, at least about 25 wt. %, at least about 30 wt. %, at least about 40 wt. %, at least about 50 wt. %, or at least about 60 wt. % and up to about 70 wt. %, up to about 60 wt. %, up to about 50 wt. %, up to about 40 wt. %, or up to about 30 wt. %, based on the total weight of the water-soluble polymer blend, and can be a single homopolymer or a blend of one or more homopolymers (e.g., having a difference in viscosity and/or degree of hydrolysis). The water-soluble polyvinyl alcohol copolymer can make up about 30 wt. % to about 85 wt. % of the total weight of the water-soluble polymer blend, for example, at least about 30 wt. %, at least about 40 wt. %, at least about 50 wt. %, at least about 60 wt. %, at least about 70 wt. %, at least about 75 wt. %, or at least about 80 wt. %, and up to about 85 wt. %, up to about 80 wt. %, up to about 70 wt. %, up to about 60 wt. %, up to about 50 wt. %, or up to about 40 wt. %, based on the total weight of the water-soluble polymer blend, and can be a single copolymer or a blend of one or more copolymers. The blend can consist of a polyvinyl alcohol homopolymer and a polyvinyl alcohol copolymer. The blend can consist of a polyvinyl alcohol homopolymer and a plurality of polyvinyl alcohol copolymers. The blend can consist of more than one polyvinyl alcohol homopolymer and more than one polyvinyl alcohol copolymer.

Biodegradability

Polyvinyl alcohol polymers are generally biodegradable as they decompose in the presence of water and enzymes under aerobic, anaerobic, soil, and compost conditions (in the presence of water). In general, as the degree of hydrolysis of a polyvinyl alcohol polymer increases up to about 80%, the biodegradation activity of the polyvinyl alcohol polymer increases. Without intending to be bound by theory, it is believed that increasing the degree of hydrolysis above 80% does not appreciably affect biodegradability.

Without intending to be bound by theory, it is believed that while the degree of polymerization of the polyvinyl alcohol polymer has little to no effect on the biodegradability of a fiber or nonwoven web prepared with the polymer, the polymerization temperature may have an effect on the biodegradability of a film or nonwoven because the polymerization temperature can affect the crystallinity and aggregating status of a polymer. In particular as the crystallinity decreases, the polymer chain hydroxyl groups become less aligned in the polymer structure and the polymer chains become more disordered allowing for chains to accumulate as amorphous aggregates, thereby decreasing availability of ordered polymer structures such that the biodegradation activity is expected to decrease for soil and/or compost biodegradation mechanisms wherein the polymer is not dissolved.

Additionally, the stereoregularity of the hydroxyl groups of polyvinyl alcohol polymers has a large effect on the biodegradability activity level and the more isotactic the hydroxyl groups of the polymer sequence, the higher degradation activity becomes. Without intending to be bound by theory, it is believed that because the stereoregularity of the hydroxyl groups of polyvinyl alcohol polymers has a large effect on biodegradability activity levels, the substitution of functionalities other than hydroxyl groups (e.g., anionic AMPS functional groups, carboxylate groups, or lactone groups) is expected to decrease the biodegradability activity level, relative to a polyvinyl alcohol homopolymer having the same degree of hydrolysis, unless the functional group itself is also biodegradable, in which case biodegradability of the polymer can be increased with substitution. Further, it is believed that while the biodegradability activity level of a substituted polyvinyl alcohol can be less than that of the corresponding homopolymer, the substituted polyvinyl alcohol will still exhibit biodegradability. Further, without intending to be bound by theory, for soil and/or compost biodegradation it is believed that a nonwoven web prepared from a polyvinyl alcohol fiber will have higher biodegradation activity levels relative to a water soluble film prepared from a similar polyvinyl alcohol polymer, due to the increase in the polymer surface area provided by the nonwoven web, relative to a film.

Methods of determining biodegradation activity are known in the art. Suitable standards include OECD 301B (ready biodegradability), OECD 302B (inherent biodegradability), OECD 311(anaerobic), and ASTM D5988 (soil).

Fiber Properties

The plurality of fibers can be prepared by any process known in the art, for example, wet cool gel spinning, thermoplastic fiber spinning, melt blowing, spun bonding, electro-spinning, rotary spinning, continuous filament producing operations, tow fiber producing operations, and combinations thereof.

In embodiments, the fibers comprise water-soluble fibers prepared by wet cool gel spinning, melt blowing, spun bonding, or a combination thereof. In embodiments, the fibers comprise water-soluble fibers that are prepared by wet cool gel spinning, and are carded into nonwoven webs. In embodiments, the fibers comprise water-soluble fibers and the nonwoven webs prepared therefrom are formed in a continuous melt blown process. In embodiments, the fibers comprise water-soluble fibers and the nonwoven webs prepared therefrom are formed in a continuous spun bond process. It is standard in the art to refer to fibers and nonwoven webs by the process used to prepare the same. Thus, any reference herein to, for example, a "melt blown fiber" or a "carded nonwoven web" should not be understood to be a product-by-process limitation for a particular melt blown or carding method, but rather merely identifying a particular fiber or web. Processing terms may therefore be used to distinguish fibers and/or nonwovens, without limiting the recited fiber and/or nonwoven to preparation by any specific process.

The fibers of the disclosure can be bicomponent fibers. As used herein, and unless specified otherwise, "bicomponent fibers" do not refer to a fiber including a blend of fiber forming materials but, rather, refer to fibers including two or more distinct regions of fiber forming materials, wherein the composition of the fiber forming materials differ by region. Examples of bicomponent fibers include, but are not limited to, core/sheath bicomponent fibers, island in the sea bicomponent fibers, and side-by-side bicomponent fibers. Core/sheath bicomponent fibers generally include a core having a first composition of fiber forming materials (e.g., a single fiber forming material or a first blend of fiber forming materials) and a sheath having a second composition of fiber forming materials (e.g., a single fiber forming material that is different from the core material, or a second blend of fiber forming materials that is different from the first blend of fiber forming materials of the core). Island in the sea bicomponent fibers generally include a first, continuous, "sea" region having a first composition of fiber forming materials and discreet "island" regions dispersed therein having a second composition of fiber forming materials that is different from the first composition. Side-by-side bicomponent fibers generally include a first region running the length of the fiber and including a first composition of fiber forming materials adjacent to at least a second region running the length of the fiber and including second composition of fiber forming materials that is different from the first composition. Such bicomponent fibers are well known in the art.

The fibers of the disclosure can be hydrophobic and/or hydrophilic fibers. As used herein, and unless specified otherwise, a "hydrophobic fiber" refers to any fiber having a surface thereof that is hydrophobic. A fiber can have a hydrophobic surface when the fiber includes, for example, a hydrophobic fiber forming material, the fiber is a core/sheath type bicomponent fiber including a hydrophobic fiber forming material in the sheath, and/or the fiber has been surface treated to include a hydrophobic surfactant on the surface thereof. Similarly, as used herein, and unless specified otherwise, a "hydrophilic fiber" refers to any fiber having a surface thereof that is hydrophilic. A fiber can have a hydrophilic surface when the fiber includes, for example, a hydrophilic fiber forming material, the fiber is a core/sheath type bicomponent fiber including a hydrophilic fiber forming material in the sheath, and/or the fiber has been surface treated to include a hydrophilic material on the surface thereof. Without intending to be bound by theory, it is believed that a hydrophilic fiber of a nonwoven can facilitate capillary action/wicking of a liquid from a surface of the nonwoven, providing improved liquid acquisition relative to an identical nonwoven that does not include a hydrophilic fiber.

The fibers of the disclosure can comprise one or more of the fiber forming materials disclosed herein. When a fiber includes one PVOH polymer fiber forming material, the degree of hydrolysis of the fiber is the same as the degree of hydrolysis of the PVOH polymer. When a fiber includes two or more PVOH polymer fiber forming materials, the degree of hydrolysis of the fiber is the arithmetic weight average of the degree of hydrolysis of the individual PVOH polymers. Without intending to be bound by theory, it is believed that as the degree of hydrolysis of the fiber increases, the hydrophilicity of the fiber increases and, as a result, the wicking rate of the fiber increases. Thus, nonwoven webs including fibers having a relatively high average degree of hydrolysis can be particularly suitable for applications where the wicking rate is a primary factor, e.g., wearable articles where it is desirable to have a liquid rapidly wicked away from a consumer's skin. In embodiments wherein the wicking rate is a primary factor, the fibers of the disclosure can have a degree of hydrolysis (average) of about 95% to about 99.9%.

The shape of the fiber is not particularly limited and can have cross-sectional shapes including, but is not limited to, round, oval (also referred to as ribbon), triangular (also referred to as delta), trilobal, and/or other multi-lobal shapes. (FIG. 1). It will be understood that the shape of the fiber need not be perfectly geometric, for example, a fiber having a round cross-sectional shape need not have a perfect circle as the cross-sectional area, and a fiber having a triangular cross-sectional shape generally has rounded corners. Without intending to be bound by theory, it is believed that hydrophilic fibers in a nonwoven that have a shape providing a capillary or channel type directional passage for a liquid (e.g., a trilobal fiber) can facilitate capillary action/wicking of a liquid from a surface of the nonwoven, providing improved liquid acquisition relative to an identical nonwoven having a fiber shape that does not include a capillary or channel type direction passage.

It will be understood that the diameter of a fiber refers to the cross-section diameter of the fiber along the longest cross-sectional axis. When a fiber is described as having (or not having) a particular diameter, unless specified otherwise, it is intended that the specified diameter is the average diameter for the specific fiber type referenced, i.e., a plurality of fibers prepared from polyvinyl alcohol fiber forming material has an arithmetic average fiber diameter over the plurality of fibers. For shapes not typically considered to have a "diameter", e.g., a triangle or a multi-lobal shape, the diameter refers to the diameter of a circle circumscribing the fiber shape (FIG. 1).

The fibers of the disclosure typically have a diameter in a range of about 10 micron to 300 micron, for example, at least 10 micron, at least 15 micron, at least 20 micron, at least 25 micron, at least 50 micron, at least 100 micron, or at least 125 micron and up to about 300 micron, up to about 275 micron, up to about 250 micron, up to about 225 micron, up to about 200 micron, up to about 100 micron, up to about 50 micron, up to about 45 micron, up to about 40 micron, or up to about 35 micron for example in a range of about 10 micron to about 300 micron, about 50 micron to about 300 micron, about 100 micron to about 300 micron, about 10 micron to about 50 micron, about 10 micron to about 45 micron, or about 10 micron to about 40 micron. In embodiments, the water-soluble fibers used to prepare the water-dispersible nonwoven webs of the disclosure can have a diameter greater than 100 micron to about 300 micron. In embodiments, the fibers comprise cellulose having a diameter in a range of about 10 micron to about 50 micron, about 10 micron to about 30 micron, about 10 micron to about 25 micron, about 10 micron to about 20 micron, or about 10 micron to about 15 micron. In embodiments, the fibers comprise a water-soluble fiber forming material and have a diameter of about 50 micron to about 300 micron, about 100 micron to about 300 micron, about 150 micron to about 300 micron, or about 200 micron to about 300 micron. In embodiments, the diameters of the plurality of the water-soluble fibers used to prepare the water-dispersible nonwoven webs of the disclosure have diameters that are substantially uniform. As used herein, fiber diameters are "substantially uniform" if the variance in diameter between fibers is less than 10%, for example 8% or less, 5% or less, 2% or less, or 1% or less. Fibers having substantially uniform diameters can be prepared by a wet cooled gel spinning process or a thermoplastic fiber spinning, as described herein. Further, when a blend of fibers is used, the average diameter of the fibers can be determined using a weighted average of the individual fibers.

The fibers of the disclosure used to prepare the nonwoven webs and nonwoven composite articles of the disclosure can generally be of any length. In embodiments, the length of the fibers can be in a range of about 20 mm to about 100 mm, about 20 to about 90, about 30 mm to about 80 mm, about 10 mm to about 60 mm, or about 30 mm to about 60 mm, for example, at least about 30 mm, at least about 35 mm, at least about 40 mm, at least about 45 mm, or at least about 50 mm, and up to about 100 mm, up to about 95 mm, up to about 90 mm, up to about 80 mm, up to about 70 mm, or up to about 60 mm. In embodiments, the length of the water-soluble fibers can be less than about 30 mm or in a range of about 0.25 mm to less than about 30 mm, for example, at least about 0.25 mm, at least about 0.5 mm, at least about 0.75 mm, at least about 1 mm, at least about 2.5 mm, at least about 5 mm, at least about 7.5 mm, or at least about 10 mm and up to about 29 mm, up to about 28 mm, up to about 27 mm, up to about 26 mm, up to about 25 mm, up to about 20 mm, or up to about 15 mm. The fibers can be prepared to any length by cutting and/or crimping an extruded polymer mixture. In embodiments, the fiber can be a continuous filament, for example, prepared by processes such as spun bonding, melt blowing, electro-spinning, and rotary spinning wherein a continuous filament is prepared and provided directly into a web form. Further, when a blend of fibers is used, the average length of the fibers can be determined using a weighted average of the individual fibers.

The fibers of the disclosure can generally have any length to diameter ratio. In embodiments, length to diameter ratio of the fibers can be greater than about 2, greater than about 3, greater than about 4, greater than about 6, greater than about 10, greater than about 50, greater than about 60, greater than about 100, greater than about 200, greater than about 300, greater than about 400, or greater than about 1000.

The fibers used to prepare the nonwoven webs of the disclosure can generally have any tenacity. The tenacity of the fiber correlates to the coarseness of the fiber. In general, as the tenacity of the fiber decreases the coarseness of the fiber increases. Fibers used to prepare the nonwoven webs of the disclosure can have a tenacity in a range of about 1 to about 100 cN/dtex, or about 1 to about 75 cN/dtex, or about 1 to about 50 cN/dtex, or about 1 to about 45 cN/dtex, or about 1 to about 40 cN/dtex, or about 1 to about 35 cN/dtex, or about 1 to about 30 cN/dtex, or about 1 to about 25 cN/dtex, or about 1 to about 20 cN/dtex, or about 1 to about 15 cN/dtex, or about 1 to about 10 cN/dtex, or about 1 to about 5 cN/dtex, or about 3 to about 8 cN/dtex, or about 4 to about 8 cN/dtex, or about 6 to about 8 cN/dtex, or about 4 to about 7 cN/dtex, or about 10 to about 20, or about 10 to about 18, or about 10 to about 16, or about 1 cN/dtex, about 2 cN/dtex, about 3 cN/dtex, about 4 cN/dtex, about 5 cN/dtex, about 6 cN/dtex, about 7 cN/dtex, about 8 cN/dtex, about 9 cN/dtex, about 10 cN/dtex, about 11 cN/dtex, about 12 cN/dtex, about 13 cN/dtex, about 14 cN/dtex, or about 15 cN/dtex. In embodiments, the fibers can have a tenacity of about 3 cN/dtex to about 10 cN/dtex. In embodiments, the fibers can have a tenacity of about 7 cN/dtex to about 10 cN/dtex. In embodiments, the fibers can have a tenacity of about 4 cN/dtex to about 8 cN/dtex. In embodiments, the fibers can have a tenacity of about 6 cN/dtex to about 8 cN/dtex.

In embodiments wherein the fibers are prepared from a wet cooled gel spinning process, the resulting fibers can generally have any tenacity as described herein. In refinements of the foregoing embodiment, the fibers can have a tenacity in a range of about 3 to about 15, about 3 to about 13, about 3 cN/dtex to about 10 cN/dtex, about 5 cN/dtex to about 10 cN/dtex, or about 6 cN/dtex to about 10 cN/dtex, about 7 cN/dtex to about 10 cN/dtex, about 4 cN/dtex to about 8 cN/dtex, or about 6 cN/dtex to about 8 cN/dtex.

The fibers used to prepare the nonwoven webs of the disclosure can generally have any fineness. The fineness of the fiber correlates the fiber mass to length. The main physical unit of fiber fineness is 1 tex, which is equal to 1000 m of fiber weighing 1 g. Typically, the unit dtex is used, representing 1 g/10,000 m of fiber. The fineness of the fiber can be selected to provide a nonwoven web having suitable stiffness/hand-feel of the nonwoven web, torsional rigidity, reflection and interaction with light, absorption of dye and/or other actives/additives, ease of fiber spinning in the manufacturing process, and uniformity of the finished article. In general, as the fineness of the fibers increases the nonwovens resulting therefrom demonstrate higher uniformity, improved tensile strengths, extensibility and luster. Additionally, without intending to be bound by theory it is believed that finer fibers will lead to slower dissolution times as compared to larger fibers based on density. Further, without intending to be bound by theory, when a blend of fibers is used, the average fineness of the fibers can be determined using a weighted average of the individual fiber components. Fibers can be characterized as very fine (dtex 1.22), fine (1.22 dtex 1.54), medium (1.54 dtex 1.93), slightly coarse (1.93 dtex 2.32), and coarse (dtex 2.32). The nonwoven web of the disclosure can include fibers that are very fine, fine, medium, slightly coarse, or a combination thereof. In embodiments, the fibers have a fineness in a range of about 1 dtex to about 10 dtex, about 1 dtex to about 7 dtex, about 1 dtex to about 5 dtex, about 1 dtex to about 3 dtex, or about 1.7 dtex to about 2.2 dtex. In embodiments, fibers have a fineness of about 1.7 dtex. In embodiments, fibers have a fineness of about 2.2 dtex.

The plurality of water-soluble fibers can be prepared by any process known in the art, for example, thermoplastic fiber spinning, wet cooled gel spinning, melt blowing, spun bonding, electro-spinning, rotary spinning, continuous filament producing operations, tow fiber producing operations, and combinations thereof.

Wet Cooled Gel Spinning

In embodiments, the plurality of fibers include fibers prepared according to a wet cooled gel spinning process, the wet cooled gel spinning process including the steps of (a) dissolving the fiber forming polymer (or polymers) in solution to form a polymer mixture, the polymer mixture optionally including auxiliary agents;

(b) extruding the polymer mixture through a spinneret nozzle to a solidification bath to form an extruded polymer mixture;

(c) passing the extruded polymer mixture through a solvent exchange bath;

(d) optionally wet drawing the extruded polymer mixture; and (e) finishing the extruded polymer mixture to provide the fibers.

The solvent in which the fiber forming polymer is dissolved can suitably be any solvent in which the polymer is soluble. In embodiments, the solvent in which the polymer is dissolved includes a polar aprotic solvent. In embodiments, the solvent in which the polymer is dissolved includes dimethyl sulfoxide (DMSO).

In general, the solidification bath includes a cooled solvent for gelling the extruded polymer mixture. The solidification bath can generally be at any temperature that facilitates solidification of the extruded polymer mixture. The solidification bath can include a mixture of a solvent in which the polymer is soluble and a solvent in which the polymer is not soluble. The solvent in which the polymer is not soluble is generally the primary solvent, wherein the solvent in which the polymer is not soluble makes up greater than 50% of the mixture.

After passing through the solidification bath, the extruded polymer mixture gel can be passed through one or more solvent replacement baths. The solvent replacement baths are provided to replace the solvent in which the polymer is soluble with the solvent in which the polymer is not soluble to further solidify the extruded polymer mixture and replace the solvent in which the polymer is soluble with a solvent that will more readily evaporate, thereby reducing the drying time. Solvent replacement baths can include a series of solvent replacement baths having a gradient of solvent in which the polymer is soluble with the solvent in which the polymer is not soluble, a series of solvent replacement baths having only the solvent in which the polymer is not soluble, or a single solvent replacement bath having only the solvent in which the polymer is not soluble.

Finished fibers are sometimes referred to as staple fibers, shortcut fibers, or pulp. In embodiments, finishing includes drying the extruded polymer mixture. In embodiments, finishing includes cutting or crimping the extruded polymer mixture to form individual fibers. Wet drawing of the extruded polymer mixture provides a substantially uniform diameter to the extruded polymer mixture and, thus, the fibers cut therefrom. Drawing is distinct from extruding, as is well known in the art. In particular, extruding refers to the act of making fibers by forcing the resin mixture through the spinneret head whereas drawing refers to mechanically pulling the fibers in the machine direction to promote polymer chain orientation and crystallinity for increased fiber strength and tenacity.

In embodiments wherein the fibers are prepared from a wet cooled gel spinning process, the fiber forming polymer can be generally any fiber forming polymer or blend thereof, e.g., two or more different polymers, as generally described herein. In refinements of the foregoing embodiment, the polymer(s) can have any degree of polymerization (DP), for example, in a range of 10 to 10,000,000, for example, at least 10, at least 20, at least 50, at least 100, at least 200, at least 300, at least 400, at least 500, at least 750, or at least 1000 and up to 10,000,000, up to 5,000,000, up to 2,500,00 up to 1,000,000, up to 900,000, up to 750,000, up to 500,000, up to 250,000, up to 100,000, up to 90,000, up to 75,000, up to 50,000, up to 25,000, up to 12,000, up to 10,000, up to 5,000, or up to 2,500, for example in a range of 1000 to about 50,000, 1000 to about 25,000, 1000 to about 12,000, 1000 to about 5,000, 1000 to about 2,500, about 50 to about 12,000, about 50 to about 10,000, about 50 to about 5,000, about 50 to about 2,500, about 50 to about 1000, about 50 to about 900, about 100 to about 800, about 150 to about 700, about 200 to about 600, or about 250 to about 500. In embodiments, the DP is at least 1,000. In embodiments, the fiber forming polymer comprises a polyvinyl alcohol polymer having a DP in a range of 1000 to about 50,000, 1000 to about 25,000, 1000 to about 12,000, 1000 to about 5,000, 1000 to about 2,500, about 50 to about 12,000, about 50 to about 10,000, about 50 to about 5,000, about 50 to about 2,500, about 50 to about 1000, about 50 to about 900, about 100 to about 800, about 150 to about 700, about 200 to about 600, or about 250 to about 500. In embodiments, the fiber forming polymer comprises a polyvinyl alcohol having a DP in a range of 1000 to about 50,000, 1000 to about 25,000, 1000 to about 12,000, 1000 to about 5,000, or 1000 to about 2,500.

Thermoplastic Fiber Spinning

Thermoplastic fiber spinning is well known in the art. Briefly, thermoplastic fiber spinning includes the steps of:
(a) preparing a polymer mixture including the fiber forming polymer optionally including auxiliary agents;
(b) extruding the polymer mixture through a spinneret nozzle to form an extruded polymer mixture;
(c) optionally drawing the extruded polymer mixture; and
(d) finishing the extruded polymer mixture to provide the fibers.

The finished staple fibers of the thermoplastic fiber spinning process can be finished by drying, cutting, and/or crimping to form individual fibers. Drawing of the extruded polymer mixture mechanically pulls the fibers in the machine direction, promoting polymer chain orientation and crystallinity for increased fiber strength and tenacity. The preparing the polymer mixture for thermoplastic fiber spinning can typically include (a) preparing a solution of a fiber-forming material and a readily volatile solvent such that after extruding the solution through the spinneret when the solution is contacted with a stream of hot air, the solvent readily evaporates leaving solid fibers behind or (b) melting the polymer such that after extruding the hot polymer through the spinneret, the polymer solidifies by quenching with cool air. The thermoplastic fiber spinning method is distinct from the wet cooled gel spun method at least in that (a) in the thermoplastic fiber spinning method the extruded fibers are solidified by evaporation of the solvent or by quenching hot solid fibers with cool air, rather than by use of a solidification bath; and (b) in the wet-cool gel spun method, the optional drawing is performed while the fibers are in a gel state rather than a solid state.

Fiber forming materials for preparing fibers from a thermoplastic fiber spinning process can be generally be any fiber forming polymer or blend thereof, e.g., two or more different polymers, provided that the polymer or blend thereof has suitable solubility in a readily volatile solvent and/or have a melting point lower than and distinct from their degradation temperature. Further, when a blend of fiber forming polymers are used to make a fiber, the fiber forming materials must have similar solubility in a readily volatile solvent and/or have similar heat profiles such that the two or more fiber forming materials will melt at similar temperatures. In contrast, the fiber forming materials for preparing fibers from the wet cooled gel spinning process are not as limited and fibers can be prepared from a blend of any two or more polymers that are soluble in the same solvent system, and the solvent system need not be a single solvent or even a volatile solvent.

The fiber forming polymer(s) for preparing thermoplastic fiber spun fibers can have a degree of polymerization (DP), for example, in a range of 10 to 10,000 for example, at least 10, at least 20, at least 50, at least 100, at least 200, at least 300, at least 400, at least 500, at least 750, or at least 1000 and up to 10,000, up to 5,000, up to 2,500, up to 1,000, up to 900, up to 750, up to 500, or up to 250. In embodiments, the DP is less than 1,000.

Melt Spinning

Melt spinning is well known in the art and is understood to refer to both spun bond processes and melt blown processes. Melt spinning is a continuous process which directly prepares a nonwoven web in-line with fiber formation. As such, the melt-spun formed fibers are not finished and cut to any consistent length (e.g., staple fibers are not prepared by these processes). Additionally, melt spinning does not include a drawing step and, therefore, the only control over the diameter of the resulting melt-spun fibers is the size of the holes through which the fiber forming materials are extruded, and the polymer chains are typically not oriented in any specific direction.

Briefly, melt spinning includes the steps of:
(a) preparing a polymer mixture including the fiber forming polymer optionally including auxiliary agents;
(b) extruding the polymer mixture into a die assembly to form an extruded polymer mixture;
(c) quenching the extruded polymer mixture;
(d) depositing the quenched, extruded polymer mixture on a belt to form a nonwoven web; and
(e) bonding the nonwoven web.

In the spun bond process, the extruded polymer mixture is pumped into the die assembly as molten polymer and quenched with cold air once passed through the die assembly. In the melt blown process, the extruded polymer mixture is pumped into a die assembly having hot air blown through it and is quenched upon exiting the die assembly and coming into contact with ambient temperature air. In both processes, the fibers are continuously dropped onto a belt or drum, usually facilitated by pulling a vacuum under the belt or drum.

The diameter of spun bond fibers are generally in a range of about 0.1 to about 50 micron, for example, at least about 0.1 micron, at least about 1 micron, at least about 2 micron, at least about 5 micron, at least about 10 micron, at least about 15 micron, or at least about 20 micron and up to about 50 micron, up to about 40 micron, up to about 30 micron, up to about 25 micron, up to about 20 micron, up to about 15 micron, up to about 10 micron, about 0.1 micron to about 50 micron, about 0.1 micron to about 40 micron, about 0.1 micron to about 30 micron, about 0.1 micron to about 25 micron, about 0.1 micron to about 20 micron, about 0.1 micron to about 15 micron, about 0.1 micron to about 10 micron, about 0.1 micron to about 9 micron, about 0.1 micron to about 8 micron, about 0.1 micron to about 7 micron, about 0.1 micron to about 6 micron, about 0.1 micron to about 6 micron, about 5 micron to about 35 micron, about 5 micron to about 30 micron, about 7.5 micron to about 25 micron, about 10 micron to about 25 micron, or about 15 micron to about 25 micron. It is well known in the art that melt blown processes can provide micro-fine fibers having an average diameter in a range of about 1-10 micron, however, the melt blown process has very high variation in fiber-to-fiber diameter, e.g., 100-300% variation. Further, it is well known in the art that spun bond fibers can have larger average fiber diameters, e.g., typically about 15 to about 25 micron, but improved uniformity between fibers, e.g., about 10% variation.

The fiber forming material for heat extruded processes (e.g., melt-spun, thermoplastic fiber spinning) is more limited than for the wet-cooled gel spun process. In general, the degree of polymerization for heat extruding processes is limited to a range of about 200 to about 500. As the degree of polymerization decreases below 200, the viscosity of the fiber forming material is too low and the individual fibers prepared by pumping the material through the die assembly do not maintain adequate separation after exiting the die assembly. Similarly, as the degree of polymerization increases above 500, the viscosity is too high to efficiently pump the material through sufficiently small holes in the die assembly to run the process at high speeds, thus losing process efficiency and fiber and/or nonwoven uniformity. Further, processes requiring heating of the fiber forming material, are unsuitable for polyvinyl alcohol homopolymers as the homopolymers generally do not have the thermal stability required. Further still, it is known in that melt processable polymers are those that have a viscosity of 5 cP or less. Thus, the wet cooled gel spinning processes advantageously can provide fibers from polymers, including polyvinyl alcohol homopolymers and copolymers, having a viscosity of greater than 5 cP, which are otherwise unavailable for processing into fibers.

The wet cooled gel spinning process advantageously provides one or more benefits such as providing a fiber that includes a blend of water-soluble polymers, providing control over the diameter of the fibers, providing relatively large diameter fibers, providing control over the length of the fibers, providing control over the tenacity of the fibers, providing high tenacity fibers, providing fibers from polymers having a large degree of polymerization, and/or providing fibers which can be used to provide a self-supporting nonwoven web. Continuous processes such as spun bond, melt blown, electro-spinning and rotary spinning generally do not allow for blending of water-soluble polymers (e.g., due to difficulties matching the melt index of various polymers), forming large diameter (e.g., greater than 50 micron) fibers, controlling the length of the fibers, providing high tenacity fibers, and the use of polymers having a high degree of polymerization. Further, the wet cooled gel spinning process advantageously is not limited to polymers that are only melt processable and, therefore, can access fibers made from fiber forming materials having very high molecular weights, high melting points, low melt flow index, or a combination thereof, providing fibers having stronger physical properties and different chemical functionalities compared to fibers prepared by a heat extrusion process.

Nonwoven Web

Figure 2:
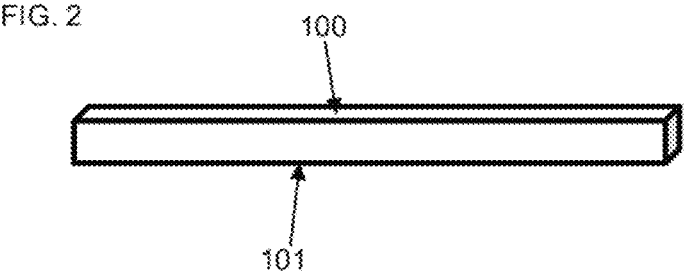
FIG. 2 is an illustration of a nonwoven web noting the exterior surfaces of the web as 100 and 101.

The nonwoven webs of the disclosure are generally sheet-like structures having two exterior surfaces, the nonwoven webs including a plurality of fibers. As used herein, and unless specified otherwise, the "exterior surface" of a nonwoven web refers to the faces of the sheet-like structure, denoted 100 and 101 in FIG. 2. A nonwoven web generally refers to an arrangement of fibers bonded to one another, wherein the fibers are neither woven nor knitted. In general, the plurality of fibers can be arranged in any orientation. In embodiments, the plurality of fibers are arranged randomly (i.e., do not have an orientation). In embodiments, the plurality of fibers are arranged in a unidirectional orientation. In embodiments, the plurality of fibers are arranged in a bidirectional orientation. In some embodiments, the plurality of fibers are multi-directional, having different arrangements in different areas of the nonwoven web. In embodiments, the nonwoven web can include a single type of water-soluble fiber. In embodiments, the nonwoven web can include a single type of non-water-soluble fiber. In embodiments, the nonwoven web can include a single type of water-soluble fiber and one or more different types of non-water-soluble fibers. In embodiments, the nonwoven web can include one or more different types of water-soluble fibers and one or more different types of non-water-soluble fibers. In embodiments, the nonwoven web can consist of or consist essentially of water-soluble fibers. In embodiments, the nonwoven web can consist of or consist essentially of non-water-soluble fibers. In some embodiments, the nonwoven web can include a single type of fiber forming material (i.e., all fibers have the same composition of fiber forming material), but can include fibers prepared by one or more fiber forming processes, e.g., wet cooled gel spinning, thermoplastic fiber spinning, melt blowing, spun bonding, or a combination thereof. In some embodiments, the nonwoven web can include a single type of fiber forming material and the fibers are made from a single fiber forming process. In some embodiments, the nonwoven web can include two or more fiber forming materials (e.g., blends of fibers having different compositions of fiber forming materials, fibers including blends of fiber forming materials, or both) and the fibers can be prepared by one or more fiber forming processes, e.g., wet-cool gel spinning, thermoplastic fiber spinning, melt blowing, spun bonding, or a combination thereof. In some embodiments, the nonwoven web can include two or more fiber forming materials and the fibers are made from a single fiber forming process. In embodiments, the fibers of the nonwoven web can have substantially the same diameters or different diameters.

In embodiments wherein the nonwoven webs of the disclosure include a blend of water-soluble fibers including a first water-soluble fiber and a second water-soluble fiber, the first and second water-soluble fibers can have a difference in diameter, length, tenacity, shape, rigidness, elasticity, solubility, melting point, glass transition temperature ($T_g$), fiber forming material, color, or a combination thereof. In embodiments wherein the nonwoven webs of the disclosure include a blend of non-water-soluble fibers including a first non-water-soluble fiber and a second non-water-soluble fiber, the first and second non-water-soluble fibers can have a difference in diameter, length, tenacity, shape, rigidness, elasticity, solubility, melting point, glass transition temperature, fiber forming material, color, or a combination thereof.

In general, the nonwoven webs can be characterized by an average degree of hydrolysis of the polyvinyl alcohol fiber forming materials used to make the fibers of the nonwoven. If the nonwoven web consists of a single fiber type, the degree of hydrolysis of the nonwoven web is the same as the degree of hydrolysis of the single fiber type. In embodiments, the nonwoven webs of the disclosure can include a blend of fibers, wherein each fiber has a different degree of hydrolysis. In such cases, the degree of hydrolysis of the nonwoven web is the arithmetic weight average of the degree of hydrolysis of the individual fiber types. In embodiments, where nonwoven webs are layered to prepare nonwoven articles, the nonwoven article has a degree of hydrolysis that is the arithmetic weight average of the degree of hydrolysis for the individual web layers. In embodiments wherein the nonwoven web or article is to be used for wicking (e.g., a wearable, where liquid is drawn away from a user's skin), the web or article can have an average degree of hydrolysis in a range of about 95-99.9%, about 96-99%, or about 97-98%. In embodiments wherein the nonwoven web or article is to be used for liquid absorptive capacity (e.g., a wipe for cleaning up spills), the web or article can have an average degree of hydrolysis in a range of about 93-97%, about 94-96%, or about 95% and, further, can be air-through bonded rather than calendar bonded. As shown in the Examples, below, when nonwoven webs having similar compositions were air-through bonded, the liquid absorptive capacity significantly increased when compared with nonwoven webs that were calendar bonded. Air-through bonded nonwoven webs included a thermoplastic fiber material at a level of 5 wt. % or less (based on the total weight of the fibers) to facilitate bonding. Without intending to be bound by theory, it is believed that the higher the level of bonding in the nonwoven web, the lower the liquid absorptive capacity. Accordingly, it is further believed that the bonding conditions can be selected to increase the liquid absorptive capacity for a nonwoven web prepared from a specified fiber type. Without intending to be bound by theory, it is believed that air-through bonding provides a more absorptive nonwoven web compared to calendar bonding, and that as the residence time for calendar bonding nonwoven webs increases, the absorptive capacity decreases.

Methods of Making Nonwoven Webs

The nonwoven webs of the disclosures can be prepared from fibers using any known methods in the art. As is known in the art, when fibers are spun bond or melt blown, the fibers are continuously laid down to form the nonwoven web, followed by bonding of the fibers.

Staple fibers can be carded or airlaid and bonded to provide a nonwoven web. Methods of carding and airlaying are well known in the art. Further, as is known in the art, because carded webs are typically stronger in the machine direction than the cross direction due to alignment of the fibers during carding, the carding process typically uses two doffer cylinders to provide a double-ply type carded web having a first ply with a first strength in the cross direction and a second ply with a second strength in the cross direction to impart additional strength to the overall carded nonwoven web in the cross direction. As used herein, and unless specified otherwise, the term "carded nonwoven web" encompasses single-ply type carded nonwoven webs as well as multi-ply type (e.g., two-ply, three-ply, and such) carded nonwoven webs. Thus, it will be understood that when such a double-ply type carded nonwoven web is used as a layer in a composite article of the disclosure, the double-ply type carded nonwoven web is considered to be a single layer. As is known in the art, air laying is similar to carding except that the fibers are blown off the cylinders onto a belt or drum with the use of vacuum, which due to the air turbulence, results in airlaid nonwovens generally having no directionality in fiber alignment. Thus, airlaid nonwovens generally have equal strengths in the machine direction and the cross direction.

Methods of bonding nonwoven webs are well known in the art. In general, bonding can include thermal, mechanical, and/or chemical bonding. Thermal bonding can include, but is not limited to calendaring, embossing, air-through, and ultra-sound. Mechanical bonding can include, but is not limited to, hydro-entangling (spunlace), needle-punching, and stitch-bonding. Chemical bonding can include, but is not limited to, solvent bonding and resin bonding.

Thermal bonding is generally achieved by applying heat and pressure, and typically maintains the pore size, shape, and alignment produced by the carding/melt-spun process. The conditions for thermal bonding can be readily determined by one of ordinary skill in the art. In general, if the heat and/or pressure applied is too low, the fibers will not sufficiently bind to form a free-standing web and if the heat and/or pressure is too high, the fibers will begin to meld together. The fiber chemistry dictates the upper and lower limits of heat and/or pressure for thermal bonding. Without intending to be bound by theory, it is believed that at temperatures above 235° C., polyvinyl alcohol based fibers degrade. Calender bonding, also referred to in the art as thermal point bonding, uses an engraved calender and smooth counter roll to provide local application of heat and pressure to form film-like reinforcing structures throughout the nonwoven. Calendering can be used with a nonwoven web formed by any of the processes disclosed herein. In general, a calendered melt-spun nonwoven web has a typical bond area of about 10-25% of the nonwoven surface and a calendared carded nonwoven web has a typical bond area of about 20% or more. Bond point arrangement can be hexagonal, rectangular, and the like, and each point of the bond pattern can be a shape such as diamonds and ellipses. It is generally recognized in the art that ellipse shaped bonds provide smoother bond areas and increased strength. Methods of embossment for thermal bonding of fibers are known. The embossing can be a one-sided embossing or a double-sided embossing. Typically, embossing of water soluble fibers includes one-sided embossing using a single embossing roll consisting of an ordered circular array and a steel roll with a plain surface. As embossing is increased (e.g., as surface features are imparted to the web), the surface area of the web is increased. Without intending to be bound by theory it is expected that as the surface are of the web is increased, the solubility of the web is increased. Accordingly, the solubility properties of the nonwoven web can be advantageously tuned by changing the surface area through embossing.

Air-through bonding generally requires a high thermoplastic content in the nonwoven web and two different melting point materials. In air-through bonding, the non-bonded nonwoven web is circulated around a drum while hot air flows from the outside of the drum toward the center of the drum. Air-through bonding can provide nonwovens having low density and higher basis weight (e.g., greater than 20 to about 2000 g/m$^2$). Nonwovens bonded by air-bonding a typically very soft.

Hydroentangling is also known in the art as spunlace or jet lace, and bonding is achieved by contacting the nonwoven with an array of high pressure water jets which physically intertwine the fibers of the nonwoven. Nonwovens bonded by hydroentangling are generally soft and drapeable, can have high elongation in the cross-direction, can have high strength in the machine direction, and are free of chemical binders and free of embossment as a result of thermal bonding.

Chemical bonding generally includes solvent bonding and resin bonding. In particular, chemical bonding typically uses a binder solution of a solvent and a resin (e.g., latex or the waste polymer left over from preparing the fibers). The nonwoven can be coated with the binder solution and heat and pressure applied to cure the binder and bond the nonwoven. The binder solution can be applied by immersing the nonwoven in a bath of binder solution, spraying the binder solution onto the nonwoven, extruding the binder solution onto the web (foam bonding), and/or applying the binder solution as a print or gravure.

Chemical bonding can result in smaller, less ordered pores relative to the pores as carded/melt-spun. Without intending to be bound by theory, it is believed that if the resin solution used for chemical bonding is sufficiently concentrated and/or sufficient pressure is applied, a nonporous water-dispersible nonwoven web can be formed. The solvent used in chemical bonding induces partial solubilization of the existing fibers in the web to weld and bond the fibers together. Thus, in general, the solvent for chemical bonding can be any solvent that can at least partially solubilize one or more fiber forming materials of the fibers of the nonwoven. In embodiments, the solvent is selected from the group consisting of water, ethanol, methanol, DMSO, glycerin, and a combination thereof. In embodiments, the solvent is selected from the group consisting of water, glycerin, and a combination thereof. In embodiments, the binder solution comprises a solvent selected from the group consisting of water, ethanol, methanol, DMSO, glycerin, and a combination thereof and further comprises a resin selected from the group consisting of polyvinyl alcohol, latex, and polyvinyl pyrrolidone. The binder provided in the solution assists in the welding process to provide a more mechanically robust web. The temperature of the polymer solution is not particularly limited and can be provided at room temperature (about 23° C.).

In some embodiments, a second layer of fibers can be used to bond the nonwoven web. In embodiments, at least one nonwoven layer of the composite articles of the disclosure are bonded using a second layer of nonwoven web/fibers. In embodiments, at least two nonwoven layers of the composite articles of the disclosure are bonded using an additional layer of nonwoven web/fibers. In embodiments, at least one nonwoven layer of the composite articles of the disclosure are bonded using thermal, mechanical, or chemical bonding, alone or in addition to bonding using an additional layer of nonwoven web/fibers.

Basis Weight/Porosity

Nonwoven webs can be characterized by basis weight. The basis weight of a nonwoven is the mass per unit area of the nonwoven. Basis weight can be modified by varying manufacturing conditions, as is known in the art. A nonwoven web can have the same basis weight prior to and subsequent to bonding. Alternatively, the bonding method can change the basis weight of the nonwoven web. For example, wherein bonding occurs through the application of heat and pressure, the thickness of the nonwoven (and, thus, the area of the nonwoven) can be decreased, thereby increasing the basis weight. Accordingly, as used herein and unless specified otherwise, the basis weight of a nonwoven refers to the basis weight of the nonwoven subsequent to bonding.

The nonwoven webs of the disclosure can generally have any basis weight in a range of about 0.1 g/m$^2$ to about 700 g/m$^2$, about 0.5 g/m$^2$ to about 600 g/m$^2$, about 1 g/m$^2$ to about 500 g/m$^2$, about 1 g/m$^2$ to about 400 g/m$^2$, about 1 g/m$^2$ to about 300 g/m$^2$, about 1 g/m$^2$ to about 200 g/m$^2$, about 1 g/m$^2$ to about 100 g/m$^2$, about 30 g/m$^2$ to about 100 g/m$^2$, about 20 g/m$^2$ to about 100 g/m$^2$, about 20 g/m$^2$ to about 80 g/m$^2$, or about 25 g/m$^2$ to about 70 g/m$^2$.

In embodiments, the nonwoven web can be carded and have a basis weight of about 5 g/m$^2$ to about 15 g/m$^2$, about 7 g/m$^2$ to about 13 g/m$^2$, about 9 g/m$^2$ to about 11 g/m$^2$, or about 10 g/m$^2$. In embodiments, the nonwoven web can be carded and can have a basis weight of 30 g/m$^2$ or more, for example in a range of 30 g/m$^2$ to about 70 g/m$^2$, about 30 g/m$^2$ to about 60 g/m$^2$, about 30 g/m$^2$ to about 50 g/m$^2$, about 30 g/m$^2$ to about 40 g/m$^2$, or about 30 g/m$^2$ to about 35 g/m$^2$. In embodiments, the nonwoven web can be melt-spun and have a basis weight in a range of about 1 g/m$^2$ to about 20 g/m$^2$, about 2 g/m$^2$ to about 15 g/m$^2$, about 3 g/m$^2$, to about 10 g/m$^2$, about 5 g/m$^2$ to about 15 g/m$^2$, about 7 g/m$^2$ to about 13 g/m$^2$, about 9 g/m$^2$ to about 11 g/m$^2$, or about 10 g/m$^2$. In embodiments, the nonwoven web can be melt-spun and can have a basis weight of about 0.1 g/m$^2$ to about 10 g/m$^2$, about 0.1 g/m$^2$ to about 8 g/m$^2$, about 0.2 g/m$^2$ to about 6 g/m$^2$, about 0.3 g/m$^2$ to about 4 g/m$^2$, about 0.4 g/m$^2$ to about 2 g/m$^2$, or about 0.5 g/m$^2$ to about 1 g/m$^2$.

Related to the basis weight is the fiber volume density and porosity of a nonwoven. Nonwoven webs, as prepared and prior to bonding, generally have a fiber density of about 30% or less by volume, i.e., for a given volume of nonwoven, 30% or less of the volume is made up of the fibers and the remaining volume is air. Thus, the nonwoven webs are generally highly porous. Fiber volume density and porosity of the nonwoven are inversely related characteristics of a nonwoven, for example, a nonwoven having a fiber volume density of about 30% by volume would have a porosity of about 70% by volume. It is well understood in the art that as the fiber volume density increases, the porosity decreases. Fiber volume density can be increased by increasing the basis weight of a nonwoven, for example, by bonding through the application of heat and pressure, potentially reducing the thickness (and, thus, the volume) of the nonwoven. Accordingly, as used herein and unless specified otherwise, the fiber volume density and porosity of a nonwoven refers to the fiber volume density and porosity of the nonwoven subsequent to bonding.

The nonwoven webs of the disclosure can generally have any porosity in a range of about 50% to about 95%, for example, at least about 50%, at least about 60%, at least about 70%, at least about 75%, or at least about 80% and up to about 95%, up to about 90%, up to about 85%, up to about 80%, up to about 75%, up to about 70%, or in a range of about 50% to about 95%, about 50% to about 80%, about 50% to about 70%, about 60% to about 75%, about 60% to about 80%, about 60% to about 90%, about 75% to about 85%, about 75% to about 90%, or about 75% to about 95%.

Pore sizes can be determined using high magnification and ordered surface analysis techniques including, but not limited to Brunauer-Emmett-Teller theory (BET), small angle X-ray scattering (SAXS), and molecular adsorption.

The nonwoven webs of the disclosure can generally have any thickness. Suitable thicknesses can include, but are not limited to, about 5 to about 10,000 μm (1 cm), about 5 to about 5,000 μm, about 5 to about 1,000 μm, about 5 to about 500 μm, about 200 to about 500 μm, about 5 to about 200 μm, about 20 to about 100 μm, or about 40 to about 90 μm, or about 50 to 80 μm, or about or about 60 to 65 μm for example 50 μm, 65 μm, 76 μm, or 88 μm. The nonwoven webs of the disclosure can be characterized as high loft or low loft. In general, loft refers to the ratio of thickness to basis weight. High loft nonwoven webs can be characterized by a high ratio of thickness to basis weight. As used herein, "high loft" refers to a nonwoven web of the disclosure having a basis weight as defined herein and a thickness exceeding 200 μm. The thickness of the nonwoven web can be determined by according to ASTM D5729-97, ASTM D5736, and ISO 9073-2:1995 and can include, for example, subjecting the nonwoven web to a load of 2 N and measuring the thickness. High loft materials can be used according to known methods in the art, for example, thru-air bonding or cross-lapping, which uses a cross-lapper to fold the unbounded web over onto itself to build loft and basis weight. Without intending to be bound by theory, in contrast to water-soluble films wherein the solubility of the film can be dependent on the thickness of the film; the solubility of a nonwoven web including water-soluble fibers is not believed to be dependent on the thickness of the web. In this regard, it is believed that because the individual fibers provide a higher surface area than a water soluble film, regardless of the thickness of the film, the parameter that limits approach of water to the fibers and, thereby, dissolution of the fibers in a water-soluble nonwoven web is the basis weight.

The water-solubility of a nonwoven web of the disclosure is generally a function of the type of fiber(s) used to prepare the web as well as the basis weight of the nonwoven web. Without intending to be bound by theory, it is believed that the solubility profile of a nonwoven web follows the same solubility profile of the fiber(s) used to prepare the nonwoven web, and the solubility profile of the fiber generally follows the same solubility profile of the fiber forming polymer(s). For example, for nonwoven webs comprising PVOH fibers, the degree of hydrolysis of the PVOH polymer can be chosen such that the water-solubility of the nonwoven web is also influenced. In general, at a given temperature, as the degree of hydrolysis of the PVOH polymer increases from partially hydrolyzed (88% DH) to fully hydrolyzed (98% DH), water solubility of the polymer generally decreases. Thus, in one option, the nonwoven web can be cold water soluble. For a co-poly(vinyl acetate vinyl alcohol) polymer that does not include any other monomers (e.g., not copolymerized with an anionic monomer) a cold water-soluble web, soluble in water at a temperature of less than 10° C., can include fibers of PVOH with a degree of hydrolysis in a range of about 75% to about 90%, or in a range of about 80% to about 90%, or in a range of about 85% to about 90%. In another option the nonwoven web can be hot water-soluble. For a co-poly(vinyl acetate vinyl alcohol) polymer that does not include any other monomers (e.g., not copolymerized with an anionic monomer) a hot water-soluble web, soluble in water at a temperature of at least about 60° C., can include fibers of PVOH with a degree of hydrolysis of at least about 98%.

Modification of PVOH generally increases the solubility of the PVOH polymer. Thus, it is expected that at a given temperature the solubility of a nonwoven web prepared from a PVOH copolymer, would be higher than that of a nonwoven web prepared from a PVOH homopolymer having the same degree of hydrolysis as the PVOH copolymer. Following these trends, a water-soluble nonwoven web having specific solubility characteristics can be designed by blending polymers within the fibers and/or fibers within the nonwoven web.

Inclusion of a non-water-soluble fiber in a nonwoven web can also be used to design a nonwoven web having specific solubility and/or delayed breakdown (e.g., when the nonwoven web is included in a flushable wipe). Without intending to be bound by theory, it is believed that as the weight percent of non-water-soluble fiber included in a nonwoven web is increased (based on the total weight of the nonwoven web), the solubility of the nonwoven web generally decreases and the stability of a wetted flushable wipe is increased, preventing breakdown while in use and maintaining the flushability of the wipe. Upon contact with water at a temperature at or above the solubility temperature of the water-soluble fiber, a nonwoven web comprising a water-soluble fiber and non-water-soluble fiber will begin to disperse as the water-soluble fiber dissolves, thereby breaking down the web structure and/or increasing the porosity of the nonwoven web. Similarly, delayed breakdown and/or dissolution of a nonwoven web of the disclosure can be achieved by using a blend of water-soluble fibers having different solubility properties and/or different solubility temperatures. In embodiments wherein the nonwoven web includes a water-soluble fiber and a non-water-soluble fiber, the ratio of soluble fiber to non-soluble fiber is not particularly limited. The water-soluble fiber can comprise about 1% to about 99%, about 20% to about 80%, about 40% to about 90%, about 50% to about 90%, or about 60% to about 90% by weight of the total weight of the fibers and the non-water-soluble fiber can comprise about 1% to about 99%, about 20% to about 80%, about 10% to about 60%, about 10% to about 50%, or about 10% to about 40% by weight of the total weight of the fibers.

Further, for a water-soluble nonwoven web, as the basis weight of the web increases the rate of dissolution of the web decreases, provided the fiber composition remains constant, as there is more material to be dissolved. For example, at a given temperature, a water-soluble nonwoven web prepared from fibers comprising PVOH polymer(s) and having a basis weight of, e.g., 40 g/m$^2$, is expected to dissolve slower than an otherwise-identical water-soluble nonwoven web having a basis weight of, e.g., 30 g/m$^2$. Accordingly, basis weight can also be used to modify the solubility characteristics of the nonwoven web. The nonwoven web can generally have any basis weight in a range of about 1 g/m$^2$ to about 700 g/m$^2$, about 1 g/m$^2$ to about 600 g/m$^2$, about 1 g/m$^2$ to about 500 g/m$^2$, about 1 g/m$^2$ to about 400 g/m$^2$, about 1 g/m$^2$ to about 300 g/m$^2$, about 1 g/m$^2$ to about 200 g/m$^2$, about 1 g/m$^2$ to about 100 g/m$^2$, about 30 g/m$^2$ to about 100 g/m$^2$, about 20 g/m$^2$ to about 100 g/m$^2$, about 20 g/m$^2$ to about 80 g/m$^2$, or about 25 g/m$^2$ to about 70 g/m$^2$.

Without intending to be bound by theory, it is believed that solubility (in terms of time to complete dissolution) of a water-soluble nonwoven web is expected to surpass that of a water soluble film of the same size (L×W) and/or mass, prepared from the same PVOH polymer. This is due to the higher surface area found in the nonwoven compared to a film, leading to faster solubilization.

Mechanical Properties

As is well understood in the art, the term machine-direction (MD) refers to the direction of web travel as the nonwoven web is produced, for example on commercial nonwoven making equipment. Likewise, the term cross-direction (CD) refers to the direction in the plane of the web perpendicular to the machine-direction. With respect to nonwoven composite articles, wipes, absorbent articles or other article comprising a nonwoven composite article of the disclosure, the terms refer to the corresponding directions of the article with respect to the nonwoven web used to produce the article.

The tenacity of the nonwoven web can be the same or different from the tenacity of the fibers used to prepare the web. Without intending to be bound by theory, it is believed that the tenacity of the nonwoven web is related to the strength of the nonwoven web, wherein a higher tenacity provides a higher strength to the nonwoven web. In general, the tenacity of the nonwoven web can be modified by using fibers having different tenacities. The tenacity of the nonwoven web may also be affected by processing. In general, the nonwoven webs of the disclosure can have relatively high tenacities, i.e., the nonwoven webs are self-supporting webs that can be used as the sole material for preparing an article and/or pouch. In embodiments, the nonwoven web is a self-supporting web. In contrast, the nonwoven webs that are prepared according to melt blowing, electro-spinning, and/or rotary spinning processes typically have low tenacities, and may not be self-supporting or capable of being used as a sole web for forming an article or pouch. Thus, in some embodiments, the nonwoven web is not self-supporting and is used in combination with a second nonwoven web.

In embodiments, the nonwoven webs of the disclosure can have a ratio of tenacity in the machine direction to the tenacity in the cross direction (MD:CD) of in a range of about 0.5 to about 1.5, about 0.75 to about 1.5, about 0.80 to about 1.25, about 0.90 to about 1.1, or about 0.95 to about 1.05, or about 1. In embodiments, the nonwoven webs of the disclosure have a tenacity ratio MD:CD of about 0.8 to about 1.25. In embodiments the nonwoven webs of the disclosure have a tenacity ratio MD:CD of about 0.9 to about 1.1. In embodiments, the nonwoven webs of the disclosure have a tenacity of about 1. Without intending to be bound by theory, it is believed that as the tenacity ratio MD:CD approaches 1, the durability of the nonwoven is increased, providing superior resistance to breakdown of the nonwoven when stress is applied to the nonwoven during use, e.g., scrubbing with a flushable wipe comprising a nonwoven web of the disclosure, or pulling/tugging on the nonwoven caused by movement while wearing a wearable absorbent article.

In general, the nonwoven webs of the disclosure have a rougher surface relative to a water-soluble film, which provides decreased contact between a surface and the nonwoven web than between a surface and the water-soluble film. Advantageously, this surface roughness provides the nonwoven web with a lower coefficient of dynamic friction and ratio of the coefficient of static friction to the coefficient of dynamic friction resulting relative to a comparable film, an improved feel to the consumer (i.e., a softer, cloth-like hand-feel instead of a rubbery hand-feel), and/or improved aesthetics (i.e., less glossy than a water-soluble film). Accordingly, the fibers should be sufficiently coarse to provide a surface roughness to the resulting nonwoven web without being so coarse as to produce drag.

Auxiliary Ingredients

The nonwoven webs of the disclosure can include auxiliary agents and/or processing agents. Auxiliary agents and processing agents, when included in the nonwoven web, can be dispersed throughout the web, e.g., between fibers, or applied to one of more surfaces of the nonwoven web. Auxiliary agents can be added to the nonwoven web during the melt-spun process, using a "co-form" process developed by Kimberly Clark, as is well known in the art. Auxiliary agents and processing agents can include, but are not limited to, plasticizers, plasticizer compatibilizers, surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Specific such auxiliary agents and processing agents can be selected from those suitable for use in water-soluble fibers, or those suitable for use in water-soluble films.

In embodiments, the nonwoven web includes a plasticizer. When included in/on the nonwoven web, the plasticizer can be, for example, any plasticizer or combination thereof described herein for use with the fibers of the disclosure. The total amount of the non-water plasticizer included can be in a range of about 1 wt. % to about 45 wt. %, or about 5 wt. % to about 45 wt. %, or about 10 wt. % to about 40 wt. %, or about 20 wt. % to about 30 wt. %, about 1 wt. % to about 4 wt. %, or about 1.5 wt. % to about 3.5 wt. %, or about 2.0 wt. % to about 3.0 wt. %, for example about 1 wt. %, about 2.5 wt. %, about 5 wt. %, about 10 wt. %, about 15 wt. %, about 20 wt. %, about 25 wt. %, about 30 wt. %, about 35 wt. %, or about 40 wt. %, based on the total weight of the nonwoven web.

In embodiments, the nonwoven web includes a surfactant. When included in/on the nonwoven web, the surfactant can be, for example, any surfactant or combination thereof described herein for use with the fibers of the disclosure. In various embodiments, the surfactant can be provided in a range of about 0.01 wt. %, to about 2.5 wt. %, about 0.1 wt. % to about 2.5 wt. %, about 1.0 wt. % to about 2.0 wt. %, about 0.01 wt % to 0.25 wt %, or about 0.10 wt % to 0.20 wt %, based on the total weight of the nonwoven web.

In embodiments, the nonwoven webs of the disclosure are substantially free of auxiliary agents. As used herein and unless specified otherwise, "substantially free of auxiliary agents" means that the nonwoven web includes less than about 0.01 wt %, less than about 0.005 wt. %, or less than about 0.001 wt. % of auxiliary agents, based on the total weight of the nonwoven web.

In embodiments, the water-dispersible nonwoven web can be colored, pigmented, and/or dyed to provide an improved aesthetic effect relative to water-soluble films. Suitable colorants can include an indicator dye, such as a pH indicator (e.g., thymol blue, bromothymol, thymolphthalein, and thymolphthalein), a moisture/water indicator (e.g., hydrochromic inks or leuco dyes), or a thermochromic ink, wherein the ink changes color when temperature increases and/or decreases. Suitable colorants include, but are not limited to a triphenylmethane dye, an azo dye, an anthraquinone dye, a perylene dye, an indigoid dye, a food, drug and cosmetic (FD&C) colorant, an organic pigment, an inorganic pigment, or a combination thereof. Examples of colorants include, but are not limited to, FD&C Red #40; Red #3; FD&C Black #3; Black #2; Mica-based pearlescent pigment; FD&C Yellow #6; Green #3; Blue #1; Blue #2; titanium dioxide (food grade); brilliant black; and a combination thereof.

When included in a water-soluble fiber, the colorant can be provided in an amount of 0.01% to 25% by weight of the water-soluble polymer mixture, such as, 0.02%, 0.05%, 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, and 24% by weight of the water-soluble polymer mixture.

Active Agents

In embodiments, the nonwoven webs of the disclosure can include an active agent. The active agent can generally be any active agent described herein for use with the fibers of the disclosure. The active agent can be added to the nonwoven web during carding of staple fibers, deposition of continuous fibers, and/or can be added to the nonwoven web prior to bonding. Active agents added to the fibers during carding or deposition can be distributed throughout the nonwoven web. Active agents can be added to the nonwoven web during the melt-spun process, using a "co-form" process developed by Kimberly Clark, as is well known in the art. Active agents added to the nonwoven web after carding or deposition and prior to or subsequent to bonding can be selectively added to one or both faces of the nonwoven web. Additionally, active agents can be added to the surface of wipes, absorbent articles, or other articles prepared from the nonwoven webs.

The active agent, when present in a nonwoven web in an amount of at least about 1 wt %, or in a range of about 1 wt % to about 99 wt %, provides additional functionality to the nonwoven web. In embodiments, the active agent is selected from the group consisting of an enzyme, oil, flavor, colorant, odor absorber, fragrance, pesticide, fertilizer, oxidant, exfoliate, liquid absorbing material, activator, acid catalyst, metal catalyst, ion scavenger, detergent, disinfectant, surfactant, plasticizer, bleach, bleach component, fabric softener and a combination thereof, as described herein. In embodiments, the active agent is selected from the group consisting of an enzyme, oil, flavor, colorant, odor absorber, fragrance, pesticide, oxidant, exfoliate, liquid absorbing material, detergent, disinfectant, surfactant, plasticizer, bleach, bleach component, fabric softener, and a combination thereof. In embodiments, the active agent is selected from the group consisting of an enzyme, oil, odor absorber, fragrance, exfoliate, liquid absorbing material, detergent, disinfectant, and a combination thereof.

Active agents may be solids or liquids. Active agents that are solids can have an average particle size (e.g. Dv50) of at least about 0.01 μm, or a size in a range of about 0.01 μm to about 2 mm, for example. Liquid active agents may be applied directly to the nonwoven web, mixed with a carrier powder, or microencapsulated. In embodiments that comprise a carrier powder, the average particle size of the carrier powder can be at least about 0.01 μm, or in a range of about 0.01 μm to about 2 mm, for example.

In one class of embodiments the active agent is encapsulated, allowing for the controlled release of the active agent. Suitable microcapsules can include or be made from one or more of melamine formaldehyde, polyurethane, urea formaldehyde, chitosan, polymethyl methacrylate, polystyrene, polysulfone, poly tetrahydrofuran, gelatin, gum arabic, starch, polyvinyl pyrrolidone, carboxymethylcellulose, hydroxyethylcellulose, methylcellulose, arabinogalactan, polyvinyl alcohol, polyacrylic acid, ethylcellulose, polyethylene, polymethacrylate, polyimide, poly (ethylenevinyl acetate), cellulose nitrate, silicones, poly(lactideco-glycolide), paraffin, carnauba, spermaceti, beeswax, stearic acid, stearyl alcohol, glyceryl stearates, shellac, cellulose acetate phthalate, zein, and combinations thereof. In one type of embodiment, the microcapsule is characterized by a mean particle size (e.g. Dv50) of at least about 0.1 micron, or in a range of about 0.1 micron to about 200 microns, for example. In alternate embodiments, the microcapsules can form agglomerates of individual particles, for example wherein the individual particles have a mean particle size of at least about 0.1 micron, or in a range of about 0.1 micron to about 200 microns.

In embodiments wherein the active agent is applied to one or more faces of a nonwoven web or to an article, the active agent can be applied by any suitable means. In a one embodiment, one or more stationary powder spray guns are used to direct an active agent powder stream towards the web or article, from one or more than one direction, while the web or article is transported through the coating zone by means of a belt conveyor. In an alternative embodiment, an article is conveyed through a suspension of an active agent powder in air. In yet another alternative embodiment the articles are tumble-mixed with the active agent powder in a trough-like apparatus. In another embodiment, which can be combined with any other embodiment, electrostatic forces are employed to enhance the attraction between the active agent powder and the article. This type of process is typically based on negatively charging the powder particles and directing these charged particles to the grounded articles. In other alternative embodiments, the active agent powder is applied to the article by a secondary transferring tool including, but not limited to rotating brushes which are in contact with the powder or by powdered gloves which can transfer the powder from a container to the article. In yet another embodiment the active agent powder is applied by dissolving or suspending the powder in a non-aqueous solvent or carrier which is then atomized and sprayed onto the nonwoven or article. In one type of embodiment, the solvent or carrier subsequently evaporates, leaving the active agent powder behind. In one class of embodiments, the active agent powder is applied to the nonwoven or article in an accurate dose. This class of embodiments utilizes closed-system dry lubricant application machinery, such as PekuTECH's powder applicator PM 700 D. In this process the active agent powder, optionally batch-wise or continuously, is fed to a feed trough of application machinery. The nonwoven webs or articles are transferred from the output belt of a standard rotary drum pouch machine onto a conveyor belt of the powder application machine, wherein a controlled dosage of the active agent is applied to the nonwoven web or article.

Liquid active agents can be applied to a nonwoven web or article, for example, by spin casting, spraying a solution such as an aerosolized solution, roll coating, flow coating, curtain coating, extrusion, knife coating, and combinations thereof.

Composite Articles

Composite articles of the disclosure include at least two layers of nonwoven webs. The composite articles of the disclosure can have a first layer of a first nonwoven web including a first plurality of fibers having a first diameter, a second layer of a second nonwoven web comprising a second plurality of fibers having a second diameter, and a first interface comprising at least a portion of the first nonwoven web and at least a portion of the second nonwoven web, wherein the portion of the first nonwoven web and the portion of the second nonwoven web are fused, and wherein the second diameter is smaller than the first diameter, and the first plurality of fibers, the second plurality of fibers, or both comprise a water-soluble polyvinyl alcohol fiber forming material. Any nonwoven layer of the composite article can include a water-soluble film laminated thereto. The water-soluble film can be prepared from any polymer described herein as water-soluble fiber forming materials.

Composite articles of the disclosure can provide one or more advantages, including but not limited to, increased mechanical strength relative to a nonwoven web identical to a single layer of the composite article alone, enhanced liquid acquisition function relative to a nonwoven web identical to a single layer of the composite article alone (e.g., for a liquid acquisition layer of a diaper, or for a spill absorbing wipe), and/or enhanced retention of fluids and/or active compositions relative to a nonwoven web identical to a single layer of the composite article alone (e.g., an active lotion for a wet wipe).

Figure 3:
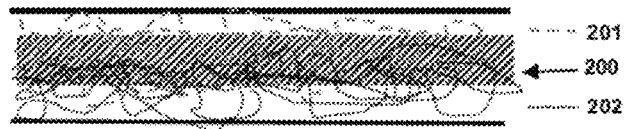
FIG. 3 shows an interface 200 where a first nonwoven web 201 overlaps with a second nonwoven web 202.

The first interface including at least a portion of the first nonwoven web and at least a portion of the second nonwoven web is the area of the composite where the first and second nonwoven webs overlap and the first plurality of fibers and the second plurality of fibers are intermingled, as depicted in FIG. 3. As shown in FIG. 3, in general, the portion of the first nonwoven web 201 that forms the first interface 200 is an exterior surface of the first nonwoven web. In embodiments, the first interface comprises 50% or less of the thickness of the first nonwoven web, 40% or less, 30% or less, 25% or less, 20% or less, 10% or less, 5% or less, 2.5% or less, or 1% or less of the thickness of the first nonwoven web. In embodiments, the first interface comprises at least 0.1%, at least 0.5%, at least 1%, or at least 5% of the thickness of the first nonwoven. In embodiments, the first interface comprises about 0.1% to about 25% of the thicknesses of the first nonwoven. In general, as shown in FIG. 3, the portion of the second nonwoven web 202 that forms the interface is an exterior surface of the second nonwoven web. In embodiments, the interface comprises 75% or less, 70% or less, 60% or less, 50% or less, 40% or less, 30% or less, 25% or less, 20% or less, or 15% or less of the thickness of the second nonwoven web. In embodiments, the first interface comprises at least 1%, at least 5%, at least 10%, at least 20%, at least 25%, at least 30%, or at least 40% of the thickness of the second nonwoven web. In embodiments, the first interface comprises from about 1% to about 75% of the thickness of the second nonwoven web.

As used herein, and unless specified otherwise, two layers of nonwoven webs are "fused" if at least a portion of the fibers from each web are bonded to fibers from the other web. As described herein, bonding of the fibers includes entangling of the fibers. The two layers of nonwoven webs can be fused using any suitable method. In embodiments, the portion of the first nonwoven web and the portion of the second nonwoven web are thermally fused, solvent fused, or both. In embodiments, the portion of the first nonwoven web and the portion of the second nonwoven web are thermally fused. Thermal fusion can include the use of heat and/or pressure. In embodiments, one or both of two discrete nonwoven webs can be heated until the fibers are soft and the webs can then be pressed together such that when the fibers cool at least a portion of fibers from each web are bonded to at least a portion of fibers from the other web. In embodiments, one or both of the first and second nonwoven webs can be melt-spun and applied in an inline process such that heated, soft fibers are applied directly to a pre-formed nonwoven web after passing through the die assembly and fuse to the fibers of the pre-formed nonwoven forming a fused interface. In embodiments, the portion of the first nonwoven web and the portion of the second nonwoven web are solvent fused. Solvent fusion can include the application of a binder solution to one or both of the nonwoven webs followed by contacting the nonwoven webs such that upon drying, at least a portion of fibers from each web are bonded to at least a portion of fibers from the other web. Solvent fusion can occur as a discrete process including two discrete pre-formed webs or can be an inline process wherein a binder solution is applied to a pre-formed nonwoven web and a second nonwoven web is formed on the pre-formed nonwoven web in a continuous process. The binder solution for solvent fusion of the nonwoven web can be any binder solution described herein for binding. As used herein, and unless specified otherwise, a "pre-formed nonwoven web" encompasses nonwoven webs formed but not bonded and nonwoven webs that have been formed and bonded. As used herein, and unless specified otherwise, a "discrete nonwoven web" encompasses nonwoven webs formed by carding or airlaying staple fibers, or by continuous processes, and the nonwoven webs may or may not be bonded. In embodiments, the fusing of two nonwoven webs can also be used to bond one or both of the nonwoven webs.

In embodiments, the first interface is solvent fused and the solvent is selected from the group consisting of water, ethanol, methanol, DMSO, glycerin, and a combination thereof. In embodiments, the first interface is solvent fused and the solvent is selected from the group consisting of water, glycerin, and a combination thereof. In embodiments, the first interface is solvent fused using a binder solution comprising polyvinyl alcohol and water, glycerin, or a combination thereof. In embodiments, the first interface is solvent fused using a binder solution comprising polyvinyl alcohol, latex, or a combination thereof and water, glycerin, or a combination thereof.

As used herein, and unless specified otherwise, an identified type of fiber has a diameter that is "smaller than" the diameter of another identified type of fiber if the average fiber diameter for the identified type of fiber is less than the average fiber diameter of the other identified type of fiber. For example, the identified type of fiber can have an overlapping diameter size distribution with another type of fiber and still have a smaller diameter as long as the average fiber diameter for the identified type of fiber is smaller than the average fiber diameter of the other type of fiber. In embodiments, the smaller fiber type has an average fiber diameter that is smaller than the smallest diameter of the diameter size distribution of the larger fiber type. A difference in diameter is present if the difference can be visualized using projection microscope imaging as outlined in ISO137: 2015. In embodiments, the difference in diameter between the smaller fiber type and the larger fiber type can be submicron, for example, if multiple melt-spun layers are used. In embodiments, the difference in the diameter between the smaller fiber type and the larger fiber type can be about 1 micron to about 300 micron, about 5 micron to about 300 micron, about 5 micron to about 250 micron, about 5 micron to about 200 micron, about 10 micron to about 150 micron, about 10 micron to about 100 micron, about 10 micron to about 90 micron, about 15 micron to about 80 micron, about 15 micron to about 70 micron, about 20 micron to about 60 micron, about 20 micron to about 50 micron, or about 25 micron to about 45 micron. In embodiments, the difference in diameter between the smaller fiber type and the larger fiber type can be about 5 micron to about 75 micron. In embodiments, the difference in diameter between the smaller fiber type and the larger fiber type can be about 20 micron to about 80 micron. Without intending to be bound by theory, it is believed that providing a composite of two nonwoven webs wherein the nonwoven webs are fused and the second nonwoven web has a fiber diameter that is smaller than the first nonwoven web advantageously can improve the adsorption/absorption rate and fluid capacity of the composite article, direct adsorption/absorption from larger diameter fibers to smaller diameter fibers to move the fluid preferentially; increase the surface to volume ratio of a nonwoven composite article as compared to single diameter materials resulting in increased loading capacity, and/or improved dispersion and/or total dissolution of the nonwoven composite article as compared to a nonwoven having a single diameter material. The average diameters of the fibers in the individual web layers can be any diameters provided herein. In embodiments, the first plurality of fibers in the first layer of first nonwoven can have a diameter of about 10 micron to about 300 micron, about 50 micron to about 300 micron, or about greater than about 100 micron to about 300 micron. In embodiments, the first plurality of fibers can have an average diameter of greater than about 100 micron to about 300 micron. In embodiments wherein a nonwoven layer of the nonwoven composite material includes a blend of fiber types having different diameters, if the distribution of fiber diameters is monomodal, the average fiber diameter refers to the average fiber diameter of the blend. The blend of fiber types can have distribution of fiber diameters in the nonwoven layer that bimodal or higher. When a blend of fibers has a bimodal or higher-modal diameter distribution, a fiber has a smaller diameter than the fibers of said blend when the fiber has an average fiber diameter less than the average for the distribution of the smallest diameter fibers of the blend, and a fiber is larger than the fibers of said blend when the fiber has an average fiber diameter that is greater than the average for the distribution of the larger diameter fibers of the blend.

In embodiments, the composite article further comprises a third layer of a third nonwoven web comprising a third plurality of fibers. In embodiments wherein the nonwoven composite article includes a third layer of a third nonwoven web, the second layer can be provided between the first layer and the third layer and at least a second portion of the second nonwoven web and at least a portion of the third nonwoven web can be fused, providing a second interface. The second interface including at least a second portion of the second nonwoven web and at least a portion of the third nonwoven web is the area of the composite where the second and third nonwoven webs overlap and the second plurality of fibers and the third plurality of fibers are intermingled. In some embodiments, and depending on the thickness of the second layer of second nonwoven web, the first plurality of fibers and the third plurality of fibers may become intermingled and/or fused such that there is no clear delineation between the first interface and the second interface. In general, the portion of the second nonwoven web that forms the second interface is an exterior surface of the second nonwoven web opposite from the exterior surface of the second nonwoven web fused to the first nonwoven web. In embodiments, the second interface comprises 75% or less, 70% or less, 60% or less, 50% or less, 40% or less, 30% or less, 25% or less, 20% or less, or 15% or less of the thickness of the second nonwoven web. In embodiments, the second interface comprises at least 1%, at least 5%, at least 10%, at least 20%, at least 25%, at least 30%, or at least 40% of the thickness of the second nonwoven web. In embodiments, the second interface comprises from about 1% to about 75% of the thickness of the second nonwoven web. In embodiments, the portion of the third nonwoven web that forms the second interface is an exterior surface of the third nonwoven web. In embodiments, the second interface comprises 50% or less of the thickness of the third nonwoven web, 40% or less, 30% or less, 25% or less, 20% or less, 10% or less, 5% or less, 2.5% or less, or 1% or less of the thickness of the first nonwoven web. In embodiments, the second interface comprises at least 0.1%, at least 0.5%, at least 1%, or at least 5% of the thickness of the third nonwoven. In embodiments, the second interface comprises about 0.1% to about 25% of the thicknesses of the third nonwoven.

In embodiments, the second portion of the second nonwoven web and the portion of the third nonwoven web are thermally fused, solvent fused, or both. In embodiments, the second portion of the second nonwoven web and the portion of the third nonwoven web are thermally fused. In embodiments, the second portion of the second nonwoven web and the portion of the third nonwoven web are solvent fused.

In embodiments, the second interface is solvent fused and the solvent is selected from the group consisting of water, ethanol, methanol, DMSO, glycerin, and a combination thereof. In embodiments, the second interface is solvent fused and the solvent is selected from the group consisting of water, glycerin, and a combination thereof. In embodiments, the second interface is solvent fused using a binder solution comprising polyvinyl alcohol and water, glycerin, or a combination thereof. In embodiments, the second interface is solvent fused using a binder solution comprising polyvinyl alcohol, latex, or a combination thereof and water, glycerin, or a combination thereof.

In embodiments, the first layer of first nonwoven web and the second layer of second nonwoven web have different porosities. As used herein, and unless specified otherwise, two nonwoven webs have "different porosities" when the difference in porosities of the nonwoven web is at least about 1%. In embodiments, the difference in porosities between two layers of nonwoven webs in the composite articles can be about 1% to about 20%. For example, one layer of nonwoven web in a composite article can have a porosity of about 80% and a second layer of nonwoven web in the composite article can have a porosity of about 85%, a 5% difference in porosity. In embodiments, the porosity of the second nonwoven web is less than the porosity of the first nonwoven web. In embodiments, the porosity of the second nonwoven web is the same as the porosity of the first nonwoven web. As used herein, and unless specified otherwise, two nonwoven webs have the "same porosity" if the difference in porosity values between the two nonwoven webs is less than 1%.

In embodiments wherein the composite article comprises a third layer of a third nonwoven web, the third nonwoven web can have a porosity that is the same or different from the first nonwoven web. In embodiments, the third nonwoven web can have the same porosity as the first nonwoven web. In embodiments, the third nonwoven web can have a different porosity than the first nonwoven web. In embodiments, the third nonwoven web can be less porous than the first nonwoven web. In embodiments, the third nonwoven web can have the same porosity as the second nonwoven web. In embodiments, the third nonwoven web can have a different porosity than the second nonwoven web. In embodiments, the third nonwoven web can be less porous than the second nonwoven web. In embodiments, the second nonwoven web can be less porous than the first nonwoven web and the third nonwoven web can be less porous than the second nonwoven web. In embodiments, the nonwoven composite article can have a gradient of porosity between the layers of nonwoven web, wherein one exterior surface of the composite structure can have the largest porosity and the other exterior surface of the composite structure can have the smallest porosity. In embodiments, the composite structure can have a gradient of porosity between the layers of nonwoven web, wherein the exterior surfaces of the composite structure can have the largest porosity and the middle layer(s) of the composite structure can have the smallest porosity. In embodiments, the composite structure can include a fourth or higher layer of nonwoven webs such that a middle layer(s) can include the second and third layers of nonwoven webs (for a four layer composite structure), or the third layer of nonwoven web (for a five layer composite structure).

Without intending to be bound by theory, it is believed that when the porosity of the composite structure comprises a gradient, the composite structure advantageously has enhanced wicking of liquid from the more porous exterior surface to the less porous exterior surface or less porous middle layer(s).

The plurality of fibers in any given nonwoven layer of the composite article can be any of the fibers disclosed herein, and can be the same or different. In embodiments, the composition of the fiber forming materials in the first plurality, second plurality, and third plurality of fibers can be the same or different, for example, having any difference in diameter, length, tenacity, shape, rigidity, elasticity, solubility, melting point, glass transition temperature ($T_g$), fiber forming material, color, or a combination thereof. The following table demonstrates contemplated composite articles where the nonwoven layers can include fibers having three different fiber compositions, wherein each letter "A", "B", and "C" refers to a specific fiber composition and "-" means that the contemplated composite article does not include a third layer of nonwoven web. Each of the fiber compositions A, B, and C can be (a) a single fiber type including a single fiber forming material, (b) a single fiber type including a blend of fiber forming materials, (c) a blend of fiber types, each fiber type including a single fiber forming material, (d) a blend of fiber types, each fiber type including a blend of fiber forming materials, or (e) a blend of fiber types, each fiber type including a single fiber forming material or a blend of fiber forming materials.

hol fiber forming material. In embodiments including a third layer of nonwoven web having a third plurality of fibers, the third plurality of fibers can include a water-soluble polyvinyl alcohol fiber forming material. In embodiments, the polyvinyl alcohol fiber forming material can be present in one or more fiber types in the plurality of fibers. The water-soluble polyvinyl alcohol fiber forming materials of any of the first plurality, second plurality, or third plurality of fibers can be any water-soluble polyvinyl alcohol fiber forming material disclosed herein. In embodiments wherein two or more of the first plurality of fibers, the second plurality of fibers, and/or the third plurality of fibers include a polyvinyl alcohol fiber forming material, the polyvinyl alcohol can be the same or different in each plurality, can be the sole fiber forming material or part of blend of fiber forming material in each plurality, and if each plurality includes a different polyvinyl alcohol fiber forming material, the difference can be in diameter, length, tenacity, shape, rigidity, elasticity, solubility, melting point, glass transition temperature ($T_g$), fiber forming material, color, or a combination thereof. In embodiments, the water-soluble polyvinyl alcohol fiber forming material includes a polyvinyl alcohol homopolymer, a polyvinyl alcohol copolymer, or a combination thereof. In embodiments, the polyvinyl alcohol includes a copolymer and the copolymer can be an anionic modified polyvinyl alcohol. In embodiments, the polyvinyl alcohol includes an anionic modified polyvinyl alcohol and the anionic modified polyvinyl alcohol includes an (alkyl)acrylate modified polyvinyl alcohol, a maleate modified polyvinyl alcohol, a sulfonate modified polyvinyl alcohol, or a combination thereof.

In embodiments, the fibers of the first plurality of fibers, the second plurality of fibers, and/or third plurality of fibers can include a water-soluble fiber forming material other than a polyvinyl alcohol fiber forming material. In embodiments, the fibers of the first plurality of fibers, the second plurality of fibers and/or the third plurality of fibers can include a blend of water-soluble fiber forming materials including a polyvinyl alcohol fiber forming material and a water-soluble fiber forming material other than a polyvinyl alcohol fiber forming material. In embodiments, water-soluble fiber forming materials other than a polyvinyl alcohol fiber forming material can include a polyacrylate, a polyvinyl pyrrolidone, a polyethyleneimine, guar gum, gum acacia, xanthan gum,

TABLE 1

| | Composite 1 | Composite 2 | Composite 3 | Composite 4 | Composite 5 | Composite 6 | Composite 7 | Composite 8 | Composite 9 | Composite 10 | Composite 11 | Composite 12 | Composite 13 | Composite 14 | Composite 15 | Composite 16 | Composite 17 | Composite 18 |
|---|---|---|---|---|---|---|---|---|---|---|---|---|---|---|---|---|---|---|
| 1$^{st}$ plurality | A | A | A | B | B | B | C | C | C | A | A | A | A | A | A | A | A | A |
| 2$^{nd}$ plurality | A | B | C | A | B | C | A | B | C | A | A | A | B | B | B | C | C | C |
| 3$^{rd}$ plurality | — | — | — | — | — | — | — | — | — | A | B | C | A | B | C | A | B | C |

| | Composite 19 | Composite 20 | Composite 21 | Composite 22 | Composite 23 | Composite 24 | Composite 25 | Composite 26 | Composite 27 | Composite 28 | Composite 29 | Composite 30 | Composite 31 | Composite 32 | Composite 33 | Composite 34 | Composite 35 | Composite 36 |
|---|---|---|---|---|---|---|---|---|---|---|---|---|---|---|---|---|---|---|
| 1$^{st}$ plurality | B | B | B | B | B | B | B | B | B | C | C | C | C | C | C | C | C | C |
| 2$^{nd}$ plurality | A | A | A | B | B | B | C | C | C | A | A | A | B | B | B | C | C | C |
| 3$^{rd}$ plurality | A | B | C | A | B | C | A | B | C | A | B | C | A | B | C | A | B | C |

In embodiments, the first plurality of fibers includes the water-soluble polyvinyl alcohol fiber forming material. In embodiments, the second plurality of fibers includes the water-soluble polyvinyl alcohol fiber forming material. In embodiments, the first plurality of fibers and the second plurality of fibers include the water-soluble polyvinyl alcocarrageenan, a water-soluble starch, a water-soluble cellulose, a cellulose ether, a cellulose ester, a cellulose amide, or a combination of the foregoing. In embodiments, the first plurality of fibers includes a water-soluble fiber forming material selected from the group consisting of polyacrylate, a polyvinyl pyrrolidone, a polyethyleneimine, guar gum, gum acacia, xanthan gum, carrageenan, a water-soluble starch, a water-soluble cellulose, a cellulose ether, a cellulose ester, a cellulose amide, and a combination of the foregoing. In embodiments, the second plurality of fibers includes a water-soluble fiber forming material selected from the group consisting of polyacrylate, a polyvinyl pyrrolidone, a polyethyleneimine, guar gum, gum acacia, xanthan gum, carrageenan, a water-soluble starch, a water-soluble cellulose, a cellulose ether, a cellulose ester, a cellulose amide, and a combination of the foregoing. In embodiments, the third plurality of fibers includes a water-soluble fiber forming material selected from the group consisting of polyacrylate, a polyvinyl pyrrolidone, a polyethyleneimine, guar gum, gum acacia, xanthan gum, carrageenan, a water-soluble starch, a water-soluble cellulose, a cellulose ether, a cellulose ester, a cellulose amide, and a combination of the foregoing.

In embodiments, the fibers of the first plurality of fibers, the second plurality of fibers, and/or third plurality of fibers can include a non-water soluble fiber forming material disclosed herein. In embodiments, the non-water-soluble fiber forming material can include cellulose, cotton, help, jute, flax, ramie, sisal, bagasse, banana fiber, lacebark, silk, sinew, catgut, wool, seamilk, mohair, angora, cashmere, collagen, actin, nylon, dacron, rayon, bamboo fiber, modal, diacetate fiber, triacetate fiber, polypropylene, polycarbonate, polybutylene terephthalate, polyethylene terephthalate, polyamide, thermoplastic polyurethane, elastic polypropylene, viscose, or a combination thereof. In embodiments, the non-water-soluble fiber forming material includes cellulose. In embodiments, the non-water-soluble fiber forming material includes include cellulose, cotton, help, jute, flax, ramie, sisal, bagasse, banana fiber, lacebark, silk, sinew, catgut, wool, seamilk, mohair, angora, cashmere, collagen, actin, nylon, dacron, rayon, bamboo fiber, modal, diacetate fiber, triacetate fiber, polypropylene, polycarbonate, polybutylene terephthalate, polyethylene terephthalate, polyamide, thermoplastic polyurethane, elastic polypropylene, viscose, or a combination thereof.

The following embodiments are contemplated for the first, second, and third plurality of fibers, and any additional plurality of fibers provided in the composite material, for example, when the composite article includes additional nonwoven layers (i.e., a fourth layer, fifth layer, etc.):

|  | Single fiber type | Blend of fiber types (single fiber forming material or blend) |
| --- | --- | --- |
| Single fiber forming material | Water-soluble PVOH | 2 or more water-soluble PVOH containing fibers |
|  | Water-soluble non-PVOH | 2 or more water-soluble non-PVOH containing fibers |
|  | Non-water soluble | 2 or more non-water-soluble material containing fibers |
| Blend of fiber forming materials | 2 or more water-soluble PVOH | 1 or more water-soluble PVOH |
|  | 2 or more water-soluble non-PVOH | containing fibers and 1 or more water-soluble non-PVOH containing fibers |
|  | 2 or more non-water-soluble | 1 or more water-soluble PVOH |
|  | 1 or more water-soluble PVOH and 1 or more water-soluble non-PVOH | containing fibers and 1 or more non-water-soluble material containing fibers |
|  | 1 or more water-soluble PVOH and 1 or more non-water-soluble | 1 or more water-soluble non-PVOH containing fibers and 1 or more non-water soluble material containing fibers |
|  | 1 or more water-soluble non-PVOH and 1 or more non-water soluble |  |

In embodiments, the first plurality of fibers includes a single type of fiber. In refinements of the foregoing embodiments, the single type of fiber includes a sole fiber forming material selected from a water-soluble polyvinyl alcohol fiber forming material, a water-soluble fiber forming material other than a polyvinyl alcohol, and a non-water soluble fiber forming material. In a further refinement, the single type of fiber includes a blend of fiber forming materials comprising two or more of a water-soluble polyvinyl alcohol fiber forming material, a water-soluble fiber forming material other than a polyvinyl alcohol, a non-water soluble fiber forming material, and a combination thereof. In embodiments, the first plurality of fibers includes a blend of fibers. In embodiments, the first plurality of fibers includes a single fiber type, the single fiber type comprising a fiber forming material selected from the group consisting of a polyvinyl alcohol homopolymer, a polyvinyl alcohol copolymer, and a combination thereof.

In embodiments, the second plurality of fibers includes a single type of fiber. In refinements of the foregoing embodiments, the single type of fiber includes a sole fiber forming material selected from a water-soluble polyvinyl alcohol fiber forming material, a water-soluble fiber forming material other than a polyvinyl alcohol, and a non-water soluble fiber forming material. In a further refinement, the single type of fiber includes a blend of fiber forming materials comprising two or more of a water-soluble polyvinyl alcohol fiber forming material, a water-soluble fiber forming material other than a polyvinyl alcohol, a non-water soluble fiber forming material, and a combination thereof. In embodiments, the second plurality of fibers includes a blend of fibers. In embodiments, the second plurality of fibers includes a single fiber type, the single fiber type comprising a water-soluble fiber forming material. In refinements of the foregoing embodiment, the water-soluble fiber forming material includes a water-soluble polyvinyl alcohol fiber forming material, a water-soluble fiber forming material other than a polyvinyl alcohol, or a combination thereof. In embodiments, the second plurality of fibers includes a single fiber type and the single fiber type includes a non-water-soluble fiber forming material. In embodiments, the second plurality of fibers includes a blend of fiber types and at least one of the blend of fiber types includes a water-soluble fiber forming material.

In embodiments, the third plurality of fibers includes a single type of fiber. In refinements of the foregoing embodiments, the single type of fiber includes a sole fiber forming material selected from a water-soluble polyvinyl alcohol fiber forming material, a water-soluble fiber forming material other than a polyvinyl alcohol, and a non-water soluble fiber forming material. In a further refinement, the single type of fiber includes a blend of fiber forming materials comprising two or more of a water-soluble polyvinyl alcohol fiber forming material, a water-soluble fiber forming material other than a polyvinyl alcohol, a non-water soluble fiber forming material, and a combination thereof. In embodiments, the third plurality of fibers includes a blend of fibers. In embodiments, the first plurality of fibers includes a single fiber type, the single fiber type comprising a fiber forming material selected from the group consisting of a polyvinyl alcohol homopolymer, a polyvinyl alcohol copolymer, and a combination thereof. In embodiments, the third plurality of fibers includes a blend of fiber types. In embodiments, the third plurality of fibers is the same as the first plurality of fibers.

In embodiments, the first plurality of fibers, the second plurality of fibers, the third plurality of fibers, or a combination thereof include a natural fiber forming material, a plant based fiber forming material, a bio-based fiber forming material, a biodegradable fiber forming material, a compostable fiber forming material, or a combination thereof.

In embodiments, the first nonwoven web has a tenacity ratio (MD:CD) of about 0.5 to about 1.5. In embodiments, the first nonwoven web has a MD:CD of about 0.8 to about 1.25. In embodiments, the first nonwoven web has a MD:CD of about 0.9 to about 1.1. In embodiments, the second nonwoven web has a tenacity ratio (MD:CD) of about 0.5 to about 1.5. In embodiments, the second nonwoven web has a MD:CD of about 0.8 to about 1.25. In embodiments, the second nonwoven web has a MD:CD of about 0.9 to about 1.1. In embodiments, the third nonwoven web has a tenacity ratio (MD:CD) of about 0.5 to about 1.5. In embodiments, the third nonwoven web has a MD:CD of about 0.8 to about 1.25. In embodiments, the third nonwoven web has a MD:CD of about 0.9 to about 1.1. In embodiments, the nonwoven composite article has a tenacity ratio (MD:CD) in a range of about 0.5 to about 1.5, about 0.8 to about 1.25, about 0.9 to about 1.1, or about 0.95 to about 1.05. In embodiments, the nonwoven composite article has a MD:CD of about 0.8 to about 1.5. In embodiments, the nonwoven composite article has a MD:CD of about 0.9 to 1.1. The MD:CD of the nonwoven composite article is related to the MD:CD ratio of each individual of layer of nonwoven web present in the composite article. Without intending to be bound by theory, it is believed that the MD:CD of the composite article cannot be determined by considering the MD and CD of each layer of nonwoven web individually, but the MD and CD of the nonwoven composite article must be measured. Without intending to be bound by theory, it is believed that as the tenacity ratio MD:CD of the nonwoven composite article approaches 1, the durability of the composite article is increased, providing superior resistance to breakdown of the nonwoven when stress is applied to the nonwoven during use. Further, without intending to be bound by theory, it is believed that the MD:CD ratio of a composite article including at least one layer of a melt-spun nonwoven web will have an MD:CD ratio closer to 1:1 than an identical composite article except including all carded layers.

In embodiments, the first plurality of fibers, second plurality of fibers, third plurality of fibers, or a combination thereof includes a bicomponent fiber. In embodiments, the first plurality of fibers includes a bicomponent fiber. In embodiments, the second plurality of fibers includes a bicomponent fiber. In embodiments, the third plurality of fibers includes a bicomponent fiber. In embodiments, the first and second plurality of fibers comprise a bicomponent fiber. In embodiments, the first and third plurality of fibers comprise a bicomponent fiber. In embodiments, the second and third plurality of fibers comprise a bicomponent fiber. In embodiments, the first, second, and third plurality of fibers comprise a bicomponent fiber. In embodiments wherein the first, second and/or third plurality of fibers comprise a bicomponent fiber, the bicomponent fiber can include a core of a fiber forming material surrounded by a sheath of a fiber forming material, wherein the sheath fiber forming material has a greater solubility in water than the core fiber forming material, for a given water temperature.

In embodiments, the first plurality of fibers, second plurality of fibers, third plurality of fibers or a combination thereof includes a plasticizer, a surfactant, or a combination thereof. In embodiments, the nonwoven composite article of the disclosure include an active agent, absorbing material, or a combination thereof. In refinements of the foregoing embodiment, the first plurality of fibers, second plurality of fibers, third plurality of fibers or a combination thereof includes the active agent, absorbing material, or combination thereof. In embodiments, the nonwoven composite article of the disclosure includes an active agent including an enzyme, oil, flavor, colorant, odor absorber, fragrance, pesticide, fertilizer, oxidant, activator, acid catalyst, metal catalyst, ion scavenger, detergent, disinfectant, surfactant, bleach, bleach component, fabric softener, or a combination thereof. In embodiments the nonwoven composite article of the disclosure includes an active agent including an enzyme, oil, colorant, odor absorber, fragrance, pesticide, oxidant, ion scavenger, detergent, disinfectant, surfactant, bleach, bleach component, fabric softener, or a combination thereof. In embodiments, the nonwoven composite article of the disclosure includes an active agent including an oil, colorant, odor absorber, fragrance, ion scavenger, disinfectant, or a combination thereof. In embodiments wherein the nonwoven composite article includes a perfume, the perfume can be encapsulated.

The layers of nonwoven web of the composite article can generally be prepared using any methods described herein. In some embodiments, the first layer of first nonwoven web can be a carded layer. In embodiments, the second layer of second nonwoven web can be a melt-spun layer. In embodiments, the first layer includes a carded layer and the second layer includes a melt-spun layer. In embodiments, the first layer can be a carded layer and the second layer can be a melt blown layer. In embodiments, the first layer can be a carded layer and the second layer can be an airlaid layer. In embodiments, the first layer can be a carded layer including fibers including polyvinyl alcohol fiber forming material and the second layer can be a melt blown layer including fibers including a low molecular weight polyvinyl alcohol homopolymer having a viscosity of about 5 cP or less. In embodiments, the first layer can be a carded layer including fibers including polyvinyl alcohol fiber forming material and the second layer can be an airlaid layer including cellulose fibers. In embodiments, the third layer can be a carded layer or a melt-spun layer. In embodiments, the third layer can be a carded layer. In embodiments, the third layer can be a melt blown layer. In embodiments, the first layer can be a carded layer, the second layer can be a melt-spun layer, and the third layer can be a carded layer. In embodiments, the first layer can be a carded layer, the second layer can be an airlaid layer, and the third layer can be a melt-spun layer.

The basis weights of the nonwoven composite articles of the disclosure are not particularly limiting and can be in a range of about 5 g/m$^2$ to about 150 g/m$^2$, about 5 g/m$^2$ to about 125 g/m$^2$, about 5 g/m$^2$ to about 100 g/m$^2$, about 5 g/m$^2$ to about 70 g/m$^2$, about 5 g/m$^2$ to about 50 g/m$^2$, about 5 g/m$^2$ to about 30 g/m$^2$. In embodiments, the nonwoven composite articles of the disclosure can have a basis weight of about 5 g/m² to about 50 g/m². In embodiments, the nonwoven composite articles of the disclosure can have a basis weight of about 50 g/m² to about 150 g/m². In embodiments, the first layer of nonwoven web can have a basis weight of about 30 g/m² to about 70 g/m² and the nonwoven composite article can have a basis weight of about 60 g/m² to about 150 g/m². In embodiments, the first layer of nonwoven web can have a basis weight of about 5 g/m² to about 15 g/m². In embodiments, the first layer of nonwoven web can have a basis weight of about 5 g/m² to about 15 g/m² and the nonwoven composite article can have a basis weight in a range of about 15 g/m² to about 50 g/m². In embodiments, the third layer of nonwoven web can have a basis weight of about 5 g/m² to about 15 g/m². In embodiments, the first layer of nonwoven web can have a basis weight of about 5 g/m² to about 15 g/m² and the third layer of nonwoven web can have a basis weight of about 5 g/m² to about 15 g/m². In embodiments, the second layer of nonwoven web can be included in the composite article in about 2.5 wt. % to about 10 wt. %, based on the total weight of the composite article. In embodiments, the second layer of nonwoven web can be included in the composite article in about 2.5 wt. % to about 10 wt. %, based on the total weight of the composite article and the first layer of nonwoven web can be included in the composite article in about 90 wt. % to about 97.5 wt. %, based on the total weight of the composite article. In embodiments, the second layer of nonwoven web can be included in the composite article in about 2.5 wt. % to about 10 wt. %, based on the total weight of the composite article and the first layer of nonwoven web and the third layer of nonwoven web together are included in an about 90 wt. % to about 97.5 wt. %, based on the total weight of the composite article. In embodiments, the third layer of nonwoven web can be included in the composite article in about 2.5 wt. % to about 10 wt. %, based on the total weight of the composite article and the first layer of nonwoven web and second layer of nonwoven web together are included in about 45 wt. % to about 48 wt. %, based on the total weight of the composite article.

In embodiments, the fiber diameters of the first plurality of fibers can be substantially uniform. In embodiments, the fiber diameters of the second plurality of fibers can be substantially uniform. In embodiments, the fiber diameters of the third plurality of fibers can be substantially uniform. In embodiments, the fiber diameters of the first plurality of fibers and third plurality of fibers can be substantially uniform. In embodiments, the fiber diameters of each of the first plurality of fibers, second plurality of fibers, and third plurality of fibers can be substantially uniform.

In general, the fibers of the first plurality, second plurality, and/or third plurality can have a tenacity of about 3 cN/dtex to about 10 cN/dtex, optionally about 3 cN/dtex to about 5 cN/dtex, about 4 cN/dtex to about 7 cN/dtex, about 7 cN/dtex to about 10 cN/dtex, about 4 cN/dtex to about 8 cN/dtex, about 5 cN/dtex to about 8 cN/dtex, or about 6 cN/dtex to about 8 cN/dtex. In embodiments, the fibers of the first plurality, second plurality, and/or third plurality can have a tenacity of 4 cN/dtex to 8 cN/dtex. In embodiments, the fibers of the first plurality, second plurality, and/or third plurality can have a tenacity of about 6 cN/dtex to about 8 cN/dtex. In embodiments, the fibers of the first plurality, second plurality, and/or third plurality can have a tenacity of about 3 cN/dtex to about 5 cN/dtex. In embodiments, the fibers of the first plurality can have a tenacity in a range of about 4 cN/dtex to about 8 cN/dtex. In embodiments wherein a plurality of fibers includes a blend of fiber types, the tenacity of the fiber blend is the arithmetic weighted average of the tenacity of each fiber type.

In embodiments, the nonwoven composite article can have an improved modulus, tensile strength, elongation, tenacity, or a combination thereof in the machine direction, cross direction, or both, relative to an identical article comprising only the first layer. In embodiments, the nonwoven composite article can have an improved modulus, tensile strength, elongation, tenacity, or a combination thereof in the machine direction, relative to an identical article comprising only the first layer. In embodiments, the nonwoven composite article can have an improved modulus, tensile strength, elongation, or a combination thereof in the cross direction, relative to an identical article comprising only the first layer. In embodiments, the nonwoven composite article can have an improved modulus, tensile strength, elongation, tenacity or a combination thereof in the machine direction and the cross direction, relative to an identical article comprising only the first layer.

Methods of Preparing Composite Articles

In general, the composite articles can be made using any process known in the art suitable for combining two or more layers of nonwoven webs such that at least a portion of the first layer and a portion of the second layer are fused, thereby forming an interface.

In embodiments, the method of forming the nonwoven composite articles of the disclosure can include the steps of: (a) depositing on a first layer including a first nonwoven web, a second layer comprising a second nonwoven web under conditions sufficient to fuse at least a portion of the first nonwoven web to at least a portion of the second nonwoven web, thereby forming a first interface; and (b) optionally, depositing on the second layer comprising the second nonwoven web, the third layer comprising the third nonwoven web under conditions sufficient to fuse at least a second portion of the second nonwoven web to at least a portion of the third nonwoven web, thereby forming a second interface.

In embodiments, steps (a) and (b) can be repeated to include additional nonwoven layers to the composite structure, e.g., a fourth nonwoven layer, a fifth nonwoven layer, etc.

In general, the conditions sufficient to fuse at least a portion of the first nonwoven web to at least a portion of the second nonwoven web and/or to fuse at least a second portion of the second nonwoven web to at least a portion of the third nonwoven web can include thermal fusion and/or solvent fusion, as described herein.

In embodiments, thermal fusion includes contacting the portion of the first nonwoven web with the portion of the second nonwoven web, the second portion of the second nonwoven web with the portion of the third nonwoven web, or both, while one of the first nonwoven web or second nonwoven web, or one of the second nonwoven web or third nonwoven web are in a heated state, such that one or more of the portions of the nonwoven webs to be fused are in a softened state. In embodiments, thermal fusion includes contacting the portion of the first nonwoven web with the portion of the second nonwoven web while the second nonwoven web is in a heated state. In embodiments, contacting the portion of the first nonwoven web with the portion of the second nonwoven web while the second nonwoven web is in a heated state includes forming the fibers of the second nonwoven web and depositing the fibers of the second nonwoven web on the first nonwoven web in an in-line process, such that the fibers of the second nonwoven web are deposited after extrusion through a die assembly, prior to cooling and/or quenching. In embodiments, thermal fusion includes contacting the second portion of the second nonwoven web with the portion of the third nonwoven web while the second nonwoven web is in a heated state. In embodiments, contacting the second portion of the second nonwoven web with the portion of the third nonwoven web while the second nonwoven web is in a heated state includes forming the fibers of the second nonwoven web and depositing the fibers of the second nonwoven web on the first nonwoven web in an in-line process, such that the fibers of the second nonwoven web are deposited after extrusion through a die assembly, prior to cooling and/or quenching, followed by depositing the third nonwoven web on the still-heated second layer of nonwoven web, prior to cooling and/or quenching of the second nonwoven web.

In embodiments, solvent fusion includes applying a solvent to the portion of the first nonwoven web, the portion of the second nonwoven web, or both, prior to depositing the second nonwoven web on the first nonwoven web, to thereby form the first interface. In embodiments, solvent fusion includes applying a solvent to the second portion of the second nonwoven web, the portion of third nonwoven web, or both, prior to depositing the third nonwoven web on the second nonwoven web to thereby form the second interface. In embodiments, solvent fusion includes applying a solvent to the portion of the first nonwoven web prior to depositing the second nonwoven web. In embodiments, solvent fusion includes applying a solvent to the second portion of the second nonwoven web prior to depositing the third nonwoven web. The solvent for solvent fusion can be any solvent or binder solution disclosed herein for solvent fusion and chemical binding. In embodiments, the portion of the first nonwoven web, the portion of the second nonwoven web, the second portion of the second nonwoven web, the portion of the third nonwoven web, or combinations of the foregoing are at least partially soluble in the solvent. In embodiments the solvent includes water, glycerin, or a combination thereof. In embodiments, solvent fusion further includes applying pressure after deposition of the second and/or third nonwoven web layers.

In embodiments of the foregoing methods, the first layer can comprise a carded nonwoven web. In embodiments of the foregoing methods, the third layer can comprise a carded nonwoven web or a melt-spun nonwoven web. In embodiments of the foregoing methods, the second layer can include a melt-spun nonwoven web or an airlaid nonwoven web. In embodiments, the first layer can include a carded nonwoven web, the second layer can include a melt-spun nonwoven web, and the third layer can include a carded nonwoven web. In embodiments, the first layer can include a carded nonwoven web, the second layer can include a melt blown nonwoven web, and the third layer can include a carded nonwoven web. In embodiments, the second layer can include an airlaid nonwoven web. In embodiments, the first layer can include a carded nonwoven web, the second layer can include an airlaid nonwoven web, and the third layer can include a melt-spun nonwoven web. In embodiments, the first layer can include a carded nonwoven web, the second layer can include an airlaid nonwoven web, and the third layer can include a melt blown nonwoven web. In embodiments, the nonwoven composite article can include five layers of nonwoven web wherein the first layer can include a carded nonwoven web, the second layer can include an airlaid nonwoven web, the third layer can include a melt-spun nonwoven web, the fourth layer can include an airlaid nonwoven web, and the fifth layer can included a carded nonwoven web. In embodiments, the nonwoven composite article can include five layers of nonwoven web wherein the first layer can include a carded nonwoven web, the second layer can include an airlaid nonwoven web, the third layer can include a melt blown nonwoven web, the fourth layer can include an airlaid nonwoven web, and the fifth layer can included a carded nonwoven web. In embodiments, the second nonwoven web can include a cellulose fiber forming material.

Flushable Wipes

Flushable wipes of the disclosure generally include a nonwoven composite article according to the disclosure.

As used herein, the term "flushable" refers to a nonwoven web, composite article or other article comprising a nonwoven web or composite article that is dispersible in aqueous environments, for example, a liquid sewage system, such that the disposal of the web(s) or article(s) does not result in the catching of such items within the pipes of a plumbing system or building up over time to cause a blockage of such a pipe. Flushable articles have the advantage of being more processable in recycling processes, or can simply be flushed in, for example, septic and municipal sewage treatment systems such that, after use, the web or article does not need to be landfilled, incinerated, or otherwise disposed of.

Flushable wipes can include a plurality of fibers, wherein the plurality of fibers can include water soluble fibers and non-water soluble fibers. The water-soluble fiber of the flushable nonwoven web can include any of the water-soluble polymers disclosed herein. In embodiments, the water-soluble fibers include polyvinyl alcohol polymer. In a refinement of the foregoing embodiment, the water-soluble fiber includes a PVOH homopolymer. In another refinement of the foregoing embodiment, the water-soluble fiber includes a PVOH copolymer. In embodiments, the water-soluble fiber includes a blend of polyvinyl alcohol polymers. In a refinement of the foregoing embodiment, the water-soluble fiber includes one or more PVOH homopolymers. In another refinement of the foregoing embodiment, the water-soluble fiber includes one or more PVOH copolymers. In yet another refinement of the foregoing embodiment, the water-soluble polymer includes one or more PVOH homopolymers and one or more PVOH copolymers.

In embodiments, the water-soluble fiber includes a blend of water-soluble polymers. In refinements of the foregoing embodiments, the blend of water-soluble polymers can include a polyvinyl alcohol polymer or a blend of polyvinyl alcohol polymers comprising a polyvinyl alcohol homopolymer, a polyvinyl alcohol copolymer, or a combination thereof. In further refinements, the water-soluble fiber can include a blend of water-soluble polymers including a polyvinyl alcohol homopolymer and a polyvinyl alcohol copolymer.

In embodiments, the water-soluble fiber includes a bicomponent fiber. In refinements of the foregoing the bicomponent fiber includes a core/sheath type fiber. Without intending to be bound by theory, it is believed that a bicomponent fiber can provide stability to the flushable wipe during storage and use due to the composition of the sheath and a readily soluble, degradable, or compostable spent article to be disposed of based on the composition of the core.

In embodiments, the flushable nonwoven web can include a plurality of water-soluble fibers including a first water-soluble fiber and a second water-soluble fiber, wherein the first and second water-soluble fibers can have a difference in diameter, length, tenacity, shape, rigidness, elasticity, solubility, melting point, glass transition temperature ($T_g$), water-soluble polymer, color, or a combination thereof.

As previously described, non-water-soluble fibers generally include fibers made of any material that does not dissolve in 300 seconds or less at temperatures of 80° C. or less, as determined by MSTM-205. Suitable non-water-soluble fiber materials include, but are not limited to, cotton, polyester, polyethylene (e.g., high density polyethylene and low density polyethylene), polypropylene, wood pulp, fluff pulp, abaca, viscose, polylactic acid, nylon 6, insoluble cellulose, insoluble starch, hemp, jute, flax, ramie, sisal, bagasse, banana fiber, lacebark, silk, sinew, catgut, wool, sea silk, mohair, angora, cashmere, collagen, actin, nylon, Dacron, rayon, bamboo fiber, modal, diacetate fiber, triacetate fiber, and combinations thereof.

The amount of water-soluble fiber in the flushable nonwoven web can range from about at least about 20, 25, 30, 40, 50, or 60 wt % and/or up to about 90, 85, 80, 75, 70, 60, 50, or 40 wt %, based on the total weight of the flushable nonwoven web, for example about 20, 25, 30, 35, 40, 45, 50, 55, 60, 65, 70, 75, 80, 85, or 90 wt %, based on the total weight of the flushable nonwoven web.

The amount of non-water-soluble fiber in the flushable nonwoven web can range from about at least about 5, 10, 15, 20, 40, 50, or 60 wt % and/or up to about 75, 70, 60, 50, 40, 30, or 25 wt %, based on the total weight of the flushable nonwoven web, for example about 5, 10, 15, 20, 25, 30, 35, 40, 45, 50, 55, 60, 65, 70 or 75 wt %, based on the total weight of the flushable nonwoven web.

The ratio of non-water-soluble fiber to water-soluble fiber in the flushable nonwoven web can range from about 1:18 to about 4:1, about 1:10 to about 3:1, about 1:5 to about 2:1, or about 1:2 to about 2:1, for example about 1:18, 1:16, 1:14, 1:12, 1:10, 1:5, 1:3, 1:2, 1:1, 2:1, 3:1, or 4:1.

Without intending to be bound by theory, for nonwoven webs containing fibers of polyvinyl alcohol only, as flushability increases, the mechanical stability decreases. Therefore, the inventors have found that by incorporating non-water soluble fibers into the nonwoven web the flushability can still increase without compromising the mechanical stability of the web.

For flushable nonwoven webs including polyvinyl alcohol, flushability increases as water-solubility increases, but water-solubility and mechanical stability have an inverse relationship. Accordingly, the selection of the particular polyvinyl alcohol, as well as any additional water-soluble and/or non-water soluble fibers can be important to maintain the mechanical integrity of the web while also having suitable flushability characteristics. For example, parameters such as DH and percent modification of a polyvinyl alcohol homopolymer or copolymer can impact the flushability and mechanical properties of the fiber.

The flushable wipes of the disclosure can include a cleaning lotion. Flushable wipes of the disclosure generally include fibers having a surface energy that is high enough to allow the fibers to be readily wet by the cleaning lotion during the wetting step of the wipe manufacturing process. Thus, in embodiments, at least a portion of at least one exterior layer of the nonwoven composite article of the flushable wipe includes a hydrophilic fiber. In embodiments, at least a portion of each exterior layer of the nonwoven composite article used to prepare the flushable wipe includes a hydrophilic fiber.

Non-limiting examples of applications for wipes include cleaning surfaces, cleaning skin, automotive uses, baby care, feminine care, hair cleansing, and removing or applying makeup, skin conditioners, ointments, sun-screens, insect repellents, medications, varnishes industrial and institutional cleaning.

Lotion Composition

The flushable wipes of the disclosure can comprise a lotion composition to wet a substrate to facilitate cleaning. In embodiments wherein the flushable wipe is a personal care wipe, the lotion composition may also include ingredients to soothe, soften, or care for the skin, to improve the feel of the lotion, to improve the removal of residues from the skin, to provide pleasant scents, and/or to prevent bacterial growth, for example.

Lotion compositions can have a pH at or near about 5.5, close to the physiological skin pH. Low pH lotion compositions can have a pH at or near about 3.8 and can be useful in cases where a wipe is being used to remove alkaline residues, such as residues from fecal matter, and help restore a healthy acidic skin pH of approximately 5 and/or render irritants from fecal matter non-irritating, as by inactivating fecal enzymes. Low pH lotions may also inhibit microbial growth. In embodiments wherein the pH of the lotion composition is about 4 or less, the fibers of the first plurality of fibers, second plurality of fibers, and/or third plurality of fibers can include a polyvinyl alcohol copolymer. The copolymer can be provided as the sole fiber forming material in a fiber of a fiber blend or as one component of a fiber forming material in a fiber including a blend of fiber forming materials. In refinements of the foregoing embodiment, the fibers can include a blend of polyvinyl alcohol copolymers and homopolymers. The polyvinyl alcohol copolymers and homopolymers can be provided in a ratio of about 1:1 to about 4:1. In further refinements of the foregoing embodiments, the polyvinyl alcohol copolymer containing fibers can be blended with non-water-soluble fibers.

Lotion compositions can comprise a superwetter, a rheology modifier, an emollient and/or an emulsifier. The superwetter can be present in an amount of about 0.01% to 0.2% by weight of the superwetter to the total weight of the lotion composition. The superwetter can be selected from the group consisting of trisiloxanes, polyether dimethicones wherein the polyether functionality is PEG, PPG, or a mixture thereof, and a mixture of the foregoing.

The rheology modifier can be present in an amount of about 0.01% to 0.5% by weight of the rheology based on the total weight of the lotion composition. The rheology modifier can be selected from the group consisting of xanthan gum, modified xanthan gum, and a combination thereof.

The emollient, if present, may be a thickening emollient. Suitable emollients include, but are not limited to, PEG-10 sunflower oil glycerides, sunflower oil, palm oil, olive oil, emu oil, babassu oil, evening primrose oil, palm kernel oil, cod liver oil, cottonseed oil, jojoba oil, meadowfoam seed oil, sweet almond oil, canola oil, soybean oil, avocado oil, safflower oil, coconut oil, sesame oil, rice bran oil, grape seen oil, mineral oil, isopropyl stearate, isostearyl isononanoate, diethylhexyl fumarate, diisostearyl malate, triisocetyl citrate, stearyl stearate, methyl palmitate, methylheptyl isostearate, petrolatum, lanolin oil and lanolin wax, long chain alcohols like cetyl alcohol, stearyl alcohol, behenyl alcohol, isostearyl alcohol, and 2-hexyl-decanol, myristyl alcohol, dimethicone fluis of various molecular weights and mixtures thereof, PPG-15 stearyl ether (also known as arlatone E), shea butter, olive butter, sunflower butter, coconut butter, jojoba butter, cocoa butter, squalene and squalene, isoparaffins, polyethylene glycols of various molecular weights, polypropylene glycols of various molecular weights, or mixtures thereof.

The emulsifier, if present, may be solid at room temperature. Suitable emulsifiers include, but are not limited to, laureth-23, ceteth-2, ceteth-10, ceteth-20, ceteth-21, ceteareth-20, steareth-2, steareth-10, steareth-20, oleth-2, oleth-10, oleth-20, steareth-100, steareth-21, PEG-40 sorbitan peroleate, PEG-8 stearate, PEG-40 stearate, PEG-50 stearate, PEG-100 stearate, sorbitan laurate, sorbitan palmitate, sorbitan stearate, sorbitan tristearate, sorbitan oleate, sorbitan trioleate, polysorbate 20, polysorbate 21, polysorbate 40, polysorbate 60, polysorbate 61, polysorbate 65, polysorbate 80, polysorbate 81, polysorbate 85, PEG-40 hydrogenated castor oil, citric acid ester, microcrystalline wax, paraffin wax, beeswax, carnauba wax, ozokerite wax, cetyl alcohol, stearyl alcohol, cetearyl alcohol, myristyl alcohol, behenyl alcohol, and mixtures thereof.

In embodiments, the cleaning lotion includes an aqueous emulsion including an emollient and an emulsifier.

The cleaning lotion can further comprise humectants including, but not limited to glycerin, propylene glycol, and phospholipids; fragrances such as essential oils and perfumes as described herein; preservatives; enzymes; colorants; oil absorbers; pesticides; fertilizer; activators; acid catalysts; metal catalyst; ion scavengers; detergents; disinfectants; surfactants; bleaches; bleach components; and fabric softeners. In embodiments, the cleaning lotion includes a fragrance, preservative, enzyme, colorant, oil absorber, pesticide, ion scavenger, detergent, disinfectant, or a combination thereof.

Preservatives prevent the growth of micro-organisms in the liquid lotion, the flushable wipe, and/or the substrate on which the wipe is used. Preservatives can be hydrophobic or hydrophilic. Suitable preservatives include, but are not limited to parabens, such as methyl parabens, propyl parabens, alkyl glycinates, iodine derivatives and combinations thereof.

The lotion load can be between 150% and 480%. As used herein, "load" refers to combining a nonwoven composite article with a lotion composition, i.e., a lotion composition is loaded onto or into a nonwoven composite article, without regard to the method used to combine the nonwoven composite article with the lotion composition, i.e., immersion, spraying, kissrolling, etc. A "lotion load" refers to the amount of lotion loaded onto or into a nonwoven composite article, and is expressed as weight of the lotion to weight of the dry (unloaded) nonwoven composite article, as a percentage. It may be desirable for the flushable wipe to be loaded with lotion to a degree that some of the lotion can be easily transferred to a substrate (e.g., skin or another surface to be cleaned) during use. The transfer may facilitate cleaning, provide a pleasant sensation for a user (such as a smooth skin feeling or coolness from evaporation), and/or allow for the transfer of compounds to provide beneficial functions on substrate.

The flushable wipes can be nonwoven composite articles having a high density of intersitital spaces between the fibers making up the wipe. In order to maintain enough lotion available on the surface of a wipe to transfer to the substrate, much of the interstitial space in the wipe can be filled with lotion. The lotion in the interstitial space may not be readily available for transfer to a substrate, such that excess lotion can be loaded into the wipe in an amount sufficient to signal to the user that the lotion is available for transfer to a substrate, for example, by providing an adequate sense of wetness. Advantageously, nonwoven composite articles used in the flushable wipes can have a gradient of porosity as described herein, which can facilitate loading of the lotion to the wipe.

The flushable wipe can be made by wetting a nonwoven composite article with at least 1 gram of liquid cleaning lotion per gram of dry fibrous composite. Suitable methods of delivering the cleaning lotion to the substrate include but are not limited to submersion, spraying, padding, extrusion coating and dip coating. After wetting, the wetted composite article can be folded, stacked, cut to length, and packaged as desired. The flushable wipes are generally of sufficient dimension to allow for a convenient handling while being small enough to be easily disposed to the sewage system. The wetted composite article can be cut or folded to such dimensions during the manufacturing process or can be larger in size and having a means such as perforations to allow individual wipes to be separated from the web, in a desired size, by a user.

In general, the nonwoven composite article of the disclosure can be used in a flushable wipe. In embodiments, the flushable wipes of the disclosure comprise a nonwoven composite article of the disclosure and a cleaning lotion. In embodiments, the flushable wipes of the disclosure consist of a nonwoven composite article of the disclosure and a cleaning lotion.

Absorbent Articles

The nonwoven webs and nonwoven composite articles of the disclosure can be used as a liquid acquisition layer for absorbent articles. The absorbent articles can include bibs, breast pads, care mats, cleaning pads (e.g. floor cleaning pads), diapers, diaper pants, incontinence liners, pads, and other articles (e.g. adult incontinence diapers, adult incontinence pads, adult incontinence pants, potty training liners, potty training pads, potty training pants, and pet training pads e.g. puppy pads), interlabial devices, menstrual pads, panty liners, sanitary napkins, tampons, spill absorbing mats, spill absorbing pads, spill absorbing rolls, wound dressings, and the like. In one aspect, any of the foregoing articles can be disposable items. The term "disposable" refers to articles which are designed or intended to be discarded after a single use. That is, disposable articles are not intended to be laundered or otherwise restored or reused, and in embodiments may be incapable of laundering, restoration or reuse.

As used herein, the term "absorbent article" includes articles which absorb and contain body exudates. The term "absorbent article" is intended to include diapers, incontinent articles, sanitary napkins, and the like. The term "incontinent articles" is intended to include pads, undergarments (pads held in place by a suspension system of some type, such as a belt, or the like), inserts for absorbent articles, capacity boosters for absorbent articles, briefs, bed pads, and the like, regardless of whether they be worn by adults or other incontinent persons. At least some of such absorbent articles are intended for the absorption of body liquids, such as menses or blood, vaginal discharges, urine, sweat, breast milk, and fecal matter.

As used herein "diapers" refers to devices which are intended to be placed against the skin of a wearer to absorb and contain the various exudates discharged from the body. Diapers are generally worn by infants and incontinent persons about the lower torso so as to encircle the waist and legs of the wearer. Examples of diapers include infant or adult diapers and pant-like diapers such as training pants. "Training pant", as used herein, refers to disposable garments having a waist opening and leg openings designed for infant or adult wearers. A pant may be placed in position on the wearer by inserting the wearer's legs into the leg openings and sliding the pant into position about a wearer's lower torso. A pant may be pre-formed by any suitable technique including, but not limited to, joining together portions of the article using refastenable and/or non-refastenable bonds (e.g., seam, weld, adhesive, cohesive bond, fastener, etc.). A pant may be pre-formed anywhere along the circumference of the article (e.g., side fastened, front waist fastened).

Absorbent articles of the disclosure will typically comprise a liquid pervious topsheet, a liquid impervious backsheet joined to the topsheet, and a liquid acquisition layer and an absorbent core between the topsheet and backsheet. In embodiments wherein the absorbent article is a wearable article (e.g., incontinent articles, sanitary napkins, and the like), the article can have a wearer facing side and an outer facing side. In general, the liquid pervious topsheet is on the wearer facing side and the liquid impervious backsheet is on the outer facing side of the absorbent article. The absorbent core is generally a sheet like structure and, when provided as a wearable, has a wearer facing side and an outer facing side.

In general, the liquid pervious topsheet can be any liquid pervious topsheet known in the art. For a wearable article, the topsheet can be fully or partially elasticized or can be foreshortened to provide a void space between the topsheet and the absorbent core. In general, the liquid impervious backsheet can be any liquid impervious backsheet known in the art. The backsheet prevents exudates absorbed by the absorbent core and contained within the article form contacting any substrate the absorbent article may be in contact with. The backsheet can be impervious to liquids and include a laminate of a nonwoven and a thin plastic film, such as a thermoplastic film. Suitable backsheet films include those manufactured by Tredegar Industries Inc. of Terre Haute, Ind. and sold under the trade names X15306, X10962, and X10964. Other suitable backsheet materials can include breathable materials that permit vapors to escape from the absorbent article, while still preventing liquid from passing through the backsheet. Exemplary breathable materials can include materials such as woven webs, nonwoven webs, and composite materials such as manufactured by Mitsui Toatsu Col, of Japan under the designation ESPOIR NO and by EXXON Chemical Co., of Bay City, Tex., under the designation EXXAIRE.

The absorbent core is disposed between the topsheet and the backsheet. The absorbent core can comprise any absorbent material that is generally capable of absorbing and retaining liquids such as urine and other body exudates. The absorbent core can include a wide variety of liquid-absorbent materials commonly used in disposable diapers and other absorbent articles such as super absorbent polymer, comminuted wood pulp (air felt), creped cellulose wadding; absorbent foams, absorbent sponges, absorbent gelling materials, or any other known absorbent material or combinations of materials. The absorbent core can include minor amounts (less than about 10%) of non-liquid absorbent materials, such as adhesives, waxes, oils and the like.

In general, the liquid acquisition layer includes a nonwoven web of the disclosure including a plurality of fibers including a water-soluble polyvinyl alcohol fiber forming material. The plurality of fibers can include a single fiber type or a blend of fiber types, and the fibers can include a sole polyvinyl alcohol fiber forming material or a blend of fiber forming materials including a polyvinyl alcohol fiber forming material.

In embodiments, the liquid acquisition layer can be provided between the absorbent core and the topsheet. In wearable embodiments, the liquid acquisition layer can be provided on the wearer facing side of the absorbed core. In embodiments, the liquid acquisition layer can be provided between the absorbent core and the backsheet. In wearable embodiments, the liquid acquisition layer can be provided on the outer facing side of the absorbent core. In embodiments, the liquid acquisition layer is wrapped around the absorbent core. The liquid acquisition layer can be a single sheet that is wrapped around the absorbent core or can be provided as two individual layers that are joined. Without intending to be bound by theory, it is believed that by include the liquid acquisition layer between the absorbent core and the backsheet or on the outer facing side of the absorbent core advantageously prevents leakage of the liquid from the absorbent article by providing additional liquid acquisition material to catch any overflow of liquid from the topsheet side and/or wearer facing side.

In general, the liquid acquisition layer can be directly in contact with the absorbent core, there can include a space between the absorbent core and the liquid acquisition layer, or there can include an intervening layer between the absorbent core and the liquid acquisition layer. In embodiments, the liquid acquisition layer is in contact with the absorbent core. In embodiments, the absorbent article includes an intervening layer provided between the acquisition layer and the absorbent core. In embodiments, the liquid acquisition layer is in contact with the absorbent core on the topsheet side/wearer facing side and an intervening layer is provided between the acquisition layer and the absorbent core on the backsheet side/outer facing side. In embodiments, the liquid acquisition layer is in contact with the absorbent core on the backsheet side/outer facing side and an intervening layer is provided between the acquisition layer and the absorbent core on the topsheet side/wearer facing side. The intervening layer can be, for example, a second liquid pervious layer or liquid acquisition layer included to help facilitate spread of the liquid from the point of deposition to cover the full area of the absorbent core.

In embodiments, the absorbent article includes an absorbent core and a liquid acquisition layer, wherein the liquid acquisition layer includes a nonwoven web including a plurality of fibers including a water-soluble polyvinyl alcohol fiber forming material, and the liquid acquisition layer includes a nonwoven composite article comprising a first layer of nonwoven web comprising a first plurality of fibers, a second layer of nonwoven web comprising a second plurality of fibers, and optionally, a third layer of nonwoven web, wherein the layer of nonwoven web, the second layer of nonwoven web, and/or the third layer of nonwoven web can be the nonwoven web including the water-soluble polyvinyl alcohol fiber forming material. In embodiments, the wearable absorbent article includes an absorbent core having a wearer facing side and an outer facing side and a liquid acquisition layer, wherein the liquid acquisition layer includes a nonwoven web including a plurality of fibers including a water-soluble polyvinyl alcohol fiber forming material, and the liquid acquisition layer includes a nonwoven composite article comprising a first layer of nonwoven web comprising a first plurality of fibers, a second layer of nonwoven web comprising a second plurality of fibers, and optionally, a third layer of nonwoven web, wherein the layer of nonwoven web, the second layer of nonwoven web, and/or the third layer of nonwoven web can be the nonwoven web including the water-soluble polyvinyl alcohol fiber forming material.

In embodiments, the absorbent article includes a liquid acquisition layer that is a nonwoven composite article of the disclosure. In embodiments, the wearable absorbent article includes a liquid acquisition layer that is a nonwoven composite article of the disclosure.

In embodiments, the liquid acquisition layer can be a single layer of nonwoven web as disclosed herein, the layer of nonwoven web including a water-soluble polyvinyl alcohol fiber forming material. In embodiments, the nonwoven composite article of the disclosure can be used in a liquid acquisition layer. In embodiments, the liquid acquisition layer includes a nonwoven composite article of the disclosure. In embodiments, the liquid acquisition layer consists of a nonwoven composite article of the disclosure.

Liquid Containing Nonwoven Articles

The nonwoven webs of the disclosure can be used in liquid containing nonwoven articles. Liquid containing nonwoven articles can be single unit dose articles for accurate dosing of liquids including active agents. Liquids including active agents can include, but are not limited to, liquid household care compositions such as laundry detergents, cleaning compositions, fabric softeners, or dish washing detergents, liquid personal care compositions such as shampoo, body wash, or shaving cream, or non-household, non-personal care compositions such as liquid agricultural products, such as fertilizers and pesticides. The liquid can generally include a non-aqueous liquid that will not dissolve the nonwoven article. Suitable liquids include, but are not limited to, 1,2-propanediol, ethanol, glycerin, propylene glycol, dipropylene glycol, methyl propane diol, and mixtures thereof. Other lower alcohols, low molecular weight polyols, $C_1$-$C_4$ alkanolamines such as monoethanolamine and triethanol amine, can also be used. As used herein a "low molecular weight polyol" is a molecule with more than two hydroxyl groups that has a molecular weight in a range of 50 g/mol and 1000 g/mol, 50 g/mol to 800 g/mol, or 50 g/mol to 600 g/mol. The liquid can be present at levels in the range of from about 0.1% to about 98%, based on the total weight of the liquid and active agent, about 1% to about 75%, or about 5% to about 50%, for example, about 10%, about 25%, about 45%, about 40%, about 45%, about 48%, or about 50%. Typically, the liquid comprises less than 50% water, less than 25% water, less than 20% water, less than 10% water, less than 5% water, or about 0.001% to about 20%, or about 0.001% to about 10% water.

The active agent in the liquid can include, but is not limited to, one or more of the group of an enzyme, oil, flavor, colorant, odor absorber, fragrance, pesticide, fertilizer, oxidant, activator, acid catalyst, metal catalyst, ion scavenger, detergent, disinfectant, surfactant, bleach, bleach component, and a fabric softener. In embodiments, the active agent comprises one or more enzymes and one or more surfactants.

Advantageously, the nonwoven webs of the disclosure can absorb and/or adsorb liquid compositions into the fiber network and onto the fiber surface to provide sufficient actives for a unit dose. The nonwoven web having the liquid composition absorbed/adsorbed thereto, can be wrapped or otherwise enclosed in a second nonwoven web to provide a barrier between the active and the hands of a consumer. Accordingly, the liquid containing nonwoven articles of the disclosure can advantageously be handled by consumers, without contaminating the hands of the consumers or other surfaces. In contrast to single unit dose pouches comprised of films that are used to does liquid laundry detergents, the liquid containing nonwoven articles of the disclosure can dissolve faster and more completely than a film due to the increase in surface area provided by the fibers of the nonwoven webs.

Figure 4A:
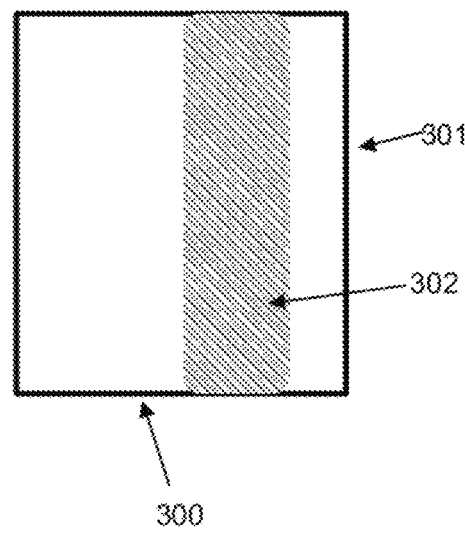
FIG. 4A is an illustration of a nonwoven web noting the machine direction as 301 and the transverse direction as 300, and including a second nonwoven web 302 having the same length as the nonwoven web in the machine direction 301.
Figure 4B:
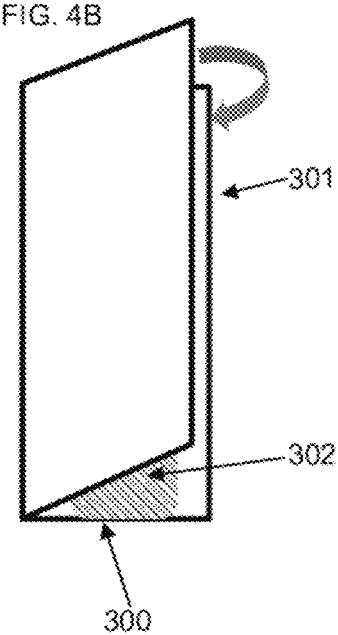
FIG. 4B is an illustration of wrapping the nonwoven web around the second nonwoven web 302 along the machine direction 301.

In general, the liquid containing nonwoven web includes a core nonwoven web including a first plurality of fibers including a first polyvinyl alcohol fiber forming material, wherein the core nonwoven web includes a liquid including an active agent, and an outer nonwoven web including a second plurality of fibers comprising a second polyvinyl alcohol fiber forming material, wherein the core nonwoven web is enclosed by the outer nonwoven web. In embodiments, the outer nonwoven web is wrapped around the first nonwoven web. As shown in FIG. 4A, a nonwoven web can have a machine direction, 301, and a transverse direction, 302. The nonwoven web can be wrapped around the core nonwoven web, 302, for example, by folding the nonwoven web around an axis, such as along the machine direction (FIG. 4B). In embodiments, the outer nonwoven web can have the form of a sleeve or envelope, and the core nonwoven web can be provided to the sleeve or envelope. A sleeve or envelope can be prepared from a single nonwoven web, for example, by folding the web in half and sealing the long edge to provide a sleeve structure with two openings through which the core nonwoven web can be inserted or by folding the web in half and sealing two of the three edges to form an envelope or pocket structure with one opening through which the core nonwoven web can be inserted. A sleeve or envelope can alternatively be prepared from two nonwoven webs that are stacked and sealed along two opposing edges (to form a sleeve) or along three edges (to form a pocket or envelope). In embodiments, the core nonwoven web and the outer nonwoven web have the same length in at least one dimension. For example, in embodiments wherein the outer nonwoven web is wrapped around the core nonwoven web and embodiments wherein the outer nonwoven web is provided as a sleeve, the core nonwoven web can have the same length as the outer nonwoven web. In contrast, in embodiments wherein the outer nonwoven web is provided as an envelope or pocket, the core nonwoven web will necessarily be shorter than the envelope or pocket as three sides of the envelope or pocket are sealed prior to the introduction of the core nonwoven web.

In general, the core nonwoven web comprises a liquid, and the liquid comprises an active. Prior to exposure of the core nonwoven web to the liquid, the core nonwoven web can have a dry basis weight in a range of about 15 gsm to about 200 gsm, about 20 gsm to about 175 gsm, about 25 gsm to about 150 gsm, or about 30 gsm to about 120 gsm. The core nonwoven web can be saturated with the liquid. In embodiments, the weight of the core nonwoven web comprising the liquid is two to ten times the weight of the core nonwoven web prior to addition of the liquid. In embodiments, the core nonwoven comprises about 5 to about 30 g of liquid, about 5 to about 25 g of liquid, about 8 to about 20 g of liquid, about 8 to about 19 g of liquid, about 10 to about 19 g of liquid, or about 12 to about 18 g of liquid. In embodiments, the core nonwoven web comprising the liquid has a liquid weight of about 30 gsm to about 2000 gsm, about 40 gsm to about 1750 gsm, about 50 gsm to about 1500 gsm, about 60 gsm to about 1200 gsm, about 100 gsm to about 1000 gsm, about 200 gsm to about 800 gsm, or about 300 gsm to about 600 gsm. That is, the amount of liquid per square meter of core nonwoven web is about 30 g to about 2000 g, about 40 g to about 1750 g, about 50 g to about 1500 g, about 60 g to about 1200 g, about 100 g to about 1000 g, about 200 g to about 800 g, or about 300 g to about 600 g.

In general, the core nonwoven web can comprise a single ply of nonwoven web or can comprise multiple layers of nonwoven webs (e.g., discreet layers or stacking by way of folding), optionally laminated or bonded together. In embodiments, the core nonwoven web, whether a singly ply or multiple layers of nonwoven webs, can be folded on itself to provide a thicker core for the liquid containing nonwoven article. The number of times the core nonwoven web can be folded is not particularly limited and will depend on the desired thickness of the liquid containing nonwoven article. In embodiments, the liquid containing nonwoven article can have a total thickness (including both the outer nonwoven web and the core nonwoven web) of about 2 to about 50 mm, about 3 to about 45 mm, about 4 to about 40 mm, about 5 to about 35 mm, about 5 to about 30 mm, or about 5 to about 25 mm.

In general, the outer nonwoven web can comprise a single ply of nonwoven web or can comprise multiple layers of nonwoven webs (e.g., discreet layers or stacking by way of folding), optionally laminated or bonded together. In embodiments, the outer nonwoven web can have a basis weight of about 15 gsm to about 400 gsm, about 20 gsm to about 300 gsm, about 25 gsm to about 250 gsm, about 30 gsm to about 210 gsm, or about 30 gsm to about 140 gsm. In embodiments, the outer nonwoven web can have a thickness of about 0.5 mm to about 6.0 mm, about 0.75 mm to about 4.5 mm, or about 1.0 to about 3.0 mm. Advantageously, the basis weight and thickness of the outer nonwoven web can be selected to provide a barrier between the active agent and the environment, so as not to contaminate secondary packaging, surfaces, or a consumers hands with the active agent. The outer nonwoven web also advantageously provides a surface that can be branded, printed, or embossed. In embodiments, markings such as a logo or instructions can be printed on the outer nonwoven web, such that the markings are visible to the consumer. In embodiments, the outer nonwoven web can be embossed with a pattern. The outer nonwoven web can be printed, embossed, or otherwise marked prior to formation of the liquid containing nonwoven article and/or after the formation of the liquid containing nonwoven article.

In general, at least a portion of the core nonwoven web can be in contact with at least a portion of the outer nonwoven web. In embodiments, the portion of the core nonwoven web in contact with the portion of the outer nonwoven web can be an edge or periphery of the core nonwoven, and the portion of the outer nonwoven web in contact with the portion of the core nonwoven web can be an edge or periphery. In embodiments, the portion of the core nonwoven web in contact with the portion of the outer nonwoven web can be sealed or otherwise bonded to the outer nonwoven web. In embodiments, the core nonwoven web and the outer nonwoven web can be sealed on at least one edge, at least two edges, or at least three edges. In embodiments, the portion of the core nonwoven web in contact with the portion of the outer nonwoven web can be a portion of a face of the core nonwoven web and the portion of the outer nonwoven web in contact with the core nonwoven web can be a portion of a face of the outer nonwoven web. In embodiments, the core nonwoven web can fit snugly within the outer nonwoven web such that the core nonwoven web substantially fills the interior volume formed by the outer nonwoven web. As used herein, and unless specified otherwise, the core nonwoven web "substantially fills" means that at least 70% of the interior volume formed by the outer nonwoven is occupied by the core nonwoven web. In embodiments, the core nonwoven web occupies at least 70%, at least 75%, at least 80%, at least 85%, at least 90%, at least 95%, or at least 98% of the interior volume formed by the outer nonwoven web.

In general, the shape and dimensions of the liquid containing nonwoven article are not particularly limited. In embodiments, the size and shape of the liquid containing nonwoven article are selected such that the liquid containing article fits within the palm of a consumer's hand. In embodiments, the maximum length in any dimension is about 7 inches (17.78 cm), about 6 inches (15.24 cm), about 5 inches (12.70 cm), or about 4 inches (10.16 cm). In embodiments, the maximum length in any dimension is at least about 0.5 inches (1.27 cm), at least about 1 inch (2.54 cm), at least about 1.5 inches (3.81), or at least about 2 inches (5.08 cm). In embodiments, the maximum length in any dimension is about 2 inches (5.08 cm) to about 4 inches (10.16 cm). In embodiments, the liquid containing nonwoven article has a shape selected from the group consisting of a quadrilateral, a triangle, a circle, a star, a heart, an octagon, a pentagon, a hexagon, a heptagon, an oval, a crescent, a semicircle, a cross, a trefoil, a quadrafoil, a droplet, a pentagram, a hexagram, an octagram, a crown, a snowflake, a shield, a cloud, an arrow, and a combination of the foregoing.

In general, the liquid containing nonwoven article can include fibers comprising any fiber forming material disclosed herein. In embodiments, the core nonwoven web comprises fibers comprising a first polyvinyl alcohol fiber forming material selected from a polyvinyl alcohol homopolymer, a polyvinyl alcohol copolymer, and a combination of the foregoing. In embodiments, the first polyvinyl alcohol comprises a polyvinyl alcohol copolymer comprising an anionic modified polyvinyl alcohol. In embodiments, the anionic modified polyvinyl alcohol comprises an (alkyl) acrylate modified polyvinyl alcohol, a maleate modified polyvinyl alcohol, a sulfonate modified polyvinyl alcohol, or a combination there. In embodiments, the first polyvinyl alcohol comprises a polyvinyl alcohol homopolymer.

In embodiments, the outer nonwoven web comprises fibers comprising a second polyvinyl alcohol fiber forming material selected from a polyvinyl alcohol homopolymer, a polyvinyl alcohol copolymer, and a combination of the foregoing. In embodiments, the second polyvinyl alcohol comprises a polyvinyl alcohol copolymer comprising an anionic modified polyvinyl alcohol. In embodiments, the anionic modified polyvinyl alcohol comprises an (alkyl) acrylate modified polyvinyl alcohol, a maleate modified polyvinyl alcohol, a sulfonate modified polyvinyl alcohol, or a combination there. In embodiments, the second polyvinyl alcohol comprises a polyvinyl alcohol homopolymer.

In embodiments, the core nonwoven web comprises the first plurality of fibers comprising the first polyvinyl alcohol fiber forming material and the first plurality of fibers further comprises one or more fiber forming materials selected from the group of a polyacrylate, a polyvinyl pyrrolidone, a polyethyleneimine, guar gum, gum acacia, xanthan gum, carrageenan, a water-soluble starch, a water-soluble cellulose, a cellulose ether, a cellulose ester, and a cellulose amide. In embodiments, the outer nonwoven web comprises the second plurality of fibers comprising the second polyvinyl alcohol fiber forming material and the second plurality of fibers further comprises one or more fiber forming materials selected from the group of a polyacrylate, a polyvinyl pyrrolidone, a polyethyleneimine, guar gum, gum acacia, xanthan gum, carrageenan, a water-soluble starch, a water-soluble cellulose, a cellulose ether, a cellulose ester, and a cellulose amide.

In general, the first polyvinyl alcohol of the core nonwoven web and the second polyvinyl alcohol of the outer nonwoven web can be the same or different. In embodiments, wherein the first and second polyvinyl alcohol are different, the first polyvinyl alcohol fiber forming material and the second polyvinyl alcohol fiber forming material can have a difference in viscosity, degree of hydrolysis, degree of copolymerization, type of copolymer modification, or a combination thereof.

In general, the core nonwoven web prior to addition of the liquid can be the same or different from the outer nonwoven web. Advantageously, the liquid containing nonwoven articles can provide a consumer product comprising a liquid compositions that has a cloth-like hand-feel that is pleasant to handle, in contrast to the currently marketed pouches made of water-soluble polymeric films that have an unpleasant rubber or plastic-like feel when handled by the consumer. The liquid containing nonwoven articles can have a softness rating of 1 to 5, as determined using the Softness Rating method disclosed herein.

The liquid containing nonwoven article can be prepared by contacting the core nonwoven web with the liquid comprising the active agent, enveloping the core nonwoven web with the outer nonwoven web, and sealing the outer nonwoven web to enclose the core nonwoven web.

Figure 7:
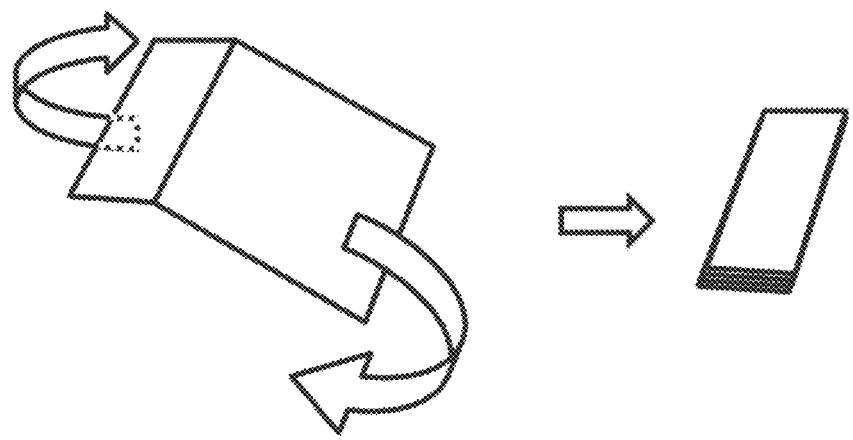
FIG. 7 is an illustration of one method of folding a nonwoven web.

In embodiments, the method of preparing the liquid containing nonwoven article further comprises folding the core nonwoven web over itself from 2 to 50 times, from 3 to 45 times, from 4 to 40 times, from 5 to 35 times, or from 6 to 30 times. As shown in FIGS. 6 and 7, the folding of the core nonwoven web over itself provides a thicker nonwoven core. The method of folding is not particularly limited and can be accordion style (FIG. 6) or folding continuously in the same direction (FIG. 7). After folding, the layers can optionally be bonded together using any bonding method known in the art.

In general, contacting the core nonwoven web with the liquid comprising the active agent can use any method known in the art for applying a liquid composition to a substrate. Methods for contacting include, but are not limited to, one or more of gravure coating, dip coating, slot die coating, wire coating, flood coating, spray coating, and immersing the core nonwoven web in a bath of the liquid comprising the active agent. In embodiments, the folding occurs after the contacting and the contacting comprises one or more of gravure coating, dip coating, slot die coating, wire coating, flood coating, and spray coating. In embodiments, the folding occurs prior to the contacting and the contacting comprises immersing the core nonwoven web in a bath of the liquid comprising the active agent.

In embodiments, the method further comprises preparing the outer nonwoven web by plying, stacking, folding, or laminating multiple layers of nonwoven web. One or more nonwoven webs can be superposed and optionally bonded and or laminated together.

In general, enveloping the core nonwoven web with the outer nonwoven web can include any process by which the outer nonwoven web forms an interior space and the core nonwoven web is provided in the interior space. In embodiments, enveloping the core nonwoven web with the outer nonwoven web comprises wrapping the core nonwoven web with the outer nonwoven web, inserting the core nonwoven web into an envelope comprising the outer nonwoven web, or inserting the core nonwoven web into a sleeve comprising the outer nonwoven web. In embodiments, the enveloping comprises horizontal flow wrapping. The outer nonwoven web can then be sealed together along the machine direction to make a tube around the core nonwoven web comprising the liquid comprising the active agent.

As shown in FIG. 4, the outer nonwoven web can have a machine direction (301) and a transverse direction (302) and a core nonwoven web (302) can be enveloped by wrapping the outer nonwoven web around the core nonwoven web. As shown in FIG. 5, sealing can comprise sealing the outer nonwoven web along two or more points in the machine direction (303). Sealing can further comprise sealing the outer nonwoven web along at least one edge in the transverse edge (304). Sealing can comprise any sealing method known in the art, for example, heat sealing, solvent welding, and adhesive sealing. Typically, only the area which is to form the seal is treated with heat or solvent. The heat or solvent can be applied by any method. If solvent or wet sealing or welding is used, it may be preferred that heat is also applied. Preferred wet or solvent sealing/welding methods include selectively applying solvent by, for example, spraying or printing this onto the area to be sealed and then applying pressure onto these areas to form the seal. Sealing rolls and belts (optionally also providing heat) can be used, for example, The solvent for the solvent sealing/welding can include any suitable solvent, for example, a polar solvent including water and/or glycerin. Without intending to be bound by theory, it is believed that solution sealing will result in a lower crystallinity of the nonwoven fibers which can, in turn, contribute to less residue left upon dissolution of the liquid containing nonwoven article.

The liquid containing nonwoven article can be prepared as an inline process. As shown in FIG. 5B, the method of preparing the liquid containing nonwoven article can further comprise cutting the nonwoven article in the transverse direction (305) along the seal in the machine direction (303) to provide a unit dose with a flange (307). A die cutting system can be used to separate individual doses (FIG. 5B (306)). The cuts are provided between inter-unit dose seals so that a flange will be created around each unit dose. In embodiments, the flange can be at least 1 mm and no more than 10 mm, for example, about 1.5 mm to about 9 mm, about 2 mm to about 7.5 mm, or about 2.5 mm to about 5 mm. The individual unit doses can then be collected, weighed, and divided out for placement into secondary packaging.

Dissolution and Disintegration Test (MSTM 205)

A nonwoven web, water-soluble film, or composite structure can be characterized by or tested for Dissolution Time and Disintegration Time according to the MonoSol Test Method 205 (MSTM 205), a method known in the art. See, for example, U.S. Pat. No. 7,022,656. The description provided below refers to a nonwoven web, while it is equally applicable to a water-soluble film or composite structure.
Apparatus and Materials:
600 mL Beaker
Magnetic Stirrer (Labline Model No. 1250 or equivalent)
Magnetic Stirring Rod (5 cm)
Thermometer (0 to 100° C.±1° C.)
Template, Stainless Steel (3.8 cm×3.2 cm)
Timer (0-300 seconds, accurate to the nearest second)
Polaroid 35 mm slide Mount (or equivalent)
MonoSol 35 mm Slide Mount Holder (or equivalent)
Distilled water For each nonwoven web to be tested, three test specimens are cut from a nonwoven web sample that is a 3.8 cm×3.2 cm specimen. Specimens should be cut from areas of web evenly spaced along the traverse direction of the web. Each test specimen is then analyzed using the following procedure.

Lock each specimen in a separate 35 mm slide mount.
Fill beaker with 500 mL of distilled water. Measure water temperature with thermometer and, if necessary, heat or cool water to maintain the temperature at the temperature for which dissolution is being determined, e.g., 20° C. (about 68° F.). Mark height of column of water. Place magnetic stirrer on base of holder. Place beaker on magnetic stirrer, add magnetic stirring rod to beaker, turn on stirrer, and adjust stir speed until a vortex develops which is approximately one-fifth the height of the water column. Mark depth of vortex.

Secure the 35 mm slide mount in the alligator clamp of the 35 mm slide mount holder such that the long end of the slide mount is parallel to the water surface. The depth adjuster of the holder should be set so that when dropped, the end of the clamp will be 0.6 cm below the surface of the water. One of the short sides of the slide mount should be next to the side of the beaker with the other positioned directly over the center of the stirring rod such that the nonwoven web surface is perpendicular to the flow of the water.

In one motion, drop the secured slide and clamp into the water and start the timer. Disintegration occurs when the nonwoven web breaks apart. When all visible nonwoven web is released from the slide mount, raise the slide out of the water while continuing to monitor the solution for undissolved nonwoven web fragments. Dissolution occurs when all nonwoven web fragments are no longer visible and the solution becomes clear.

The results should include the following: complete sample identification; individual and average disintegration and dissolution times; and water temperature at which the samples were tested.

Method for Determining Single Fiber Solubility

The solubility of a single fiber can be characterized by the water breaking temperature. The fiber breaking temperature can be determined as follows. A load of 2 mg/dtex is put on a fiber having a fixed length of 100 mm. Water temperature starts at 1.5° C. and is then raised by 1.5° C. increments every 2 minutes until the fiber breaks. The temperature at which the fiber breaks is denoted as the water breaking temperature.

The solubility of a single fiber can also be characterized by the temperature of complete dissolution. The temperature of complete dissolution can be determined as follows. 0.2 g of fibers having a fixed length of 2 mm are added to 100 mL of water. Water temperature starts at 1.5° C. and is then raised by 1.5° C. increments every 2 minutes until the fiber completely dissolves. The sample is agitated at each temperature. The temperature at which the fiber completely dissolves is denoted as the complete dissolution temperature.

Diameter Test Method

The diameter of a discrete fiber or a fiber within a nonwoven web is determined by using a scanning electron microscope (SEM) or an optical microscope and an image analysis software. A magnification of 200 to 10,000 times is chosen such that the fibers are suitably enlarged for measurement. When using the SEM, the samples are sputtered with gold or a palladium compound to avoid electric charging and vibrations of the fiber in the electron beam. A manual procedure for determining the fiber diameters is used from the image (on monitor screen) taken with the SEM or the optical microscope. Using a mouse and a cursor tool, the edge of a randomly selected fiber is sought and then measured across its width (i.e., perpendicular to the fiber direction at that point) to the other edge of the fiber. A scaled and calibrated image analysis tool provides the scaling to get an actual reading in microns. For fibers within a nonwoven web, several fibers are randomly selected across the sample of nonwoven web using the SEM or the optical microscope. At least two portions of the nonwoven web material are cut and tested in this manner. Altogether at least 100 such measurements are made and then all data are recorded for statistical analysis. The recorded data are used to calculate average (mean) of the fibers, standard deviation of the fibers, and median fiber diameters.

Tensile Strength, Modulus, and Elongation Test

A nonwoven web, water-soluble film, or composite structure characterized by or to be tested for tensile strength according to the Tensile Strength (TS) Test, modulus (or tensile stress) according to the Modulus (MOD) Test, and elongation according to the Elongation Test is analyzed as follows. The description provided below refers to a nonwoven web, while it is equally applicable to a water-soluble film or composite structure. The procedure includes the determination of tensile strength and the determination of modulus at 10% elongation according to ASTM D 882 ("Standard Test Method for Tensile Properties of Thin Plastic Sheeting") or equivalent. An INSTRON tensile testing apparatus (Model 5544 Tensile Tester or equivalent) is used for the collection of nonwoven web data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or modulus determination, 1"-wide (2.54 cm) samples of a nonwoven web are prepared. The sample is then transferred to the INSTRON tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON grips having model number 2702-032 faces, which are rubber coated and 25 mm wide, or equivalent). The samples are mounted into the tensile testing machine and analyzed to determine the 100% modulus (i.e., stress required to achieve 100% film elongation), tensile strength (i.e., stress required to break film), and elongation % (sample length at break relative to the initial sample length). In general, the higher the elongation % for a sample, the better the processability characteristics for the nonwoven web (e.g., increased formability into packets or pouches).

Determination of Basis Weight

Basis weight is determined according to ASTM D3776/ D3776M-09a (2017). Briefly, a specimen having an area of at least 130 cm$^2$ or a number of smaller die cut specimens taken from different locations in the sample and having a total area of at least 130 cm$^2$ are cut. The specimen(s) are weighed to determine mass on a top loading analytical balance with a resolution of ±0.001 g. The balance is protected from air drafts and other disturbances using a draft shield. Specimens of fabric may be weighed together. The mass is calculated in ounces per square yard, ounces per linear yard, linear yards per pound, or grams per square meter to three significant figures.

Determination of Moisture Vapor Transmission Rate

Moisture Vapor Transmission Rate (MVTR) is determined according to MSTM-136. The MVTR defines how much moisture per day moves through a nonwoven web, film, or composite sample. The description provided below refers to a nonwoven web, while it is equally applicable to a water-soluble film or composite structure.

Apparatus and Materials:
Permatran-W Model 3/34 (or equivalent)
Compressed Gas Cylinder of Nitrogen (99.7% or above)
Regulator-Tee (part number 027-343)
Main Line Supply regulator
HPLC Grade Water (or equivalent)
10 cc Syringe with Luerlok Tip (part number 800-020)
Powder-free gloves
High vacuum grease (part number 930-022)
(2) Test Cells
Cutting template
Cutting board
Razor blade with handle
Cut-resistant glove Preparation of the Permatran W-Model 3/34: Make sure nitrogen pressure level is above 300 psi, the pressure on the carrier gas regulator-tee reads 29 psi (must not exceed 32 psi) and the main line supply regulator pressure is set to 35 psi. Open the door on the instrument panel to access humidifier to check the water level. If water level is low, fill a syringe with HPLC-grade water and insert the leur fitting on the syringe into the "fill Port" for the reservoir. Open the "Fill Valve" by turning it 2-3 turns counterclockwise then push in the plunger on the syringe to force the water into the reservoir. Close the 'Fill Valve" and remove syringe. Note: do not allow water level to exceed line marked adjacent to reservoir.

Preparation and Testing of Samples: For each nonwoven web to be tested, take the sample web and lay it flat on the cutting board. Place the template on top of the web and use the razor blade with a handle to cut out the sample. Make sure cut-resistant glove is worn when cutting the sample out. Set the sample aside. Grease around the sealing surfaces of the test cell's top piece with high vacuum grease. Mount the nonwoven web sample on top of the test cell's top piece. Note: Orientation can be important. If a homogeneous material, orientation is not critical. If a multi-layered and laminated material, place the multilayered film or laminate with barrier coating or laminate up, towards the top of the cell. For example, a one-side, wax coated PVOH web should be mounted with the wax side up, placing the wax towards the carrier gas (Nitrogen). Place the test cell's top piece on top of the test cell's bottom piece. Make sure the test cell is clamped together with a good seal. Press the cell load/unload button to open cell tray. Grasp the test cell by the front and back edges and lower it straight down. Close the cell tray completely by gently pushing straight towards panel. Press the cell load/unload button to clamp the cell. Note: You should hear a click. Repeat for second sample.

After the samples are loaded and the instrument is ready, the test parameters must be set. Note: There are two types of test parameters, cell parameters and instrument parameters. Cell parameters are specific to each cell while instrument parameters are common for all cells. Touch the "Test Button" on the screen. Under "Auto Test" select "Tab A". Touch "Cell Tab". Fill out the following by touching each bubble: ID, Area (cm'2), Thickness (mil). Note: Area of template is 50 cm². Repeat for "Tab B". Touch "Instrument Tab". Fill out the following by touching each bubble: Cell Temp (° C.) and Test Gas RH (%). Note: Make sure 100% RH is set to off. Cell temperature can be set to a minimum of 10° C. to maximum of 40° C. Test Gas RH can be set to minimum 5% to 90%. If 100% RH is needed, it requires a different method. Repeat for "Tab B". Once the test parameters are set, select "Start Selected" or "Start All" depending on sample number. Note: The indicator light for each cell on front panel will be green indicating the start of test.

Surface Resistivity Measurements

Surface resistivity of nonwoven webs and films can be measured according to ASTM D257.

Softness Rating

The hand feel of a nonwoven web, liquid containing nonwoven article, or nonwoven composite article of the disclosure is related to the softness of the sample and can be evaluated using relative testing methods. A tester carrying out the softness evaluation used clean hands to feel the samples in whatever manner or method the individual chose, to determine a softness rating for the nonwoven webs and articles of the disclosure as compared to a control material comprising a nonwoven web consisting of fibers consisting of polyvinyl alcohol homopolymers having a degree of hydrolysis of 88%, the fibers having a 2.2 dtex/51 mm cut, having a softness rating of 1 (softest) and a control material comprising a nonwoven web consisting of fibers consisting of 75% polyvinyl alcohol homopolymers having a degree of hydrolysis of 88%, the fibers having a 2.2/51 mm cut, and 25% of 22 dtex/38 mm PET fiber, having a softness rating of 5 (roughest/coarsest). The hand panel can be conducted in a blind study so that the raters cannot be swayed by their perception of sample names. Samples can be rated from 1 to 5.

Horizontal Wicking Test

Figure 8:
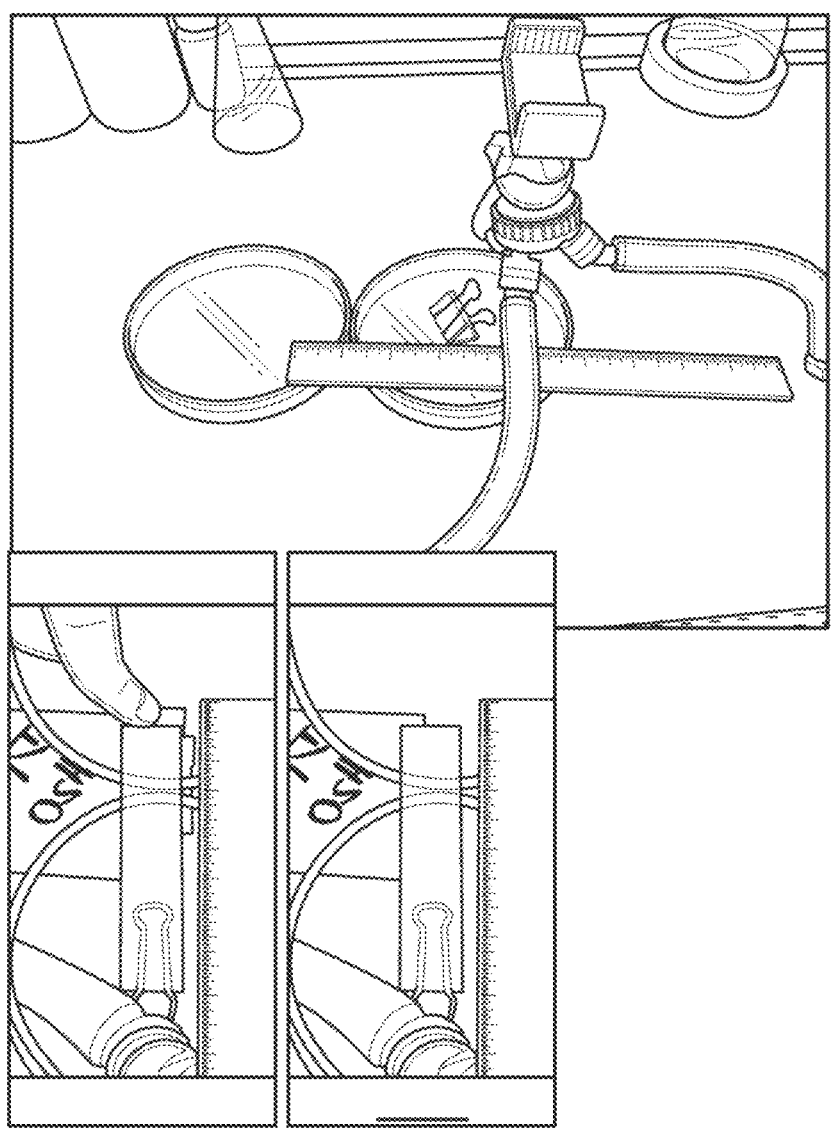
FIG. 8 shows various views of a set up for the Horizontal Wicking test.

Nonwovens were tested for horizontal wicking as disclosed herein. The testing was completed in a fume hood with the blower off. The liquids to be tested are left exposed to the atmosphere for a time suitable to allow the liquids to equilibrate to room conditions. Nonwoven strips were cut such that the machine direction is parallel to the direction of liquid motion. A glass petri dish is used as a liquid reservoir and is filled to as high of a level as possible with the liquid to test for wicking. The lid of the petri dish is placed adjacent to the petri dish to support the nonwoven web. A binder clip is provided on the petri dish lid to support the end of the nonwoven strip such that is will not stick to the glass. A sample set-up is shown in FIG. 8. Video is taken of the liquid traveling through the nonwoven web with a ruler in view. Distances of liquid travel in mm are recorded at different time points. The distance over time is plotted to obtain the wicking rate. Horizontal wicking takes place in three phases, a wetting delay, the Washburn period (a linear flux of solution through the substrate), and the fall-off period. The data used for the Washburn slope, wicking rate, and absorbency rate was from 30 seconds into Lucas-Washburn Equation:

$$x = kt^{1/2} = \left[\frac{r\sigma\cos(\theta)}{2\mu}\right]t^{1/2}$$

the trial which is well within the Washburn period. The rate, $v_{wick}$, was determined according to the following equations:

$$r_e = \frac{2x^2\mu}{\sigma t} \quad v_{wick} = \frac{\left(\frac{2x^2\mu}{\sigma t}\right)\sigma}{4\mu x} = \frac{x}{2t} \quad \cos(\theta) = \left(\frac{k}{k_{ref}}\right)^2 \frac{\left(\frac{\sigma}{\mu}\right)^{ref}}{\left(\frac{\sigma}{\mu}\right)}$$

Absorptive Capacity and Rate

Nonwovens were tested for absorptive capacity and rate as disclosed herein. For liquid absorptive capacity (LAC %), test samples were submerged (one at a time) in 20 mm deep test liquid for 60 seconds. The test samples were vertically drained for 120 seconds. The LAC % is then calculated according to the following equation:

$$LAC\% = \frac{\text{Wet Mass} - \text{Dry Mass}}{\text{Dry Mass}} \times 100\%.$$

The absorbency rate (volumetric rate of wicking per unit area), $$\frac{Q}{A},$$

is calculated by multiplying the wicking rate obtained from the Horizontal Wicking Test, $v_{wick}$, by the void fraction of the nonwoven sample, $$\phi: \frac{Q}{A} = v_{wick}\phi.$$

The void fraction can be determined by dipping a dry, weighed, nonwoven sample into $$\text{Washburn Slope} = k = \frac{\Delta y}{\Delta x} = \frac{\Delta \text{distance}}{\Delta \sqrt{\text{time}}}$$

a disk of a known volume of water. Soak the nonwoven for 15 seconds, let drain for 30 seconds over the dish. Measure the amount of water (volume) lost from the dish and calculate the void fraction according to the equation:

$$\phi = \frac{\text{Volume of water in } NW}{\text{Total volume of water and } NW}.$$

EXAMPLES

The nonwoven webs of the examples were prepared from one or more fibers selected from the group consisting of Fiber D, Fiber E, Fiber F, and Fiber G, which are described below.

Fiber D is a commercially available PVOH staple fiber product including a PVOH homopolymer having an 88% degree of hydrolysis (DH) and a fineness of 1.7-2.2 dtex. Fiber D will dissolve in water of temperature 20° C. under the following conditions: 10 g fiber is put into a 500 cc vessel, followed by distilled water at 30 times the fiber specimen's weight. The water is stirred slightly, and the specimen is observed to have dissolved completely after several minutes, typically within 15 minutes.

Fiber E is a commercially available PVOH staple fiber product including a PVOH homopolymer having a 96% degree of hydrolysis (DH) and a fineness of 1.4-2.2. Fiber E will dissolve in water of temperature 40° C. under the following conditions: 10 g fiber is put into a 500 cc vessel, followed by distilled water at 30 times the fiber specimen's weight. The water is stirred slightly, and the specimen is observed to have dissolved completely after several minutes, typically within 15 minutes.

Fiber F is a commercially available PVOH staple fiber product including a PVOH homopolymer having a 98% degree of hydrolysis (DH) and a fineness of 1.4-2.2. Fiber F will dissolve in water of temperature 70° C. under the following conditions: 10 g fiber is put into a 500 cc vessel, followed by distilled water at 30 times the fiber specimen's weight. The water is stirred slightly, and the specimen is observed to have dissolved completely after several minutes, typically within 15 minutes.

Fiber G is a commercially available PVOH staple fiber product including a PVOH homopolymer having a 99+% degree of hydrolysis (DH) and a fineness of 1.7 dtex. Fiber G will dissolve in water of temperature 95° C. under the following conditions: 10 g fiber is put into a 500 cc vessel, followed by distilled water at 30 times the fiber specimen's weight. The water is stirred slightly, and the specimen is observed to have dissolved completely after several minutes, typically within 15 minutes.

Example 1

Various nonwoven webs were prepared using fibers comprising a single PVOH fiber forming material. The fibers were comprised of PVOH homopolymers having different degrees of hydrolysis. In particular, Fiber D, Fiber E, Fiber F, and Fiber G, having a DH of 88%, 96%, 98%, and 99%, respectively, were used alone or 50/50 (by weight) blends to provide nonwoven webs having average DH of 88% (D fibers), 92% (D/E fibers), 93% (D/F fibers), 93.5% (D/G fibers), 96% (E fibers), 97% (E/F fibers), 97.5% (E/G fibers), 98% (F fibers), 98.5% (F/G fibers), and 99+% (G fibers). The fibers were calendar bonded to form the nonwoven webs. The nonwoven web having an average DH of 88% was calendared at 40 psi, speed of 2 FPM (feet per minute), and a temperature of 140° C. The remaining nonwoven webs were calendared at 40 psi and a temperature between 140° C. and 190° C. at a rate of 1-2 FPM, as necessary and depending on the DH of the fibers, to achieve the same degree of bonding as the nonwoven having an average DH of 88%. The degree of bonding was considered the same for two nonwoven webs when the tensile strength of the webs were the same (±5%) as measured according to the Tensile Strength Test disclosed herein. The resulting nonwoven webs were tested for horizontal wicking and absorptive capacity and rate according to the methods provided herein.

Liquids tested with the various nonwoven webs were DI water, hexane, synthetic blood, and synthetic urine. The synthetic blood was a 94% water mixture of hemoglobin, amino acids, protein, and other nonhazardous components. The synthetic urine was a 97% water mixture of urea, magnesium sulfate heptahydrate, calcium chloride dehydrate, and sodium chloride.

Figure 9A:
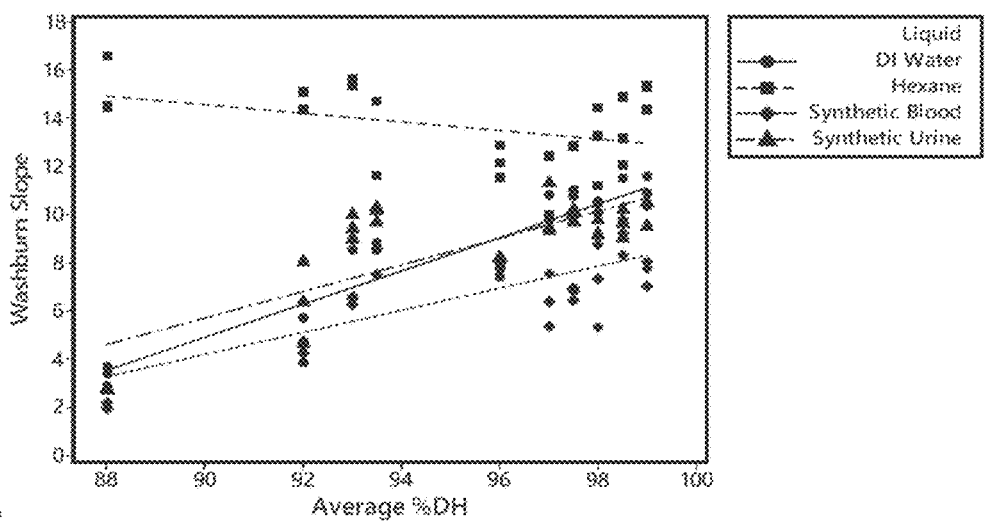
FIG. 9A is a plot of the Washburn Slope for a web of the disclosure as a function of the average degree of hydrolysis of the polyvinyl alcohol fiber forming material in the web.
Figure 9B:
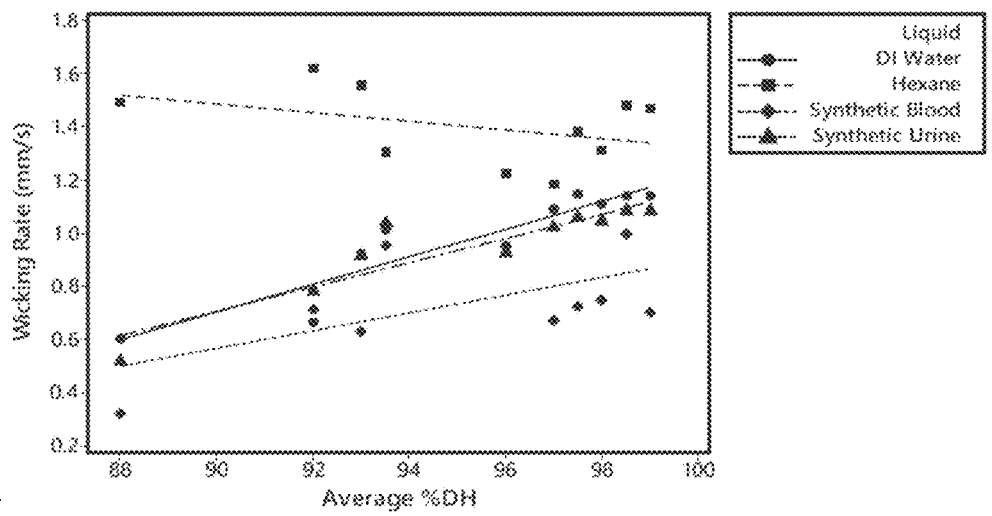
FIG. 9B is a plot of the wicking rate of a nonwoven web of the disclosure as a function of the average degree of hydrolysis of the polyvinyl alcohol fiber forming material in the web.
Figure 9C:
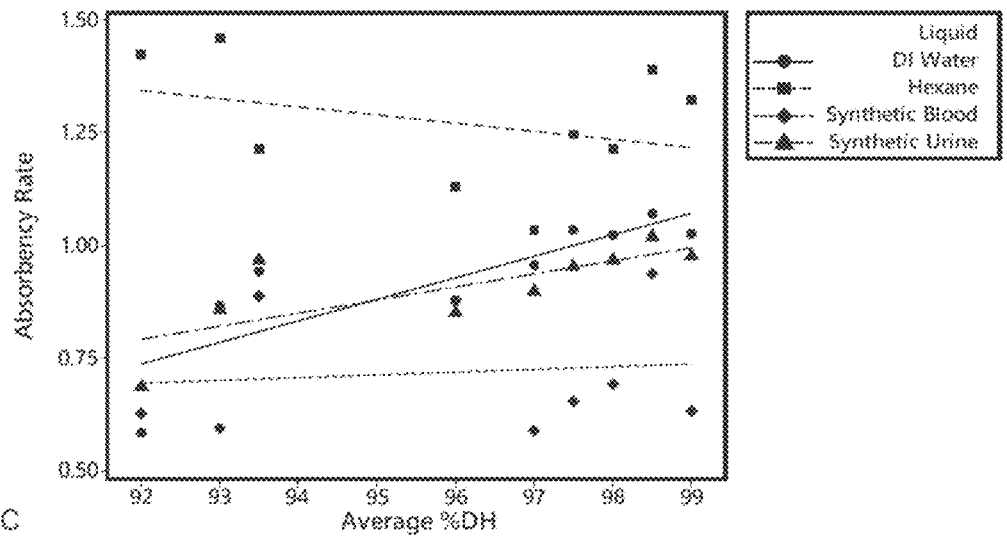
FIG. 9C is a plot of the absorbency rate of a nonwoven web of the disclosure as a function of the average degree of hydrolysis of the polyvinyl alcohol fiber forming material in the web.

As shown in FIG. 9, for water and synthetic urine, as the average DH of the nonwoven web increased the Washburn Slope, wicking rate, and absorbency rate increased, for synthetic blood as the average DH increased the Washburn Slope and wicking rate increased and the absorbency rate was maintained, and for hexane, as the DH of the nonwoven web increased each of the Washburn Slope, wicking rate, and absorbency rate decreased.

Figure 10:
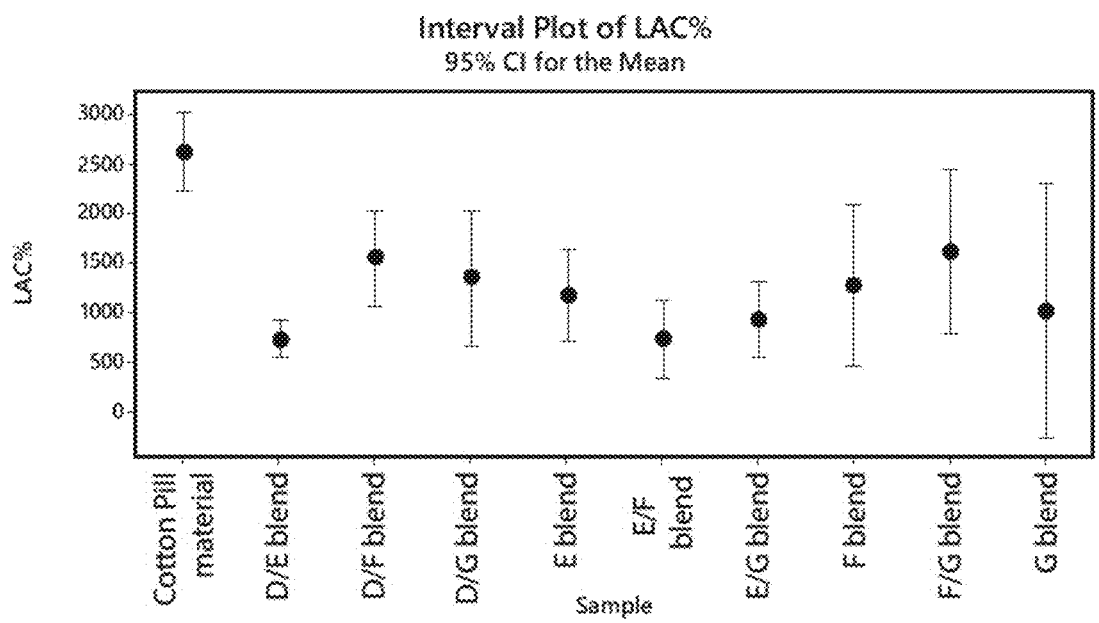
FIG. 10 is an interval plot of the liquid absorption capacity nonwoven web of the disclosure as a function of the average degree of hydrolysis of the polyvinyl alcohol fiber forming material in the web.

As shown in FIG. 10, for the liquid absorption capacity, the high DH fibers had a larger effect on the capacity than the low DH fibers when provided in a blend, rather demonstrating a rule-of-mixtures effect on the absorption capacity. Nonwoven webs comprising only cotton pill material were also tested for comparison.

Example 2

Various multi-layer nonwoven webs were prepared using nonwoven webs including fibers comprising a single PVOH fiber forming material. The fibers were comprised of PVOH homopolymers having different degrees of hydrolysis. In particular, Fiber D, Fiber E, Fiber F, and Fiber G, having a DH of 88%, 96%, 98%, and 99+%, respectively, were used alone or in blends. The fibers of the first layer were carded and the fibers of the second layer were layered on top of the fibers of the first layer. The two layers were simultaneously calendar bonded into nonwoven webs and the multilayered nonwoven articles. The nonwoven web(s) having an average DH of 88% was calendared at 40 psi, 2 FPM, and a temperature of 140° C. The remaining nonwoven webs were calendared at 40 psi and a temperature between 140° C. and 190° C. at 1-2 FPM, as necessary and depending on the DH of the fibers, to achieve the same degree of bonding as the nonwoven having an average DH of 88%. The degree of bonding was considered the same for two nonwoven webs when the tensile strength of the webs were the same (±5%) as measured according to the Tensile Strength Test disclosed herein. Articles having an average DH of 92% (50/50 D/E fiber nonwovens), 93% (50/50 D/F fiber nonwovens), 93.5% (50/50 D/G fiber nonwovens), 94% (25/75 D/E fiber nonwovens), 95.2% (10/90 D/E fiber nonwovnes), 96% (E fiber nonwovens), 97% (50/50 E/F fiber nonwovens), and 97.5% (50/50 E/G fiber nonwovens), were prepared from combining two nonwoven webs of the same composition and basis weight.

All multilayer articles were tested for horizontal wicking and absorptive capacity and rate according to the methods provided herein.

Liquids tested with the various nonwoven webs were DI water, hexane, synthetic blood, and synthetic urine. The synthetic blood was a 94% water mixture of hemoglobin, amino acids, protein, and other nonhazardous components. The synthetic urine was a 97% water mixture of urea, magnesium sulfate heptahydrate, calcium chloride dehydrate, and sodium chloride.

Figure 11A:
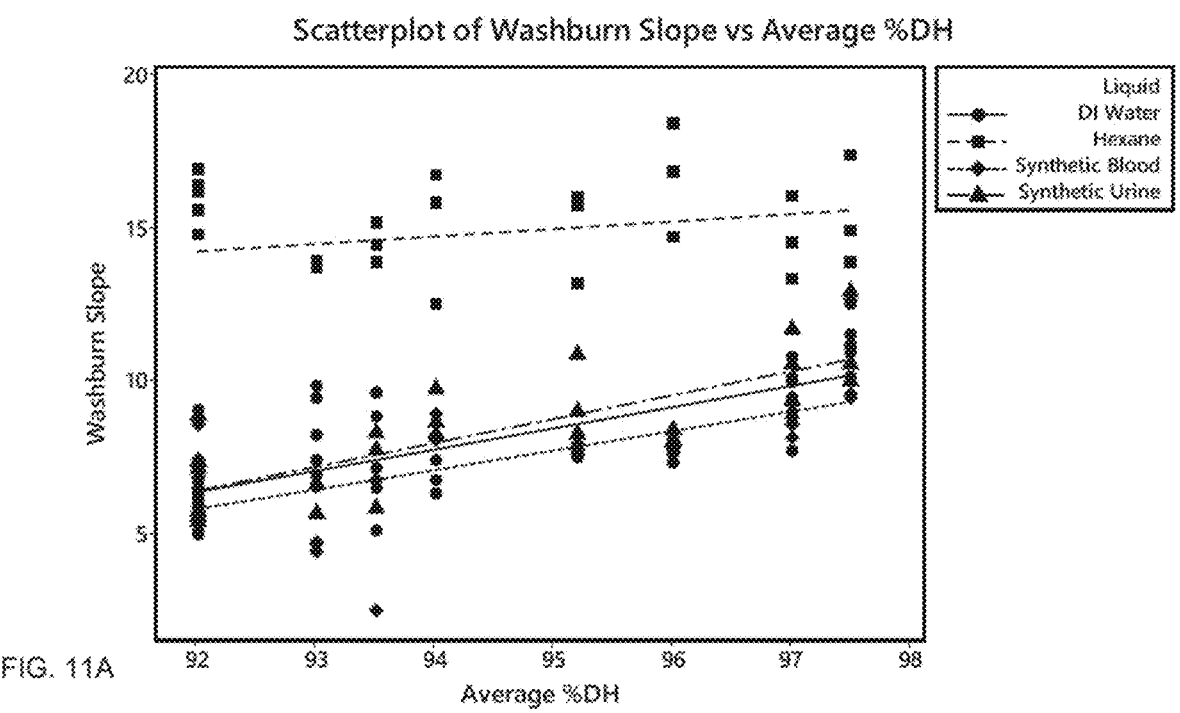
FIG. 11A is a plot of the Washburn Slope for a nonwoven web of the disclosure as a function of the average degree of hydrolysis of the polyvinyl alcohol fiber forming material in the multilayer article.

As shown in FIG. 11, for all liquids except hexane, as the average DH of the multilayer article increased, the Washburn slope, wicking rate, and absorbency rate increased. For hexane, as the DH of the multilayer article increased, the Washburn slope, wicking rate, and absorbency rate remained relatively stable with slight increases.

As shown in FIG. 12, for the liquid absorption capacity, the high DH layers had a larger effect on the capacity than the low DH fibers when provided in a blend, rather demonstrating a rule-of-mixtures effect on the absorption capacity. Nonwoven webs comprising only cotton pill material were also tested for comparison.

Example 3

Various multi-layer nonwoven webs were prepared using nonwoven webs having fibers comprising a single PVOH fiber forming material. The fibers were comprised of PVOH homopolymers having different degrees of hydrolysis. In particular, Fiber D, Fiber E, Fiber F, and Fiber G, having a DH of 88%, 96%, 98%, and 99+%, respectively, were used alone. The fibers of the first layer were carded and the fibers of the second layer were layered on top of the fibers of the first layer. The two layers were simultaneously calendar bonded into nonwoven webs and the multilayered nonwoven articles. The nonwoven web were calendared at 40 psi, 2 FPM, and a temperature of 150° C. Some single layer articles were also prepared using air-through bonding. The air-through bonding was performed at 180° C., at a speed of 6:50. The nonwoven webs that were air-through bonded included PVOH fibers having a DH of 96% and up to 5 weight % polyethylene terephthalate (PET) fibers to aid in bonding. For multilayer articles, the DH was considered the average DH of the two layers. Articles having an average DH of 92% (D fiber nonwovens/E fiber nonwoven), 93% (D fiber nonwoven/F fiber nonwovens), 93.5% (D fiber nonwoven/G fiber nonwovens), 97% (E fiber nonwoven/F fiber nonwovens), and 97.5% (E fiber nonwoven/G fiber nonwovens) were prepared from combining two nonwoven webs of different composition, but having the same basis weight.

The multilayer articles comprising two different nonwoven webs were testing for horizontal wicking and absorptive capacity and rate according to the methods provided herein. The tests were run multiple times with the multilayer articles in a first orientation wherein the higher DH layer was facing up and in a second orientation wherein the lower DH layer was facing up. No discernable differences in the wicking rates was found between the two orientations.

Liquids tested with the various nonwoven webs were DI water, hexane, synthetic blood, and synthetic urine. The synthetic blood was a 94% water mixture of hemoglobin, amino acids, protein, and other nonhazardous components. The synthetic urine was a 97% water mixture of urea, magnesium sulfate heptahydrate, calcium chloride dehydrate, and sodium chloride.

The articles demonstrated the same trend as in Example 1, where the Washburn Slope increased with increasing average DH.

Figure 13A:
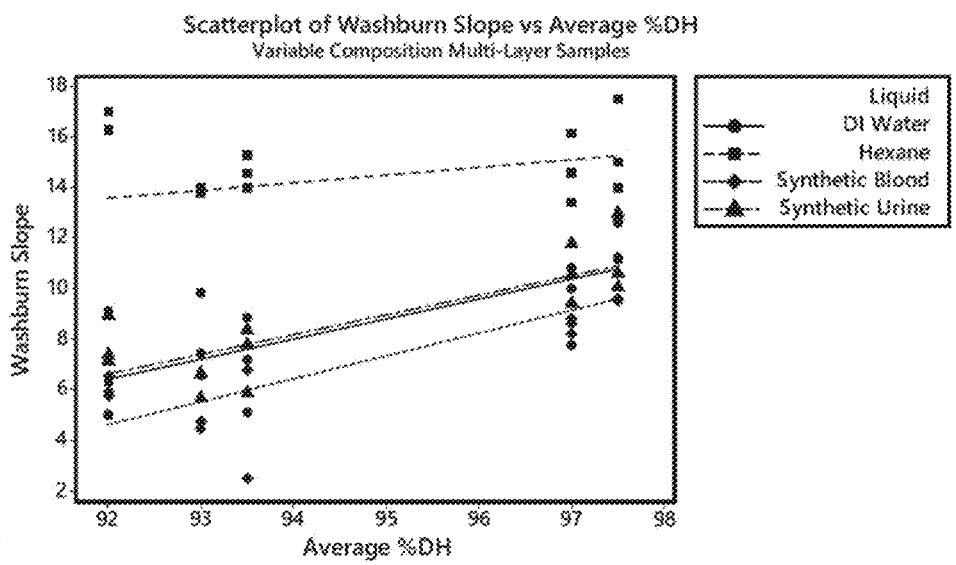
FIG. 13A is a plot of the Washburn Slope for a nonwoven web of the disclosure as a function of the average degree of hydrolysis of the polyvinyl alcohol fiber forming material in the multilayer article.
Figure 13B:
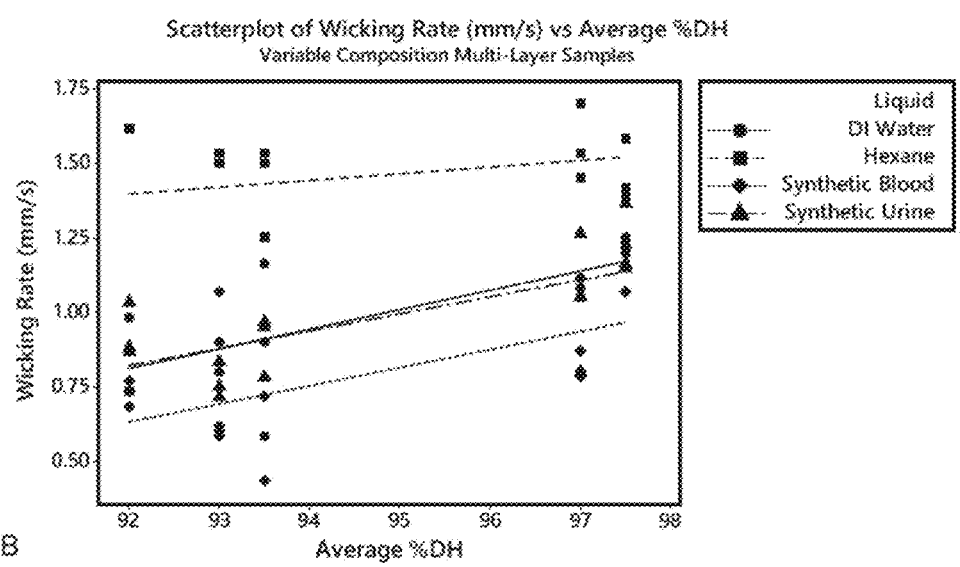
FIG. 13B is a plot of the wicking rate of a nonwoven web of the disclosure as a function of the average degree of hydrolysis of the polyvinyl alcohol fiber forming material in the multilayer article.
Figure 13C:
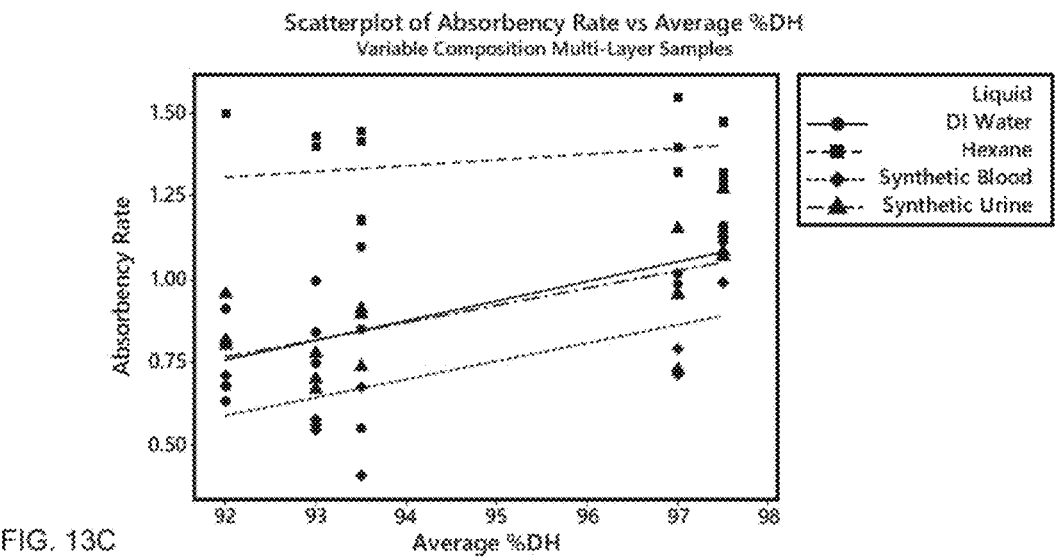
FIG. 13C is a plot of the absorbency rate of a nonwoven web of the disclosure as a function of the average degree of hydrolysis of the polyvinyl alcohol fiber forming material in the multilayer article.

As shown in FIG. 13, for all liquids except hexane, as the average DH of the multilayer article increased, the Washburn slope, wicking rate, and absorbency rate increased. For hexane, as the DH of the multilayer article increased, the Washburn slope, wicking rate, and absorbency rate remained relatively stable with slight increases. The data in FIG. 13 was collected for the calendar bonded articles, when the nonwovens web were in an orientation wherein the higher DH side was facing up and the lower DH side was exposed to the liquids.

Figure 14:
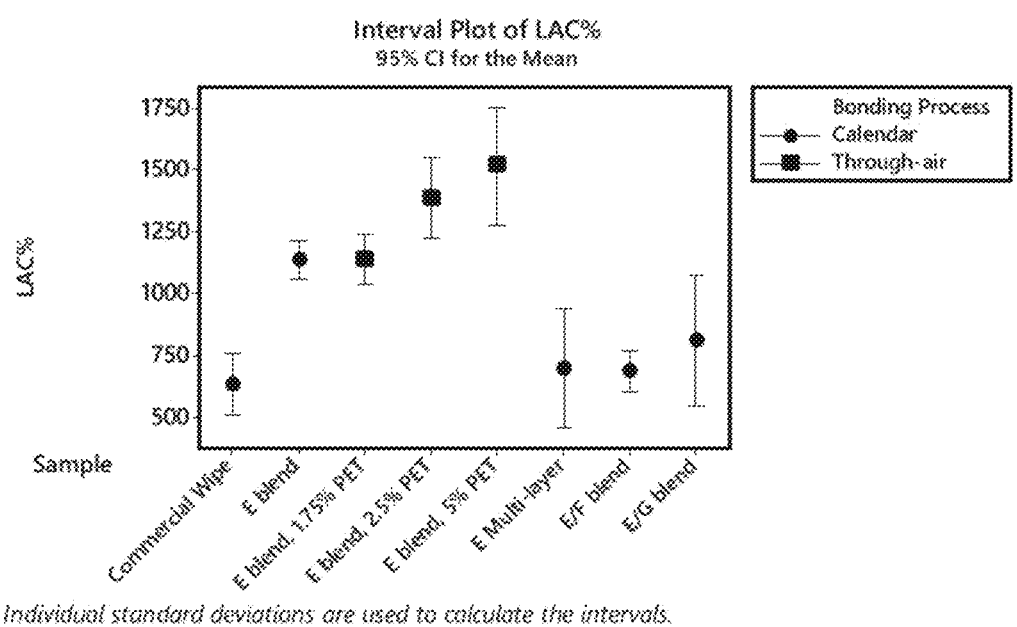
FIG. 14 is an interval plot of the liquid absorption capacity of nonwoven webs of the disclosure as a function of the average degree of hydrolysis of the polyvinyl alcohol fiber forming material in the multilayer article.

As shown in FIG. 14, the performance of the nonwovens was dependent on the average DH for the article and the type of bonding. Higher LAC % values were demonstrated for nonwovens that were air-through bonded, relative to their calendar-bonded counterparts. This trend suggests that with a higher degree of bonding, e.g., calendar bonding (having higher temperatures, pressures, and longer residence times than air-through process) the LAC of the article decreases. The labels on the x-axis of FIG. 14 refer to the following nonwoven webs of the disclosure: "E blend" is a single layer nonwoven web consisting of E fibers (from Example 1), "E blend, 1.75% PET" is a single layer nonwoven web including E fibers and 1.75 wt. % PET fibers, "E blend, 2.5% PET" is a single layer nonwoven web including E fibers and 2.5 wt. % PET fibers, "E blend, 5% PET" is a single layer nonwoven web including E fibers and 5 wt. % PET fibers, "E multi-layer" is a two layer nonwoven web wherein each layer consists of E fibers (from Example 2), "E/F blend" is a two layer nonwoven article wherein one layer consists of E fibers and one layer consists of F fibers, and "E/G blend" is a two layer nonwoven article wherein one layer consists of E fibers and one layer consist of G fibers. Nonwoven webs comprising only cotton pill material were also tested for comparison.

Example 4

Single layer nonwoven webs were prepared from a mixture of polyvinyl alcohol fibers (Fiber E) and polylactic acid (PLA) fibers or cotton fibers. In the nonwoven webs, the polyvinyl alcohol fibers comprised 50 wt. % of the total fiber weight and the other 50 wt. % was PLA fibers or cotton fibers. The polyvinyl alcohol fibers were carded together with the PLA fibers or cotton fibers and calendared at 40 psi and 140° C. The resulting nonwoven webs had a basis weight of about 50 gsm.

Thus, Example 4 demonstrates preparation of heterogeneous nonwoven webs including water soluble fibers and non-water soluble fibers.

The foregoing description is given for clearness of understanding only, and no unnecessary limitations should be understood therefrom, as modifications within the scope of the disclosure may be apparent to those having ordinary skill in the art.

All patents, publications and references cited herein are hereby fully incorporated by reference. In case of conflict between the present disclosure and incorporated patents, publications and references, the present disclosure should control.

What is claimed:

1. A liquid containing nonwoven article, comprising:
   a core nonwoven web comprising a first plurality of fibers having a first diameter and comprising a first polyvinyl alcohol fiber forming material, wherein the core nonwoven web comprises a liquid, the liquid comprising an active agent; and
   an outer nonwoven web comprising a second plurality of fibers having a second diameter and comprising a second polyvinyl alcohol fiber forming material,
   wherein the core nonwoven web is enclosed by the outer nonwoven web, and
   wherein the outer nonwoven web is sealed to enclose the core nonwoven web by solvent welding, and the solvent is selected from the group consisting of water, ethanol, methanol, DMSO, glycerin, and a combination thereof,
   wherein the core nonwoven web is saturated with the liquid, and
   wherein the second diameter is smaller than the first diameter.

2. The liquid containing nonwoven article of claim 1, wherein the outer nonwoven web is wrapped around the first nonwoven web.

3. The liquid containing nonwoven article of claim 1, wherein the outer nonwoven web has a form of a sleeve or an envelope and the core nonwoven web is provided in the sleeve or the envelope.

4. The liquid containing nonwoven article of claim 1, wherein the core nonwoven web has a first length in a first direction and the outer nonwoven web has a second length equal to the first length in the first dimension.

5. The liquid containing nonwoven article of claim 1, wherein a weight of the core nonwoven web comprising the liquid is two times to ten times of a weight of the core nonwoven web prior to addition of the liquid comprising the active agent.

6. The liquid containing nonwoven article of claim 1, wherein the core nonwoven web comprises about 5 grams (g) to about 30 g of liquid.

7. The liquid containing nonwoven article of claim 1, wherein the core nonwoven web comprising the liquid has a basis weight of about 30 gsm to about 2000 gsm.

8. The liquid containing nonwoven article of claim 1, wherein the core nonwoven web has a dry basis weight of about 15 gsm to about 200 gsm.

9. The liquid containing nonwoven article of claim 1, wherein the outer nonwoven web has a basis weight of about 15 gsm to about 400 gsm.

10. The liquid containing nonwoven article of claim 1, wherein the outer nonwoven web has a thickness of about 0.5 millimeters (mm) to about 6.0 mm.

11. The liquid containing nonwoven article of claim 1, wherein the core nonwoven web is a single ply or is comprised of multiple layers of nonwoven web.

12. The liquid containing nonwoven article of claim 1, wherein at least a portion of the core nonwoven web is in contact with at least a portion of the outer nonwoven web.

13. The liquid containing nonwoven article of claim 1, wherein the liquid containing nonwoven article has a plurality of edges and the core nonwoven web and the outer nonwoven web are sealed on at least two edges of the plurality of edges.

14. The liquid containing nonwoven article of claim 1, further comprising at least one of a plurality of markings or a pattern on the outer nonwoven web.

15. The liquid containing nonwoven article of claim 1, wherein the nonwoven article has a shape selected from the group consisting of a quadrilateral, a triangle, a circle, a star, a heart, an octagon, a pentagon, a hexagon, a heptagon, an oval, a crescent, a semicircle, a cross, a trefoil, a quadrafoil, a droplet, a pentagram, a hexagram, an octagram, a crown, a snowflake, a shield, a cloud, an arrow, and a combination of the foregoing.

16. The liquid containing nonwoven article of claim 1, wherein the liquid containing nonwoven article has a thickness of about 2 mm to about 50 mm.

17. The liquid containing nonwoven article of claim 1, wherein a maximum length in a dimension is about 7 inches (17.78 cm).

18. The liquid containing nonwoven article of claim 1, wherein a maximum length in a dimension is at least about 0.5 inches (1.27 cm).

19. The liquid containing nonwoven article of claim 1, wherein each of the first polyvinyl alcohol fiber forming material and the second polyvinyl alcohol fiber forming material are independently selected from a polyvinyl alcohol homopolymer, a polyvinyl alcohol copolymer, and a combination of the foregoing.

20. The liquid containing nonwoven article of claim 19, wherein the polyvinyl alcohol copolymer comprises an anionic modified polyvinyl alcohol.

21. The liquid containing nonwoven article of claim 20, wherein the anionic modified polyvinyl alcohol comprises an (alkyl) acrylate modified polyvinyl alcohol, a maleate modified polyvinyl alcohol, a sulfonate modified polyvinyl alcohol, or a combination thereof.

22. The liquid containing nonwoven article of claim 1, wherein the first plurality of fibers or the second plurality of fibers further comprises one or more fiber forming materials selected from the group of a polyacrylate, a polyvinyl pyrrolidone, a polyethyleneimine, guar gum, gum acacia, xanthan gum, carrageenan, a water-soluble starch, a water-soluble cellulose, a cellulose ether, a cellulose ester, and a cellulose amide.

23. The liquid containing nonwoven article of claim 1, wherein the first polyvinyl alcohol fiber forming material comprises a polyvinyl alcohol homopolymer.

24. The liquid containing nonwoven article of claim 1, wherein the second polyvinyl alcohol fiber forming material comprises a polyvinyl alcohol homopolymer.

25. The liquid containing nonwoven article of claim 1, wherein the first polyvinyl alcohol fiber forming material and the second polyvinyl alcohol fiber forming material are the same.

26. The liquid containing nonwoven article of claim 1, wherein the first polyvinyl alcohol fiber forming material and the second polyvinyl alcohol fiber forming material have a difference in a viscosity, a degree of hydrolysis, a degree of copolymerization, or a combination thereof.

27. The liquid containing nonwoven article of claim 1, wherein the active agent comprises one or more selected from the group of an enzyme, an oil, a flavor, a colorant, an odor absorber, a fragrance, a pesticide, a fertilizer, an oxidant, an activator, an acid catalyst, a metal catalyst, an ion scavenger, a detergent, a disinfectant, a surfactant, a bleach, a bleach component, and a fabric softener.

\* \* \* \* \*